United States Patent
Mase

(10) Patent No.: US 10,909,886 B2
(45) Date of Patent: *Feb. 2, 2021

(54) STARRY SKY REPRODUCING SHEET AND DEVICE

(71) Applicant: Yasufumi Mase, Aichi (JP)

(72) Inventor: Yasufumi Mase, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/678,824

(22) Filed: Nov. 8, 2019

(65) Prior Publication Data

US 2020/0118467 A1  Apr. 16, 2020

Related U.S. Application Data

(63) Continuation of application No. 15/550,253, filed on Aug. 10, 2017, now Pat. No. 10,529,256.

(30) Foreign Application Priority Data

Feb. 12, 2015 (JP) .................... 2015-025887

(51) Int. Cl.
*G09B 27/00* (2006.01)
*G09F 13/02* (2006.01)
(Continued)

(52) U.S. Cl.
CPC ............ *G09B 27/00* (2013.01); *G09B 5/02* (2013.01); *G09F 13/005* (2013.01); *G09F 13/02* (2013.01);
(Continued)

(58) Field of Classification Search
CPC .......... G09B 5/02; G09B 27/00; G09F 13/22; G03B 21/28
See application file for complete search history.

(56) References Cited

U.S. PATENT DOCUMENTS

2007/0177112 A1  8/2007  Kato

FOREIGN PATENT DOCUMENTS

CN        1866319 A    11/2006
CN      202694671 U     1/2013
(Continued)

OTHER PUBLICATIONS

English ISR for International Appl. No. PCT/JP2016/054204.
(Continued)

*Primary Examiner* — Omkar A Deodhar
(74) *Attorney, Agent, or Firm* — Takeo Ohashi

(57) ABSTRACT

Disclosed is a starry sky reproducing sheet containing: N laminated light reducing sheets stuck together, each of which has homogeneous light reducing effects (where N is two or larger); the starry sky reproducing sheet containing, with M and L being two mutually different integers that are one or larger and N or smaller (M>L): L-layer transmission holes that are formed through L light reducing sheets stuck together, so that light beams pass therethrough; and M-layer transmission holes that are formed, through M light reducing sheets stuck together including the L light reducing sheets, at different positions from those of the L-layer transmission holes; wherein light beams incident on one face of the starry sky reproducing sheet pass through the L- and M-layer transmission holes while being attenuated at mutually different light reduction ratios to become L- and M-layer transmitted beams respectively which are visibly recognizable as transmitted-light stars having mutually different brightnesses.

16 Claims, 85 Drawing Sheets

(51) Int. Cl.
*G09F 13/22* (2006.01)
*G09B 5/02* (2006.01)
*G09F 19/18* (2006.01)
*G09F 13/00* (2006.01)
*G09F 13/04* (2006.01)

(52) U.S. Cl.
CPC .............. *G09F 13/04* (2013.01); *G09F 13/22* (2013.01); *G09F 19/18* (2013.01)

(56) References Cited

FOREIGN PATENT DOCUMENTS

| | | |
|---|---|---|
| JP | H09-197957 A | 7/1997 |
| JP | 2007-322843 A | 12/2007 |
| JP | 2009-210912 A | 9/2009 |

OTHER PUBLICATIONS

Office Action by the CNIPA (Chinese Patent Office) in a counterpart Application of International Patent Application No. PCT/JP2016/054204, whose US national stage application is U.S. Appl. No. 15/550,253, which is the parent application of the present application.

○ Light-emitting element star

● Transmitted-light star

× Printed luminous star

▨ Printed luminous star (Planar-shaped)

| Magnitude ↓ | O | B | A | F | G | K | M | ← spectral type |
|---|---|---|---|---|---|---|---|---|
| U1 (9th~10th) | 1 | 2 | 3 | 4 | 5 | 6 | 7 | Ink No. |
| | 0.3mm | | | | | | | Size |
| U2 (10th~11th) | 1 | 2 | 3 | 4 | 5 | 6 | 7 | Ink No. |
| | 0.19m | | | | | | | Size |
| U3 (11th~12th) | 8 | 9 | 10 | 11 | 12 | 13 | 14 | Ink No. |
| | 0.3mm | | | | | | | Size |
| U4 (12th~13th) | 8 | 9 | 10 | 11 | 12 | 13 | 14 | Ink No. |
| | 0.19mm | | | | | | | Size |
| U5 (13th~14th) | 15 | 16 | 17 | 18 | 19 | 20 | 21 | Ink No. |
| | 0.3mm | | | | | | | Size |
| U6 (14th~15th) | 15 | 16 | 17 | 18 | 19 | 20 | 21 | Ink No. |
| | 0.19mm | | | | | | | Size |

| dilution ratio of ink ↓ | bluish | ← | ← | white | → | yellow | orange |
|---|---|---|---|---|---|---|---|
| | O | B | A | F | G | K | M |
| undiluted ink | 1 | 2 | 3 | 4 | 5 | 6 | 7 |
| 1/6.3 | 8 | 9 | 10 | 11 | 12 | 13 | 14 |
| 1/40 | 15 | 16 | 17 | 18 | 19 | 20 | 21 |

Ink No.

Fig. 13

| Magnitude ↓ | O | | B | | A | | F | | G | | K | | M | | ←Spectral type |
|---|---|---|---|---|---|---|---|---|---|---|---|---|---|---|---|
| U1 (9th~10th) | 1 | 4 | 1 | 5 | 1 | 6 | 1 | none | 1 | 7 | 1 | 8 | 1 | 9 | Ink No. |
| | 0.3mm | 0.5mm | 0.3mm | 0.5mm | 0.3mm | 0.5mm | 0.3mm | | 0.3mm | 0.5mm | 0.3mm | 0.5mm | 0.3mm | 0.5mm | Size |
| U2 (10th~11th) | 1 | 4 | 1 | 5 | 1 | 6 | 1 | none | 1 | 7 | 1 | 8 | 1 | 9 | Ink No. |
| | 0.19mm | 0.3mm | 0.19mm | 0.3mm | 0.19mm | 0.3mm | 0.19mm | | 0.19mm | 0.3mm | 0.19mm | 0.3mm | 0.19mm | 0.3mm | Size |
| U3 (11th~12th) | 2 | 4 | 2 | 5 | 2 | 6 | 2 | none | 2 | 7 | 2 | 8 | 2 | 9 | Ink No. |
| | 0.3mm | 0.5mm | 0.3mm | 0.5mm | 0.3mm | 0.5mm | 0.3mm | | 0.3mm | 0.5mm | 0.3mm | 0.5mm | 0.3mm | 0.5mm | Size |
| U4 (12th~13th) | 2 | 4 | 2 | 5 | 2 | 6 | 2 | none | 2 | 7 | 2 | 8 | 2 | 9 | Ink No. |
| | 0.19mm | 0.3mm | 0.19mm | 0.3mm | 0.19mm | 0.3mm | 0.19mm | | 0.19mm | 0.3mm | 0.19mm | 0.3mm | 0.19mm | 0.3mm | Size |
| U5 (13th~14th) | 3 | 4 | 3 | 5 | 3 | 6 | 3 | none | 3 | 7 | 3 | 8 | 3 | 9 | Ink No. |
| | 0.3mm | 0.5mm | 0.3mm | 0.5mm | 0.3mm | 0.5mm | 0.3mm | | 0.3mm | 0.5mm | 0.3mm | 0.5mm | 0.3mm | 0.5mm | Size |
| U6 (14th~15th) | 3 | 4 | 3 | 5 | 3 | 6 | 3 | none | 3 | 7 | 3 | 8 | 3 | 9 | Ink No. |
| | 0.19mm | 0.3mm | 0.19mm | 0.3mm | 0.19mm | 0.3mm | 0.19mm | | 0.19mm | 0.3mm | 0.19mm | 0.3mm | 0.19mm | 0.3mm | Size |

| Ink No. → | 1 | 2 | 3 | 4 | 5 | 6 | 7 | 8 | 9 |
|---|---|---|---|---|---|---|---|---|---|
| applicated ink | undiluted ink | 1/6.3 diluted ink | 1/40 diluted ink | Bluish <----------> Orange | | | | | |
| type of ink | white fluorescent ink | | | colored ink | | | | | |

Fig. 14

KeyNo

ModeNo

MaxStepNo

StepNo

SceneNo

Time

Trig

Fig. 15

| Name | star observation |
|---|---|
| ModeNo | 1 |
| MaxStepNo | 1 |

| Step | Time | SceneNo | Trig |
|---|---|---|---|
| 1 | 10 | 2 | 2 |

| Name | explanation of light pollution |
|---|---|
| ModeNo | 2 |
| MaxStepNo | 4 |

| Step | Time | SceneNo | Trig |
|---|---|---|---|
| 1 | 60 | 1 | 1 |
| 2 | 60 | 2 | 1 |
| 3 | 60 | 3 | 1 |
| 4 | 60 | 2 | 2 |

| Name | explanation of the orion constellation |
|---|---|
| ModeNo | 3 |
| MaxStepNo | 5 |

| Step | Time | SceneNo | Trig |
|---|---|---|---|
| 1 | 60 | 1 | 0 |
| 2 | 60 | 2 | 0 |
| 3 | 60 | 4 | 0 |
| 4 | 60 | 5 | 1 |
| 5 | 60 | 6 | 2 |

Fig. 16

| scene mode | night sky in the city area | | night sky in the mountainous area | | stars seen in space | | constellation chart | | position of the Orion constellation | | brightening of the Orion nebula | |
|---|---|---|---|---|---|---|---|---|---|---|---|---|
| ScenNo | 1 | | 2 | | 3 | | 4 | | 5 | | 6 | |
| | brightness | scintillation | brightness | scintillation | brightness | scintillation | brightness | scintillation | brightness | scintillation | brightness | scintillation |
| LED0 | 100 | | 10 | | 0 | | 0 | | 0 | | 0 | |
| LED7 | 0 | | 0 | | 0 | | 100 | | 100 | | 100 | |
| LED8 | 0 | | 0 | | 0 | | 0 | | 0 | | 0 | |
| LED1 | | | | | | | | | | | | |
| LED2 | | | | | | | | | | | | |
| LED3 | | | | | | | | | | | | |
| LED4 | | | | | | | | | | | | |
| LED5 | | | | | | | | | | | | |
| LED6 | 2 magnitudes darker than standard | ±30% | standard brightness | ±30% | standard brightness | 0 | 1 magnitude darker than standard | ±30% | standard brightness | ±30% | standard brightness | ±30% |
| BL111–BL114 | | | | | | | | | | | 2 magnitudes brighter than standard | |
| ... | | | | | | | | | | | | |
| BL331–BL33 | | | | | | | | | | | standard brightness | |
| ... | | | | | | | | | | | | |
| BL441–BL444 | | | | | | | | | | | 2 magnitudes brighter than standard | |
| UV1 | | | | | | | | | | | standard brightness | |
| UV11 | | | | | | | | | | | | |
| UV12 | | | | | | | | | | | | |
| ... | | | | | | | | | | | | |
| UV33 | 0 | 0 | 0 | 0 | 0 | 0 | 0 | 0 | 0 | 0 | 0 | 0 |
| ... | | | | | | | | | | | | |
| UV44 | | | | | | | | | | | 2 magnitudes brighter than standard | ±30% |
| | | | | | | | | | | | 0 | 0 |

Fig. 17

|  | content | | standard of brightness |
| --- | --- | --- | --- |
| UV1 | wide-angle UV lamp | | 100 |
| BL111-BL444 | backlight LED | | 100 |
| LED1 | Rigel | 0.18 (mag) | 85 |
| LED2 | κ | 2.07 (mag) | 15 |
| LED3 | ζ | 1.74 (mag) | 20 |
| LED4 | Betelgeuse | 0.45 (mag) | 66 |
| LED5 | γ | 1.64 (mag) | 22 |
| LED6 | ι | 2.75 (mag) | 8 |
| LED7 | line of the constellation | | 100 |
| LED8 | brightened area | | 100 |

Fig. 18

| | transmittance of prints (%) | | | | reflectance (%) | transmittance of sheets (%) | | | | total transmittance | transmittance based on that of galaxy (%) |
|---|---|---|---|---|---|---|---|---|---|---|---|
| | 1st light shielding print | 2nd light shielding print | 3rd light shielding print | 4th light shielding print | | 1st layer of paper | 2nd layer of paper | 3rd layer of paper | 4th layer of paper | | |
| star name 2350 | 25% | 5% | 5% | 5% | 25% | 16% | 16% | 16% | 16% | 2.0E-08 | 17% |
| constellation line 2351 | 25% | 5% | 5% | 5% | 25% | 16% | 16% | 16% | 16% | 2.0E-08 | 17% |
| background sky 2352 | 5% | 5% | 20% | 5% | 5% | 16% | 16% | 16% | 16% | 2.0E-08 | 17% |
| shining star 2353 | 25% | 5% | 5% | 5% | 25% | 16% | 16% | 16% | 16% | 2.0E-08 | 17% |
| galaxy 2355 | 15% | 5% | 50% | 5% | 15% | 16% | 16% | 16% | 16% | 1.2E-07 | 100% |
| diffuse nebula 2356 | 15% | 5% | 50% | 5% | 15% | 16% | 16% | 16% | 16% | 1.2E-07 | 100% |
| moutains 2357 | 10% | 5% | 8% | 5% | 10% | 16% | 16% | 16% | 16% | 1.3E-08 | 11% |
| window light 2358 | 40% | 5% | 30% | 5% | 40% | 16% | 16% | 16% | 16% | 2.5E-07 | 203% |

Fig. 59

| Name | admission | | |
|---|---|---|---|
| ModeNo | 0 | | |
| MaxStepNo | 1 | | |
| Step | Time | SceneNo | Trig |
| 1 | 0 | 0 | 1 |

| Name | the Orion | | |
|---|---|---|---|
| ModeNo | 1 | | |
| MaxStepNo | 1 | | |
| Step | Time | SceneNo | Trig |
| 1 | 0 | 1 | 1 |

| Name | introduction of the great nebula of Orion | | |
|---|---|---|---|
| ModeNo | 2 | | |
| MaxStepNo | 1 | | |
| Step | Time | SceneNo | Trig |
| 1 | 0 | 2 | 1 |

| Name | the great nebula of Orion | | |
|---|---|---|---|
| ModeNo | 3 | | |
| MaxStepNo | 1 | | |
| Step | Time | SceneNo | Trig |
| 1 | 0 | 3 | 1 |

| Name | the great nebula of Orion seen with a large diameter telescope | | |
|---|---|---|---|
| ModeNo | 4 | | |
| MaxStepNo | 1 | | |
| Step | Time | SceneNo | Trig |
| 1 | 0 | 4 | 1 |

| Name | the great nebula of Orion in detail | | |
|---|---|---|---|
| ModeNo | 5 | | |
| MaxStepNo | 2 | | |
| Step | Time | SceneNo | Trig |
| 1 | 0 | 5 | 1 |
| 2 | 0 | 6 | 1 |

| Name | observation of the moon | | |
|---|---|---|---|
| ModeNo | 6 | | |
| MaxStepNo | 2 | | |
| Step | Time | SceneNo | Trig |
| 1 | 0 | 7 | 1 |
| 2 | 0 | 8 | 1 |

Fig. 67

| name of scene | admission | introduction of the great nebula of Orion | the Orion | the great nebula of Orion | the great nebula of Orion seen with a large diameter telescope | the great nebula of Orion in detail | the great nebula of Orion (radio-wave) | scene of the whole moon | crater |
|---|---|---|---|---|---|---|---|---|---|
| ScenNo | 0 | 2 | 1 | 3 | 4 | 5 | 6 | 7 | 8 |
| SheetNo | 1 | 1 | 1 | 2 | 2 | 3 | 3 | 1 | 1 |
| LED1~LED6 | | | standard brightness and scintillation ±30% | standard brightness and scintillation ±30% | 16 times brighter than standard brightness and scintillation ±30% | standard brightness and scintillation ±30% | standard brightness and scintillation ±30% | | |
| BL111-BL444 | | | | | | | | | |
| UV1 | 0 | 0 | 0 | 0 | 0 | 0 | 0 | 0 | 0 |
| LED0 | | | | | | | | | |
| LED7~L8D6 | | | | | | | | | |
| UV11~UV44 | | | | | | | | | |
| ExperienceNo | 9999 | 2302 | 2301 | 2303 | 2304 | 2305 | 2306 | 6701 | 6702 |
| Filter | 1 | 4 | 1 | 1 | 2 | 1 | 2 | 4 | 4 |
| DeliplayPos | 2 | 2 | 2 | 2 | 2 | 2 | 2 | 2 | 1 |
| image on display | total darkness | total darkness | total darkness | total darkness | total darkness | total darkness | total darkness | total darkness | image of crater (fig.49 or fig.51) |
| image projected from projector | total darkness | image of stars for introduction (fig.41,fig.42,fi.43) | | image of the great nebula of Orion (fig.44) | image of the great nebula of Orion (fig.44) | image of the great nebula of Orion in detail (fig.45) | radio-wave image of the great nebula of Orion(fig.46) | image of the whole moon (fig.47) | image of the crater with a black center (fig.48) |
| added image from the projection device projecting the whole sky | | image showing the area of view | | image showing the area of view | image showing the area of view | image showing the area of view | image showing the area of view | image showing the area of view | image showing the area of view |
| information on the commentator's device | observer information of all of the audience | observer information of all of the audience | observer information of all of the audience | information of the great nebula of Orion | information to comment on the observation with a large diameter telescope | information to comment on the trapezium | information to comment on field intensity | information to comment on the moon | information to comment on the moon |

Fig. 68

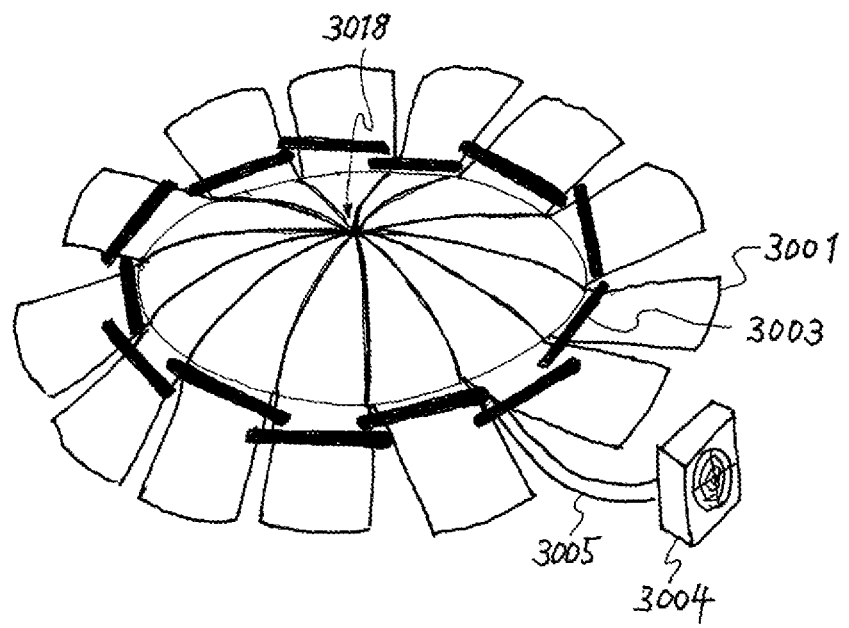
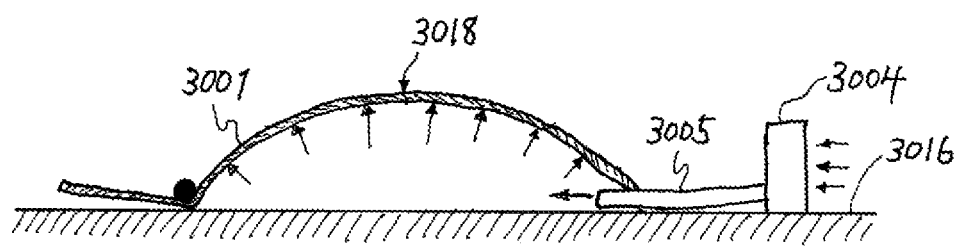
Fig. 74

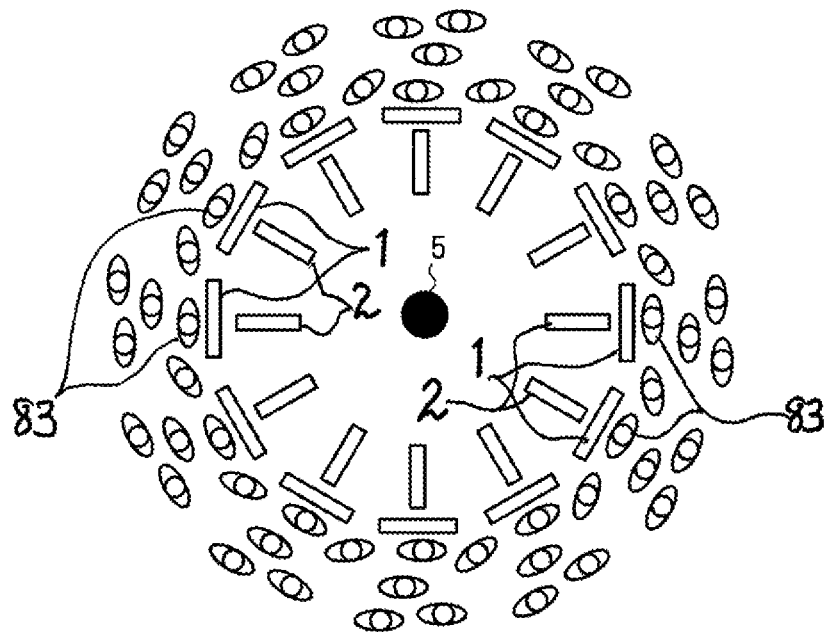
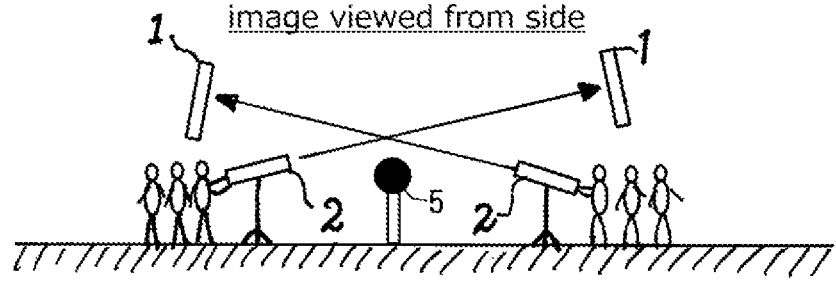
Fig. 85

STARRY SKY REPRODUCING SHEET AND DEVICE

TECHNICAL FIELD

The present invention relates to starry sky reproducing sheet and device to reproduce a starry sky for astronomy education, and more particularly to starry sky reproducing sheet and device to efficiently provide learners with experiences of visual observation of a starry sky through binoculars, telescopes, or photography with cameras, as well as observation with naked eyes.

BACKGROUND ART

Observational learning is important for citizen, or particularly for young kids to have more interest in the cosmology and astronomy, and to study scientific approach on them. That learning experience does not only mean a passive experience like astronomy observation through naked eyes with listening to a commentary, but it also include detailed observation of dark stars that are unable to be observed with naked eyes through binoculars or astronomical telescope, and further include photographic observation of dark celestial objects that are unable to be observed even through an astronomical telescopes and those emitting light of wavelengths that are unable to be observed with naked eyes. These experiences will lead the citizen to advanced studies.

For those purposes, educational facilities hold events for astronomy observation with astronomical telescopes or cameras. However, the events have not been able to provide high-quality experiences of observation of a starry sky for the following reasons.
1. The sky on city side is too bright with city lights for observation of dark stars. The observation must be conducted under a dark sky.
2. The observation condition is restrictive because the observation condition is affected by the place, season, and the time. Thus, celestial objects that can be observed in the events are limited.
3. The stars can not be observed on bad weather.

Under these circumstances, projection planetariums and various types of starry sky reproducing devices to reproduce stars directly have been proposed. With these items, promoters of the events can produce high-quality astronomy observations even on daytime, or on bad weather.

The starry sky reproducing devices as disclosed in Patent Literatures 1 and 2 have been used widely as planetariums. A star projection device, settled near the center in the dome-shaped structure having a white screen inside, can project stars under the condition the inside of the dome is dark. Dark celestial objects that can not be reproduced by the star projection device are projected by a general-purpose projector, instead. Thus, observers in the dome can observe an artificial starry sky.

The starry sky reproducing devices disclosed in Patent Literatures 3 to 6 use the method to form star images directly on the surface of a dome-shaped structure. The one in Patent Literature 3 is made of a sheet of paper having an aluminum foil thereon. It has holes on the surface of the sheet, so that an observer can observe starlit by holding up the sheet in front of a background light like such as from a TV set. Moreover, the one in Patent Literature 4 has the starlit wallpaper on which a starry sky is drawn with luminous paints. The one in Patent Literature 5 has light emitting-elements like LEDs inside a dome-shaped structure and the elements reproduce starts.

The starry sky reproducing device in Patent Literature 6 has optical fibers. The edges of the fibers are fixed on the wall of a dome. An observer can observe light led by the fibers as stars.

CITATION LIST

Patent Literature

Patent Literature 1: JP 2009-210912 A
Patent Literature 2: JP 2008-225294 A
Patent Literature 3: JP H7-43533 U
Patent Literature 4: JP 3053620 U
Patent Literature 5: JP S63-285577 A
Patent Literature 6: JP 3081769 U

SUMMARY OF INVENTION

Technical Problems

To provide high quality, effective observation through binoculars, telescopes, or cameras at a low cost, a starry sky reproducing device need to have the following target capacities. At present, the conventional starry sky reproducing devices do not have the capacities sufficiently as illustrated below. An object of the present invention is to achieve the target capacities that can not be achieved by the conventional devices. Bellows are the details on the object.

First, the 12 target capacities required for a starry sky reproducing device are illustrated. Then, problems of conventional devices are illustrated in detail.

Target capacities 1-4 relate to mandatory functions of a starry sky reproducing device, and target capacities 5-12 relate to desirable functions thereof.

>Target Capacity 1: Wide Dynamic Range

It is required to reproduce every brightness level from bright celestial objects which can be observed with naked eyes to dark ones which can not be observed without telescopes or digital cameras.

Sometimes a starry sky reproducing device needs to reproduce celestial objects having brightness difference of 25 magnitudes, or in other words, brightness difference of 10 billion times at maximum; for example, including Venus having a magnitude of −4.7 and a star having a magnitude about 20.3, which can be observed when a camera is used. As a data of the dark stars, the data on a billion stars ranging to the 20th magnitude recorded in the USNOB1.0 published by United States Naval Observatory can be used. Furthermore, the observation data on the deep space photographed by Hubble Space Telescope, which is operated by NASA, contains data on further darker stars. A wide dynamic range is required to reproduce stars based on these observation data.

>Target Capacity 2: High-Definition Images of Stars

It is required to reproduce the starts in high definition without distortion so that sharp, bright stars can be observed even when the stars are enlarged by a telescope.

To be recognized as a dot when observed with human eyes, a star needs to have an apparent diameter of 1 arc minute or smaller. For example, when a star is observed through binoculars having seven times higher magnification than the naked eyes, settled close to the center in a dome shaped planetarium of 15 meters in diameter, the star need to be reproduced to have a diameter smaller than 0.3 mm. Further, the star has to be reproduced without distortion in order to be observed as a dot.

>Target Capacity 3: Reproduction of Accurate Colors of Stars

It is required to reproduce every star with an accurate color.

The human capacity on recognition of colors gets down in darkness. Thus, the colors of dark stars need less to be reproduced when observed with naked eyes. On the other hand, the colors are discriminated accurately through photographic observation even when the stars are dark. Therefore, every star is required to be reproduced with the accurate color thereof.

>Target Capacity 4: Low Cost

It is required that the processes to achieve the target capacities 1-3 are carried out at a low cost.

To produce a star projection device having target capacities 1-3, following items are needed; a high-brightness light source, a high-definition star plate containing optical fibers, and high-specification projection lenses having low distortion and high brightness. Furthermore, a telescope with a large diameter having a high light-gathering power is needed for observation of dark stars. However, these items are expensive.

In a planetarium, an opportunity of astronomical observation can be provided to a large number of learners by one explainer. If the observation uses telescopes during the explanation by the explainer, however, every telescope requires an instructor. To achieve low cost observation, planetarium needs to provide the opportunity with a smaller number of instructors.

>Target Capacity 5: Positional Relationship Among Stars without Distortion

It is important for stars to be observed with accurate positional relationship in the same way as observed with naked eyes even through a telescope regardless of positions of the stars on the celestial sphere.

Because the stars reproduced by projection in a planetarium has limit of the projection distance, it is unavoidable that some observers observe the stars with distortion depending on their sitting positions. On the other hand, though the observers sitting on the center of the dome-shaped structure can observe the stars without distortion, sitting on the center is impossible because of the presence of the projection device on the center. To solve the problem, the seats in the planetarium are settled close to the center as possible as they can. Also when the stars are observed through a telescope, it is important for the stars to be observed without distortion of positions regardless of their positions on the celestial sphere.

>Target Capacity 6: Securing of Observation Distance

It is important to secure an enough distance between a telescope and celestial objects to be observed.

Astronomical telescopes on the market are usually designed for observation of the whole sky at an infinite distance. Therefore, some unfavorable effects, such as being out of adjustable focus limits or increasing optical aberration, may be caused when the distance is short. In some cases, a high-cost custom-made telescope has to be prepared.

To provide astronomy observation to a large number people efficiently, it is essential to settle plural telescopes. When plural telescopes are settled, distortion among the positions of stars observed with the telescopes may be serious due to parallax since the distance of the telescopes and the objects to be observed are limited. To avoid the problem, it is needed to have enough distances between them.

>Target Capacity 7: Provision of Experience of Introduction Operation

It is important to provide experience to introduce a celestial object to be observed into the field of a telescope. Experience of enjoying a starry sky with the use of a starry sky reproducing device is defined not only as observation of the starry sky through the telescope but also as experience of operation for introducing a celestial object to be observed into the field of the telescope. At present, some volunteer staff who assist astronomy observation try the operation and such experience is important for the volunteer staff, too.

>Target Capacity 8: Observation of Plural Number of Celestial Objects

It is important to observe plural number of celestial objects on the celestial sphere.

Reproducing a starry sky that varies depending on the season enables observation of many celestial objects. In this case, it is desirable that celestial objects located at almost opposite positions on the celestial sphere can be compared with each other: for example, nebulas and/or star clusters at the Sagittarius located on the galaxy of summer and those at the Orion located on the galaxy of winter can be compared, and those at the Coma Berenices located on Galactic north and those at the Sculptor located on Galactic south can be compared.

>Target Capacity 9: Recognition of Positions of Celestial Objects to be Observed Through the Telescope It is important to recognize the positions of the celestial objects which an observer tries to observe.

It is an exciting experience for an observer to observe celestial objects in which the observer has interests by themselves. The experience can not be obtained through observation of celestial images provided by the internet.

However, it is not easy to recognize the positions of the celestial objects for the observer who observes the celestial objects through a telescope. Thus, it is important to make it possible for the observer to recognize easily where the celestial objects that the observer is observing are located in the starry sky extending above the observer.

>Target Capacity 10: Efficiency of Setting

It is important to make the observation efficient by requiring less operation for changing the setting of a telescope even when the objects to be observed are plural, and have different sizes and brightnesses. Since a planetarium accommodates several tens of people, the experience of observation through the telescope has to be provided efficiently.

When plural celestial objects are observed, the condition of the telescope has to be changed depending on the respective brightnesses and sizes of the celestial objects. To be specific, a lens having a high light-gathering power has to be used for dark objects, and eyepiece lens has to be changed to provide appropriate magnification depending on the sizes of the celestial objects.

The setting operations for different stars require lots of efforts and time. Therefore, sufficiency in setting of the telescope to provide the observation experience to more people is important.

>Target Capacity 11: Provision of Appropriate Information to Every Observer

It is important to provide appropriate information to each observer.

Appropriate information need to be provided depending on the observer's age, language, levels of interest and knowledge in astronomy, and previous experience of astronomy observation.

\>Target Capacity 12: Providing an Experience of Astronomical Photography

It is important that observers can bring models of terrestrial objects into a planetarium and experience astronomical photography.

With the improvement of digital reflex camera, it is possible to take high-quality photos even by a store-bought camera. It is suggested to have a time for astronomical photographic to touch astronomical sky. It is important to provide an experience of astronomical photography so that observers can take photos of models of terrestrial objects like mountains, trees, and buildings together with a starry sky.

Bellows are problems of conventional technologies on achievement of target capacities 1-4. Hereafter, any kinds of previous devices are called a starry sky reproducing devices.

The starry sky reproducing device in Patent Literature 1 is a device to improve the conventional planetarium. The starry sky reproducing device in Patent Literature 1 is a modification from the conventional projection planetarium. The configuration of the device is as follows: ends of optical fibers are fixed at the positions corresponding to stars on a star plate. The other ends of the optical fibers are bundled. Lamp illumination passed through liquid crystal is imaged on the edges of the bundled ends by lenses. By controlling the liquid-crystal, any stars can be darken, turned off, or colored selectively. However, with current technology, the dynamic range of transmittance through liquid crystal is at most 10,000. It is difficult to achieve the dynamic range of 10 billion even if the size of the optical fibers or hole diameter on the star plate are varied. Thus, it is difficult to achieve the target capacity 1.

Meanwhile, the starry sky reproducing device in Patent Literature 2 is improved further than the one in Patent Literature 1. Through the improved one, stars in a wide brightness range can be reproduced. Bright stars are projected by ordinary projection planetarium, and dark stars are projected by a projector. Consequently, the target capacity 1 is achievable.

However, the starry sky reproducing device in Patent Literature 2 is designed for observation with naked eyes. That is to say, the star images in the system are designed to have a resolution of one arc minute, which enables the star images to be recognized as dots by naked eyes. Thus the device, has problems to achieve target capacity 2; i.e., in order to reproduce high-definition star images having resolution of nine arc seconds, which enables the star images to be recognized as dots even observed with a telescope having a magnification of seven times.

That is to say, the starry sky reproducing devices in Patent Literatures 1 and 2 are required to have smaller holes on the optical fibers or star plates. That is against the target capacity 1, which requires reproduction of bright stars.

If a high-technology 4K projector, which has a resolution of 4096 pixel along its longitudinal edge, is used for reproducing dark stars by the device in Patent Literature 2, one pixel of the projector corresponds to approximately 2.6 arc minutes when the sky is reproduced to cover the meridian on the half sphere with the longitudinal edge of the projector. The size is 2.6 times larger than the image which is recognized as a dot when observed through the naked eyes. That means the resolution level is not enough. To reproduce a whole sky by plural 4K projectors in a dividing manner and to provide high-definition star images which are recognized as dots through the naked eyes, two to four expensive 4K projectors are needed that cost 1.5 million yen per each. Because of the high cost, it is difficult to introduce the device to every planetarium.

The resolution needs to be improved further by 7 times for the achievement of target capacity 2. To achieve the resolution, high cost equipment is required, like over 100 sets of 4K projectors. "High cost" goes against target capacity 4, and the high cost equipment will prevent the device from being widely used.

The projection planetarium such as disclosed in Patent Literature 1 projects a whole sky, with dividing the whole sky, by plural projection units each of which contains a light source, a star plate, and a projection lens. The projection lens induces distortion of the star images projected on the dome-shaped structure because of optical aberration. Furthermore, in the case of the device disclosed in Patent Literature 2, the projector for dark stars also introduces distortion on the star images because the projector also requires a projection lens.

When lenses having smaller F-number are used to project stars brightly, or lenses having wider angles are used to reduce the number of projection units by projecting a larger area of the sky by each unit for cost reduction, the extent of the distortion is more conspicuous. To achieve target capacity 2, higher-quality projection lenses are required than ordinary ones. That consequence goes against target capacity 4.

Meanwhile, it is against achievement of target capacity 1 to use dark lenses to keep down the cost for the lenses. Moreover, when narrower-angle lenses are used, a larger number of projection units are needed to project a whole sky. If the number of the projection units become larger, the cost will become higher, which against the target against 4.

As described above, the starry sky reproducing devices using a projection planetarium or a projector such as those disclosed in Patent Literature 1 and 2 has the serious problems which lead to the difficulty on achievement of high level of performance on target capacity 1, 2, and 4.

Next, Problems of the starry sky reproducing devices in Patent Literature 3 to 6 are described. These systems can project stars on the wall of a dome-shaped structure directory. Thus, they do not need projection lenses, which are required in the systems from Patent Literature 1 and 2, and they do not need to have devices such as projectors set on the center of the structure when the systems are designed to have a dome shape.

In the starry sky reproducing device in Patent Literature 3, the brightnesses of stars can be varied depending on the sizes of the holes. The configuration is advantageous to reproduce the stars with high magnitudes which can be observed by naked eyes, but for the achievement of target capacity 1, for example by varying the brightness in the range of 10 billion, it is required to change the ratio of the diameters of the holes by a hundred thousand times between the brightest stars and the darkest stars. Specifically for example, when the Venus having a magnitude of −4.7 is reproduced by a hole having a diameter of 0.3 mm, a 20.3 magnitude star have to be reproduced by a hole having a diameter of 0.003 micron. 0.003 micron is shorter than one-hundredth of the wavelength of light, and forming such small holes is extremely difficult.

The starry sky reproducing device in Patent Literature 4 can reproduce the dark stars at low cost if the stars are printed out with luminous or fluorescent paint, but these paints has limits on the emission luminance. When the stars are printed with the paints as small dots to achieve target capacity 2, the stars are difficult to be reproduced sufficiently brightly. That means the achievement of target capacities 1 and 2 at the same time is difficult. Moreover, the following problems arise when the fluorescent paint is excited by an intense UV lamp: i.e., the background can be bright because of the visible light which is contained in the light from the UV lamp if the light is too intense. Further, fluorescent material on observers' clothes can be illuminated, and watching UV light directly may have bad effects on eyes.

To reproduce the stars on any positions on the starry sky reproducing device which is disclosed in Patent Literature 5, it is required to cover the celestial sphere with LEDs. For example, to achieve target capacity 2 with the device, it needs one hundred million LEDs which have a diameter smaller than 0.3 mm to cover a 15-meter dome with the LEDs at intervals of 2 mm. It is extremely hard to produce one hundred LEDs for the system, and moreover, if it is possible, it will cost high. That means the attempt will go against target capacity 4.

To achieve target capacity 1 with the starry sky reproducing device which is disclosed in Patent Literature 6, the device would need plural optical fibers to reproduce a large number of dark stars. It requires high cost to install the fibers in the device, and that goes against target capacity 4.

Solution to Problems

To solve the problems, a starry sky reproducing device according to claim 15 contains a laminated sheet containing N light reducing sheets stuck together, each of which has homogeneous light reducing effects (where N is two or larger); the laminated sheet containing, with M and L being two mutually different integers that are one or larger and N or smaller (M>L): L-layer transmission holes that are formed through L light reducing sheets stuck together, so that light beams pass therethrough; and M-layer transmission holes that are formed through M light reducing sheets stuck together including the L light reducing sheets at different positions from the L-layer transmission holes; wherein light beams incident on one face of the laminated sheet pass through the L- and M-layer transmission holes while being attenuated at mutually different light reduction ratios to become L- and M-layer transmitted beams respectively which are visibly recognizable as transmitted-light stars having mutually different brightnesses.

In addition to claim 15, the starry sky reproducing system according to claim 2 contains: a plurality of light emitting elements; light-emitting element lighting control means that controls lighting of the light emitting elements; and optical fibers that are disposed on a back side of the laminated sheet and through the laminated sheet, and that lead light incident on ends of the fibers from the light emitting elements to an observer side of the laminated sheet; wherein the transmitted-light stars and light-emitting element stars that are produced by the light led by the optical fibers from the light emitting elements can be observed by an observer simultaneously; and wherein, when the light-emitting element stars have an average intensity of A and the transmitted-light stars have an average intensity of B, A>B holds.

In addition to the claim 2 or 15, the starry sky reproducing device according to claim 3 contains: a UV lamp that illuminates an observer side surface of the laminated sheet with ultraviolet light; and UV-lamp lighting control means that controls lighting of the UV lamp; wherein the laminated sheet contains a printed surface on the observer side surface thereof on which stellar images are printed with a fluorescent ink that emits light by being illuminated with ultraviolet light; wherein printed luminous stars that are produced by the fluorescent ink emitting light by being illuminated with the UV lamp and the transmitted-light stars can be observed by an observer simultaneously; and wherein, when the transmitted-light stars have an average intensity of B and the printed luminous stars have an average intensity of C, B>C holds.

In addition to any one of claims 2, 3 and 15, the starry sky reproducing device according to claim 4 contains a projector that contains a projection lamp, a projection lens, and a light-path control device placed between the projection lamp and the projection lens to control the intensity of a beam from the projection lamp to the projection lens, the projector being able to project an image on a surface of the laminated sheet.

In addition to any one of claims 2, 3 and 15, the starry sky reproducing device according to claim 5 contains: a display that can display an image on a surface thereof by controlling transmittance of light from a backlight panel for each pixel; and a transmitting reflection plate that enables simultaneous observation of the image on the display and the light from the laminated sheet by reflecting light from display elements producing the image and by transmitting the light from the laminated sheet.

In addition to claims 2 to 5 and 15, the starry sky reproducing device according to claim 6 contains: an approximately planar illumination panel containing transmission-light emitting elements that generate backside illumination light for the laminated sheet; and illumination panel lighting control means that can change light intensity from the illumination panel; wherein the illumination panel can illuminate a face of the laminated sheet with light of variable intensity by being disposed close to the laminated sheet.

In addition to claim 6 the starry sky reproducing device according to claim 7 contains laminated-sheet installation means that installs the laminated sheet on the illumination panel in an exchangeable manner.

In addition to claim 2, the starry sky reproducing device according to claim 8 contains: a base frame that the plurality of light emitting elements and the light-emitting element lighting control means are fixed to; and laminated-sheet installation means that installs the laminated sheet on the base frame in a removable manner; wherein the laminated sheet installation means is configured to align incidence ends of the optical fibers at positions facing light emitting planes of the light emitting elements according to predetermined correspondence between the light emitting elements and the optical fibers upon installation of the laminated sheet.

In addition to claim 2, the starry sky reproducing device according to claim 9 contains: an approximately planar illumination panel containing transmission-light emitting elements that generate backside illumination light for the laminated sheet; and an illumination panel lighting control means that can change light intensity from the illumination panel; wherein the illumination panel can illuminate a face of the laminated sheet with light of variable intensity by being disposed close to the laminated sheet; and wherein the light-emitting element lighting control means or the illumination panel lighting control means works to achieve a predetermined balance of brightness observed by the observer between the transmitted-light stars and the light-emitting element stars.

In addition to claim 3, the starry sky reproducing device according to claim 10 contains: an approximately planar illumination panel containing transmission-light emitting elements that generate backside illumination light for the laminated sheet; and an illumination panel lighting control means that can change light intensity from the illumination panel; wherein the illumination panel can illuminate a face of the laminated sheet with light of variable intensity by being disposed close to the laminated sheet; and wherein the UV-lamp lighting control means or the illumination panel lighting control means works to achieve a predetermined balance of brightness observed by the observer between the transmitted-light stars and the printed luminous stars.

Advantageous Effects of Invention

The present invention has the following actions and effects.

When observers observe the transmission holes formed on the light reducing sheet having homogeneous light reducing effects with illuminating the sheets with light from the back side, the holes are recognized as transmitted-light stars. That is caused by the difference of brightness between the areas where the transmission holes are not formed and the light is attenuated and the areas where the transmission holes are formed and the light passes through the holes.

The transmitted-light stars can reproduce stars having different magnitudes depending on the diameters of the holes; however, the range of the magnitude that can be reproduced by the diameters of the holes alone is limited by the minimum diameter that can be processed and by the maximum diameter to be observed as dots through a telescope.

The starry sky reproducing device according to claim 15 contains a laminated sheet containing N light reducing sheets stuck together, each of which has homogeneous light reducing effects (where N is two or larger); the laminated sheet containing, with M and L being two mutually different integers that are one or larger and N or smaller (M>L): L-layer transmission holes that are formed through L light reducing sheets stuck together, so that light beams pass therethrough; and M-layer transmission holes that are formed through M light reducing sheets stuck together including the L light reducing sheets at different positions from the L-layer transmission holes; wherein light beams incident on one face of the laminated sheet pass through the L- and M-layer transmission holes while being attenuated at mutually different light reduction ratios to become L- and M-layer transmitted beams respectively.

Therefore, even if an M-layer transmission hole has a same diameter as an L-layer light transmission hole, an L-layer transmitted beam will be darker than an M-layer transmitted beam because of the light reduction by the (M−L) light reduction sheets. Namely, difference in brightness between the stars reproduced by the L- and M-layer transmitted beams can be generated by light reduction by the (M−L) sheets as well as by variation of the sizes of the holes.

When (M−L) sheets are limited to already laminated L sheets, the light reducing effect works homogeneously even if the laminating positions of the sheets are displaced between the (M−L) sheets and the L sheets. That means that the positional displacement does not have any effect on the light reducing effect for the L-layer transmitted beams. Even if it the laminating positions of the (M−L) sheets are displaced mutually, the M-layer transmitting beams are not attenuated by the (M−L) sheets because the M-layer transmission hole is formed after the lamination of the (M−L) sheets through the M sheets.

As above, a wider range of magnitude of stars can be reproduced by the difference of the hole diameter as in the conventional way, and additionally, by variation in in degree of light reduction by the light reducing sheets.

The advantageous effect is illustrated by an example: a laminated sheet (N=5) containing five light reducing sheets each having a light reducing effect corresponding to two magnitudes are used. Holes having diameters of 0.3 mm and 0.5 mm are formed on the laminated sheet successively in the states where M=L+1 with changing L form 1 to 4. Thus, transmission holes penetrating 1 to 5 sheets are formed, and 4 to 1 sheets have light reducing effects on the beams passes through the holes, respectively. As a result, light reducing effects corresponding to 8, 6, 4, 2, and 0 magnitudes are provided, whereby a wider range of magnitude can be reproduced than in the case where variation of one magnitude is reproduced by the difference in the hole diameter.

By increasing the number of the laminated light reducing sheets, they will be able to reproduce a wider range of magnitude of stars even when holes having large diameters can not be adopted for observation through an astronomical telescope, besides, when it is difficult to form small-diameter holes.

In the above example, it reproduces stars at an interval of one magnitude by laminating the sheets having two-magnitude light reduction, and forming holes having diameters of 0.5 mm and 0.3 mm repeatedly. But the diameters and the light reduction ratio are not limited thereto. For example, under the condition that the light reduction corresponds to three magnitudes and the holes have three different diameters of 0.5 mm, 0.3 mm, and 0.18 mm, stars can be reproduced at an interval of one magnitude like in the above example. In another case, the light reduction corresponds to four magnitudes, holes has 4 different diameter of 0.5 mm, 0.3 mm, 0.18 mm, and 0.11 mm, and 7 sheets are laminated. In this case, to reproduce the brightest stars, holes penetrating the all 7 layers with the diameter of 0.5 mm are formed, and for the darkest ones, holes penetrating just 1 layer with the diameter of 0.3 mm. In that condition, it is possible to make the difference of 25 magnitudes: 6 (the number of the layers in the laminated sheet)×4 (the brightness magnitude)+1 (the difference of the magnitude by the diameter). It is possible to get a dynamic range of 10 billion.

On forming the transmission holes, it is better to have less loads. In the present invention, darker stars, which are larger in number, are formed through a thinner laminate containing a smaller number of sheets. That means tools have less loads, which leads to cost reduction.

When the laminated sheet is used to form an air dome, the sheet is required to have a high tensile strength. By the laminating structure and the thickness of the laminated sheet, the strength will be sufficient.

The starry sky reproducing device according to claim 2 has the following effects in addition to the effects of claim 15. The starry sky reproducing device according to claim 2 contains: a plurality of light emitting elements; light-emitting element lighting control means that controls lighting of the light emitting elements; and optical fibers that are disposed on a back side of the laminated sheet and through the laminated sheet, and that lead light incident on ends of the fibers from the light emitting elements to an observer side of the laminated sheet; wherein the transmitted-light stars and light-emitting element stars that are produced by the light led by the optical fibers from the light emitting elements can be observed by an observer simultaneously; and wherein, when the light-emitting element stars have an average intensity of A and the transmitted-light stars have an average intensity of B, A>B holds. That means that when the beams from the light emitting elements such as high-brightness LEDs are lead to the surface of the laminated sheet, they can produce light-emitting element stars having brightness independent from the brightness of the transmitted-light stars, whereby a wider range of magnitude of stars can be reproduced than by the transmitted-light stars alone.

An example is presented: the laminated sheet contains 8 light reducing sheets each having light reducing effect corresponding to two magnitudes. Transmission holes with a diameter of 0.18 mm are formed on the first layer, and transmission holes with a diameter of 0.3 mm are formed penetrating all the 8 layers. They have difference of 15 magnitudes with 14 magnitudes by the light reduction by the light reducing sheets and one magnitude by the difference of the diameter. Further, the brightness of the light emitting elements lighting up the edge of the optical fibers are made adjustable within 10 magnitudes, or in other words, the brightness can be changed by 10 thousand times. Thus, the brightest light emitting-element stars and darkest transmitted-light stars are reproduced with the difference of 25 magnitudes of the brightness, which means the brightness can be changed by 100 million times by adjusting the illumination brightness on the back side of the laminated sheet so that the brightness of the darkest light emitting-element stars is equal to the brightness of the brightest transmitted-light stars reproduced by the optical fibers. Thereby, the number of the laminated light reducing sheets is reduced, and the laminate sheet can be made more easily.

With respect to the reproduction cost per star, the cost for a light-emitting element star will be higher than the cost for a transmitted-light star. However, the cost can be reduced by a natural law: the higher the star magnitude is raised, the smaller the number of the stars. As the solution, the average star brightness A of the stars reproduced by the light emitting elements can be higher than the average brightness B of the ones reproduced by the transmitted light. Thus, the total cost is reduced by the natural law. Claim 3 has the following effects in addition to the effects of claims 2 and 15.

The starry sky reproducing device according to claim 3 contains: a UV lamp that illuminates an observer side surface of the laminated sheet with ultraviolet light; and UV-lamp lighting control means that controls lighting of the UV lamp; wherein the laminated sheet contains a printed surface on the observer side surface thereof on which stellar images are printed with a fluorescent ink that emits light by being illuminated with ultraviolet light; wherein printed luminous stars that are produced by the fluorescent ink emitting light by being illuminated with the UV lamp and the transmitted-light stars can be observed by an observer simultaneously; and wherein, when the transmitted-light stars have an average intensity of B and the printed luminous stars have an average intensity of C, B>C holds. It means that the printed luminous stars and transmitted-light stars can be reproduced with independent magnitude of brightness and that a wider range of magnitude of stars can be reproduced.

An example is presented: the laminated sheet contains 8 light reducing sheets each having light reducing effect corresponding to two magnitudes. Transmission holes with a diameter of 0.18 mm are formed on the first layer, and transmission holes with a diameter of 0.3 mm are formed penetrating all the 8 layers. They have difference of 15 magnitudes with 14 magnitudes by the light reduction by the light reducing sheets and one magnitude by the difference of the diameter. Further, printed luminous stars are printed with fluorescent ink, so that the brightness of the printed luminous stars ranges 10 magnitudes, which means the difference between the brightest printed luminous stars and darkest ones is ten thousand times. It will be able to reproduce the brightest transmitted-light stars and darkest printed luminous stars with the difference of 25 magnitudes of the brightness, which means the brightness can be changed by 100 million times by adjusting the illumination brightness on the back-side of the laminated sheet so that the brightness of the darkest transmitted-light stars is matched with the brightness of the brightest printed luminous stars. Thereby, the number of the laminated light reducing sheets is reduced, and the laminate sheet can be made more easily.

When the starry sky reproducing device has claim 3 in addition to claim 2, the following configuration will be available. The laminated sheet contains five light reducing sheet each having light reducing effect corresponding to two magnitudes. Transmission holes with a diameter of 0.18 mm are formed on the first layer, and transmission holes with a diameter of 0.3 mm are formed penetrating all the five layers. They reproduce 9 magnitudes. Further, the brightness of the light emitting elements lighting up the edge of the optical fibers are made adjustable within 9 magnitudes, or in other words, the brightness can be changed by 4000 times. The illumination brightness on the back-side of the laminated sheet is adjusted so that the brightness of the darkest light emitting-element stars is matched with the brightness of the brightest transmitted-light stars reproduced by the optical fibers. Further, printed luminous stars are printed with fluorescent ink, so that the brightness of the printed luminous stars ranges 7 magnitudes, which means the difference between the brightest printed luminous stars and darkest ones is 40 times. The intensity of the UV lump illuminating the inside of the laminate sheet is adjusted so that the brightness of the transmitted-light stars is matched with the brightness of the brightest printed luminous stars. It will be able to reproduce the brightest light emitting-element stars and darkest printed luminous stars with the difference of 25 magnitudes of the brightness, which means the brightness can be changed by 100 million times. Thus, the range of the brightness of the stars reproduced as light-emitting element stars can be smaller than those in claims 2 and 15, whereby the number of the laminated light reducing sheets is reduced, and the laminate sheet can be made more easily.

It is possible to form printed luminous stars with a narrower spatial interval than the transmitted-light stars formed by processing of the sheets for formation of through holes since the printed luminous star are formed through a printing process. The cost for one printed luminous star is lower than the cost for one transmitted-light star. With these characteristics, reproducing dark stars as printed luminous stars with average brightness lower than the average brightness of the transmitted-light stars will produce the following effects: it will enable to reproduce more neighboring stars as more inexpensive printed luminous star. Moreover, it does not needed to raise the brightness of the UV lamp because the average brightness is low, and thus the UV lamp will not excite fluorescence on the observer's clothes even in the darkness. To reproduce dark stars that are large in number, it is possible to use a fluorescent ink with low brightness in which expensive high-brightness ink is diluted with water, which leads to cost reduction.

The starry sky reproducing device according to claim 4 has the following effects in addition to the effects of claims 2, 3 and 15. The starry sky reproducing device according to claim 4 contains a projector that can project an image on a surface of the laminated sheet. By projecting explanation on the astronomical knowledges near the celestial objects observed by the observers, the explanation will help observers to learn astronomy more deeply.

Further, the projector can reproduce darker stars than the transmitted-light stars and the printed luminous stars by lowering the brightness of the projected image through lowering of the brightness of the projection light or through the use of a light reduction filter. Thereby, the device can reproduce a wider range of brightness of stars.

The device has an effect that images according to the situations can be reproduced selectively: images of, for example, gas clouds and dark stars observed with infrared radiation or x-ray can be reproduced.

The starry sky reproducing device according to claim 5 has the following effects in addition to the effects of claims 2, 3 and 15.

The starry sky reproducing device according to claim 5 contains: a display that can display an image on a surface thereof by controlling transmittance of light from a backlight panel for each pixel; and a transmitting reflection plate that enables simultaneous observation of the image on the display and the light from the laminated sheet by reflecting light from display elements producing the image and by transmitting the light from the laminated sheet. Thus, by displaying explanation on the astronomical knowledges on the surface of the display, the observers can simultaneously observe the starry sky reproduced by the starry sky reproducing device and the explanation displayed on the display. Thereby, the explanation on the astronomical knowledge can be displayed near the celestial objects observed by the observers, and the explanation will help observers to learn astronomy more deeply.

It will be possible to reproduce the starry sky with a wider range of brightness because the device can reproduce stars on the display darker than the stars reproduce as the transmitted-light stars and printed luminous stars by lowering the luminance of the display.

It will be possible to reproduce images selectively depending on the situations: images of, for example, gas clouds and dark stars observed with infrared rays or x-ray.

The starry sky reproducing device according to claim 6 has the following effects in addition to the effects of claims 2 to 5 and 15.

The starry sky reproducing device according to claim 6 contains: an approximately planar illumination panel containing transmission-light emitting elements that generate backside illumination light for the laminated sheet; and illumination panel lighting control means that can change light intensity from the illumination panel; wherein the illumination panel can illuminate a face of the laminated sheet with light of variable intensity by being disposed close to the laminated sheet. Thus, the one side of the laminated sheet can be illuminated with light having variable brightness. The starry sky reproducing device can be used in various environments with illuminating the one side of the laminated sheet with a suitable brightness, such as when environmental illumination suitable as a backlight for the laminated sheet is not available in the place where the starry sky reproducing device is settled.

It is possible to raise the limit of the magnitude of the celestial objects that can be observed through a telescope by raising the brightness of a light, even without changing the optical specification of the telescope because the brightness to illuminate the laminated sheet is adjustable. That has the same effect as the observation through a telescope which has a larger light-gathering power. The effect is that a whole dark sky can be observed in detail through cheapen inexpensive, small-diameter telescope, instead of an expensive, large-diameter telescope.

The starry sky reproducing device according to claim 7 has the following effects in addition to the effects of claim 6.

The starry sky reproducing device according to claim 7 contains laminated-sheet installation means that installs the laminated sheet on the illumination panel in an exchangeable manner. Thus, the cost for preparation of the device can be reduced because it needs only to exchange the laminate sheet for successive observation of the plural celestial objects through a telescope without installing an illumination panel for every laminated sheet individually. Furthermore, that will be efficient because the settings of the telescope such as the direction and focusing position do not need to be modified for every laminated sheet.

The starry sky reproducing device according to claim 8 has the following effects in addition to the effects of claim 2.

The starry sky reproducing device according to claim 8 contains: a base frame that the plurality of light emitting elements and the light-emitting element lighting control means are fixed to; and laminated-sheet installation means that installs the laminated sheet on the base frame in a removable manner; wherein the laminated sheet installation means is configured to align incidence ends of the optical fibers at positions facing light emitting planes of the light emitting elements according to predetermined correspondence between the light emitting elements and the optical fibers upon installation of the laminated sheet. When the device has plural laminated sheets, the light emitting elements and the light-emitting element lighting control means are not needed for every laminated sheet. So the laminated sheet can be formed inexpensively.

The starry sky reproducing device according to claim 9 has the following effects in addition to claim 2.

The starry sky reproducing device according to claim 9 contains: an approximately planar illumination panel containing transmission-light emitting elements that generate backside illumination light for the laminated sheet; and an illumination panel lighting control means that can change light intensity from the illumination panel; wherein the illumination panel can illuminate a face of the laminated sheet with light of variable intensity by being disposed close to the laminated sheet; and wherein the light-emitting element lighting control means or the illumination panel lighting control means works to achieve a predetermined balance of brightness observed by the observer between the transmitted-light stars and the light-emitting element stars. Thus, if an observer increases the brightness of transmitted-light stars to virtually increase the light-gathering power of the telescope temporarily, the device will reproduce the stars with correct brightness including the transmitted-light stars and the light-emitting element stars without distorting the balance between their magnitudes. Thereby, it is possible to observe dark celestial objects in detail even with an inexpensive small-diameter telescope.

The starry sky reproducing device according to claim 10 has the following effects in addition to the effects of claim 3.

The starry sky reproducing device according to claim 10 contains: an approximately planar illumination panel containing transmission-light emitting elements that generate backside illumination light for the laminated sheet; and an illumination panel lighting control means that can change light intensity from the illumination panel; wherein the illumination panel can illuminate a face of the laminated sheet with light of variable intensity by being disposed close to the laminated sheet; and wherein the UV-lamp lighting control means or the illumination panel lighting control means works to achieve a predetermined balance of brightness observed by the observer between the transmitted-light stars and the printed luminous stars. Thus, if an observer increases the brightness of transmitted-light stars to virtually increase the light-gathering power of the telescope temporarily, the device will reproduce the stars with correct brightness including the transmitted-light stars and the printed luminous stars without distorting the balance between their magnitudes. Thereby, it is possible to observe dark celestial objects in detail even with an inexpensive small-diameter telescope.

BRIEF DESCRIPTION OF DRAWINGS

FIG. 13 A view illustrating the printing method for the first printed luminous stars in Embodiments 1 and 2.

FIG. 14 A view illustrating the printing method for the second printed luminous stars in Embodiments 1 and 2.

FIG. 15 A data structure chart of the RAM data in the one-chip CPU in Embodiment 1.

FIG. 16 A view illustrating the mode information from the starry sky reproducing sheet related information in Embodiment 1.

FIG. 17 A view illustrating the scene information from the starry sky reproducing sheet related information in Embodiment 1.

FIG. 18 A view illustrating the luminance reference value of white-chip LEDs from the starry sky reproducing sheet related information in Embodiments 1 and 2.

FIG. 59 A view illustrating printing density of each elements on the fourth example of the laminated sheet in Embodiments 1 and 2.

FIG. 67 A view illustrating the mode information from the starry sky reproducing sheet related information in Embodiment 2.

FIG. 68 A view illustrating the scene information from the starry sky reproducing sheet related information in Embodiment 2.

FIG. 74 A view illustrating the method of assembly of the starry sky reproducing device of Embodiment 3.

FIG. 85 A view illustrating the location layout of the starry sky reproducing device and the telescope.

DESCRIPTION OF EMBODIMENTS

Figure 1:
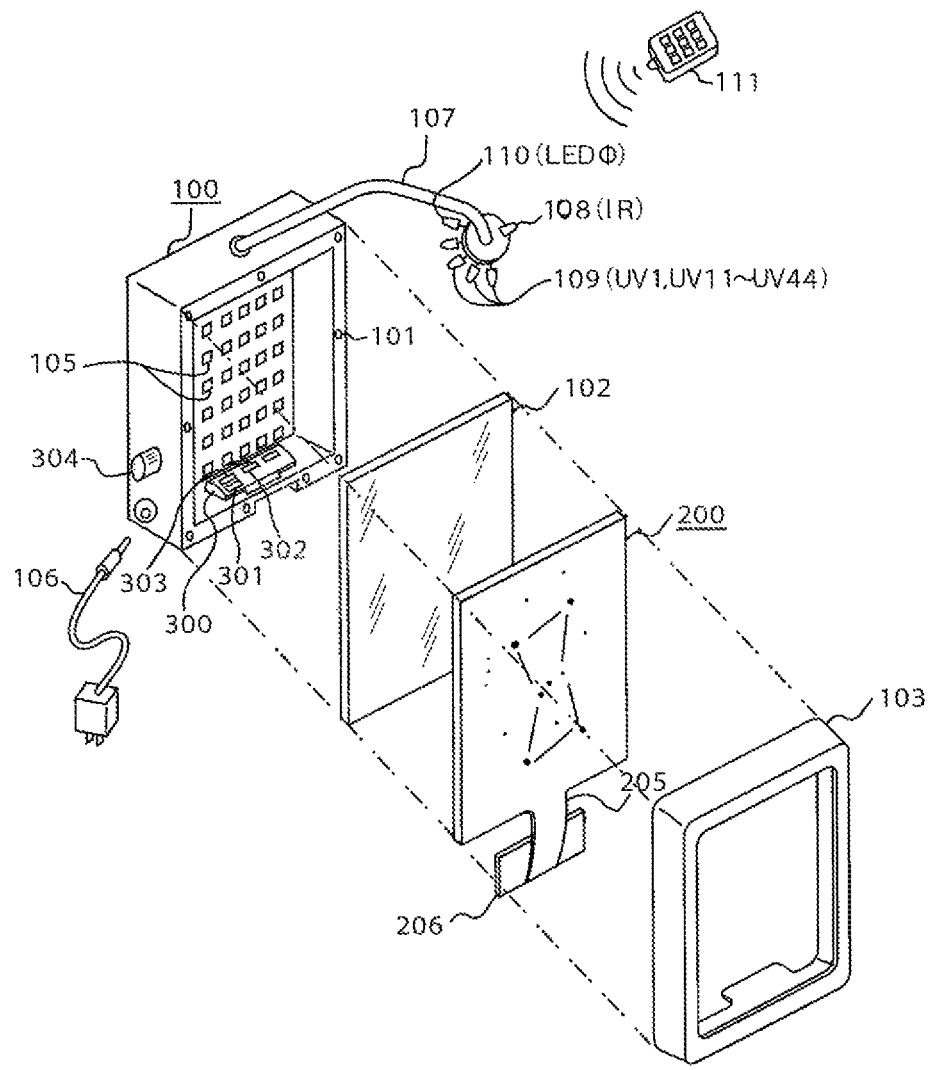
FIG. 1 An exploded perspective view showing the starry sky reproducing device of Embodiment 1.
Figure 2:
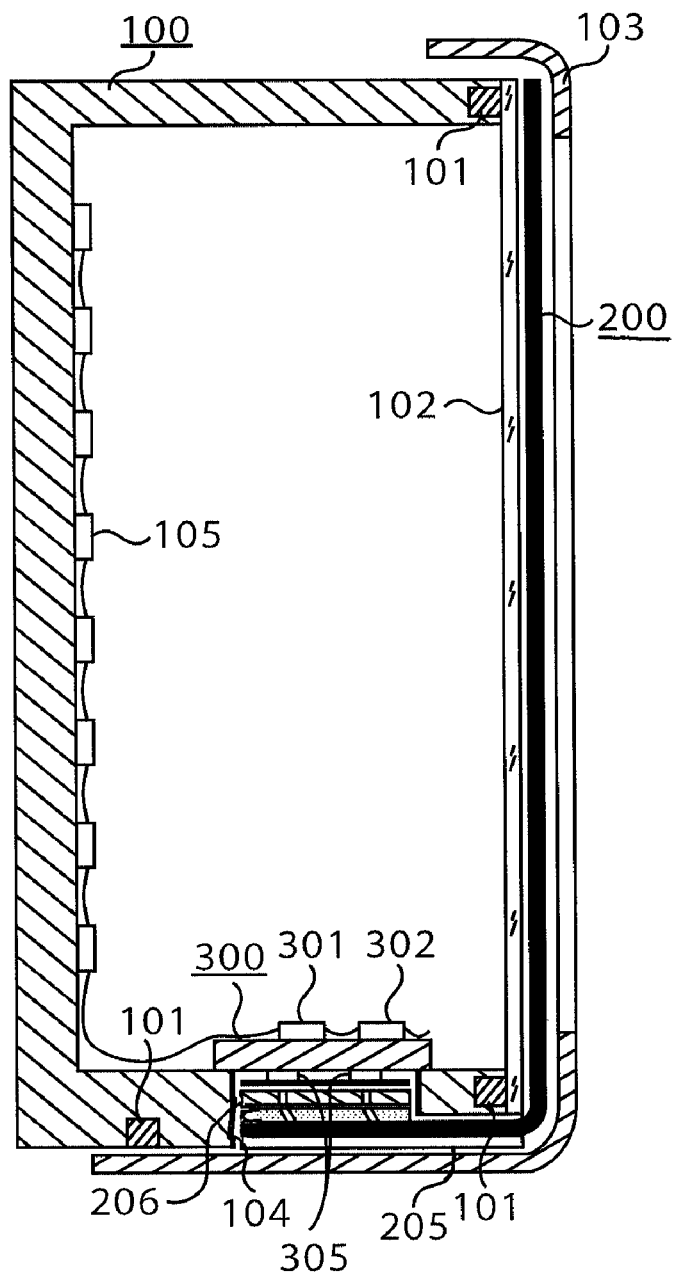
FIG. 2 A central sectional drawing of the light box in Embodiment 1.

Starry sky reproducing devices according to Embodiments 1, 2, and 3 are illustrated below. These devices are suitably used in different situations.

In Embodiment 1, a starry sky reproducing sheet 200 is installed to a light box 100 manually. In Embodiment 1, a situation is assumed where a person who has a telescope use the device indoors in daytime or outside in the night to provide observation of an artificial starry sky for children in a town. The starry sky reproducing device according to Embodiment 1 can achieve target capacities 1-4. Embodiment 1 also discloses a production method of the starry sky reproducing sheet 200 for the starry sky reproducing device 1. Furthermore, Embodiment 1 relates also to how to provide the materials essential to carry out in the production method of the starry sky reproducing device.

Embodiment 2 assumes a situation where the starry sky reproducing device is used in a conventional dome-shaped projection planetarium 4. With settling plural starry sky reproducing sheets 200, which are rolled on a drum 11, on a light box 100 automatically, an observation program is provided in which observers are able to observe plural starry skies through telescopes and cameras. In Embodiment 2, every observer's previous experience of astronomical observation and previous experience with the starry sky reproducing device can be referred to and recorded, whereby the effect brought about by the device is increased, and suitable observation experience of starry skies can be provided to every observer. The observation program consists of 5 sections.

The 1st section provides astronomical observation to observe constellations and paths of stars with naked eyes. The 2nd section provides detailed observation of a specific constellation through binoculars. The 3rd section provides detailed observation of galaxies and star clusters which are in a narrow area in the celestial space with operation of a telescope. The 4th section provides photographic observation of dark stars and stars having wavelengths which are unable to be observed through naked eyes, with cameras which settled on astronomical telescopes. Lastly, the 5th section provides observation of the moon and planets.

Embodiment 3 use an assembly air dome to provide starry sky observation at schools where do not have planetarium in the town.

Embodiment 1

This section describes Embodiment 1 by referring to FIGS. 1-21. Corresponding elements based on the same technical idea are indicated by same reference numerals in the figures including those which explain Embodiments 2 and 3 mentioned below.

Plural magnets 101 are embedded at the edge face at the opening of a box-shaped light box 100. A transparent plate 102 is fixed on the light box 100 covering the opening of the box 100. A frame-shaped installation frame 103 made of iron which covers the periphery of the transparent plate 102 is attracted to the light box 100 by attractive force of the magnets 101. The installation frame 103 is shaped so that the light passing the transparent plate 102 can not be leaked out of the frame 103.

A starry sky reproducing sheet 200 is set between the transparent plate 102 and the installation frame 103, and is held by the attractive force of the magnets 101. The attractive force of the magnets 101 is set appropriately so that users can take off the installation frame 103 and exchange the starry sky reproducing sheet 200.

A body board 300 is set inside the bottom plate of the light box 100. The body board 300 is contains a one-chip CPU 301, an LED driving IC 302 and a power supply IC 303. When a voltage is applied by an external power supply 106, the one-chip CPU 301 is reset and a program which has been recorded in the internal ROM in advance starts. Detailed explanation about the operation of the one-chip CPU 301 as a microprocessor is omitted because it is commonly used. The configuration of variables recorded in the ROM and the operation of the program recorded in the ROM will be illustrated later.

Figure 3:
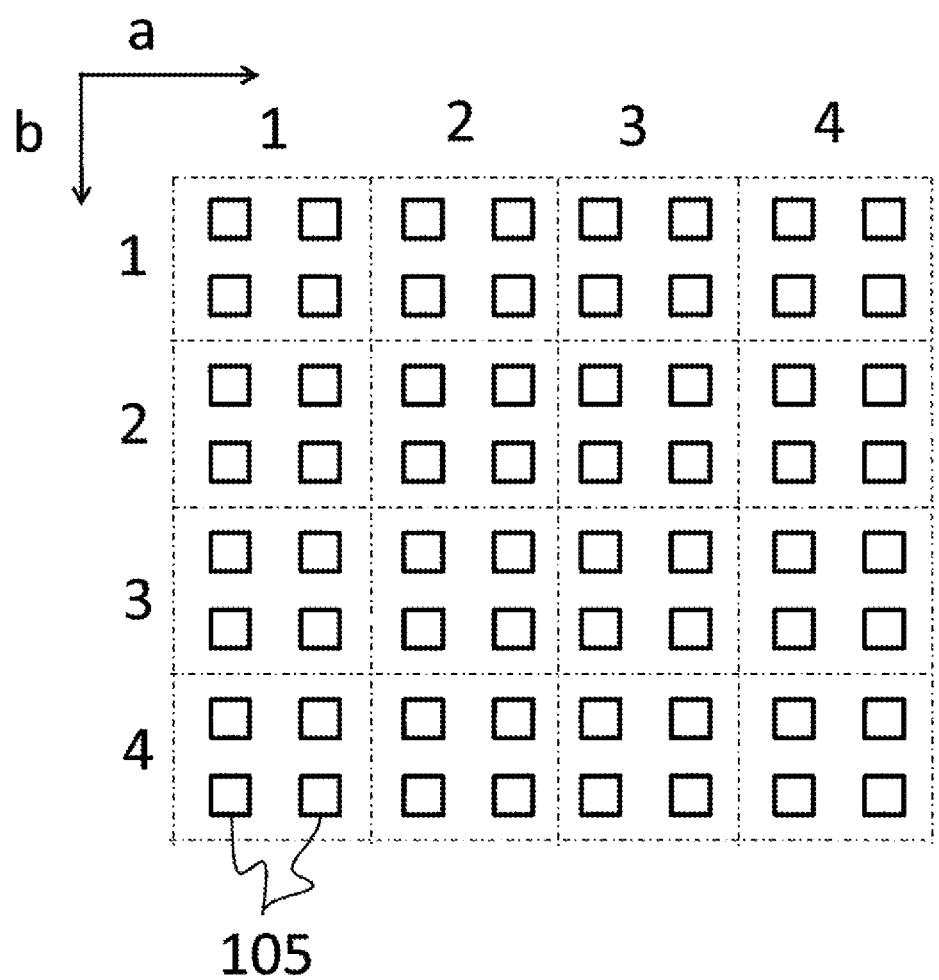
FIG. 3 A view illustrating the arrangement of backlight LEDs in Embodiments 1 and 2.

As shown in FIG. 3, 64 backlight LEDs 105 are attached in an eight-by-eight matrix on the inside surface of the light box 100 opposite to the transparent plate 102. The LEDs forms 16 square units, which are arranged in four columns in the a-direction and in four rows in the b-direction as shown in the figure. Each of the square units consists of four LEDs 105 in a two-by-two matrix. Each of the 64 backlight LEDs 105 is denoted by a value among 1-4 in the a-direction, a value among 1-4 in the b-direction and a serial number within each unit, like "LED 123" in this specification.

The backlight LEDs 105 are connected to the body board 300. The one-chip CPU 301 controls lighting of the backlight LEDs 105 included in each unit by the LED driving IC 302 by a PWM control by which the intensity of the LEDs 105 are varied. The one-chip CPU 301 reproduces natural twinkling of stars by increasing and decreasing brightness of the 16 units of the LEDs 105 at different timing and performs a highlight indication by selectively lighting up a part of the units brightly. Though the backlight is composed of the backlight LEDs 105 and the LED drive IC 302 in the present embodiment, the backlight can be composed of an organic EL driver IC and organic EL elements which emit light in a planar manner. In that case, it is possible to make the distance between the organic EL elements and the transparent plate 102 as small as they are almost in contact with each other because the organic EL elements emit light in a planar manner. Consequently, the light box 100 can be made thinner and it can be hung on a wall as an interior decoration when it is not used for astronomical observation.

Moreover, a UV lamp 109 which contains multiple ultraviolet LEDs is fixed on the end portion of a lamp arm 107 which protrudes from the top surface of the light box 100. The UV lamp 109 contains one wide-angle UV lamp (UV1) which irradiates the whole area (U) where stars are reproduced on the starry sky reproducing sheet 200 widely and 16 narrow-angle UV lamps (UV11-44) which irradiate 16 areas (U11-44) of the starry sky reproducing sheet 200 individually. The starry sky reproducing sheet 200 is divided into the 16 areas in a four-by-four matrix, namely, the 16 areas are arranged in four columns in the a-direction and in four rows in the b-direction as shown in the figure. They are denoted as U11-44, by a value among 1-4 in the a-direction and a value among 1-4 in the b-direction.

The one-chip CPU 301 controls lighting of the wide-angle UV lamp (UV1) and the narrow-angle UV lamps (UV11-44) by the LED driving IC 302 by a PWM control. Thus, ultraviolet rays irradiate the entire surface of the starry sky reproducing sheet 200 and the 16 areas at given illuminances. Further, the area corresponding to each of the units of the backlight LEDs 105 and each of the irradiation areas of the narrow-angle UV lamps are set identical when viewed from the front. It is preferable that the ultraviolet LEDs should have a visible-light cut-off filter to cut visible-light leakage, whereby the starry sky does not become bright excessively.

Further, an infrared sensor 108 (IR) is fixed on the end portion of the lamp arm 107. If the infrared sensor 108 receives an infrared signal which emitted from an infrared remote controller 111 having multiple input keys ("0"-"9", "+", and "−"), the signal is input into the one-chip CPU 301 in the body board 300 and predetermined operation corresponding to the operation key is started.

A light pollution lamp 110 (LED 0) which reproduces the brightness of the sky in the city by irradiating the entire surface of the starry sky reproducing sheet 200 faintly is also fixed on the end portion of the lamp arm 107. In the same manner as the backlight LEDs 105, the light pollution lamp 110 is connected to the body board 300 and the lighting thereof is controlled by the one-chip CPU 301 and the LED driving IC 302.

A brightness adjusting volume controller 304 is fixed on the side of the light box 100. The brightness adjusting volume controller 304 is connected to the body board 300 and its set value is input to the one-chip CPU 301 through an A/D converter contained the one-chip CPU 301.

An illuminance sensor 307 which measures brightness in the surrounding is fixed on the side of the light box 100. The illuminance sensor 307 is connected to the body board 300 and its measured value is input to the one-chip 301 through the A/D converter contained in the one-chip CPU 301. Then, the measured value can be reflected to the control of the starry sky reproducing device 1 such as preventing unintended operation in the daytime.

Eight white-chip LEDs 305 (LED1-LED8) are fixed at the bottom of the body board 300. The one-chip CPU 301 controls lighting of each white-chip LED 305 independently by a PWM control by the LED driving IC 302. The light emitting surfaces of the white-chip LEDs 305 are exposed outside from the LED opening window 104 which is formed at the bottom of the light box 100.

Four contact probes 306a-306d are also fixed at the bottom of the body board 300. The contact probe 306a is connected to a +5V power source and the contact probe 306b is connected to the ground. The contact probe 306c is connected to an SD signal source of the one-chip CPU 301 for data transmission. The contact probe 306d is connected to an SA signal source of the one-chip CPU 301 for data transmission. The end portions of the contact probes 306a-306d are exposed outside from the LED opening window 104 which is formed at the bottom of the light box together with the white-chip LEDs 305. The end portions are brought into contact with contact pads 209a to 209d on the contact board 206, which is described below, and the one-chip CPU 301 reads information about the starry sky reproducing sheet 200 recorded in a nonvolatile memory 208 when the starry sky reproducing sheet 200 is installed.

The white-chip LEDs 305 correspond to the light emitting elements contained in claim 2. The one-chip CPU 301, the LED driving IC 302, and the function implemented by the program which is described below correspond to the light-emitting element lighting control means contained in claim 2.

The UV lamps 109 correspond to the UV lamp contained in claim 3. The one-chip CPU 301, the LED driving IC 302, and the function implemented by the program which will be described below correspond to the UV-lamp lighting control means contained in claim 3.

The light box 100 corresponds to the illumination panel contained in claim 6. Specifically, the backlight LEDs 105 correspond to the transmission-light emitting elements contained in claim 6. The one-chip CPU 301, the LED driving IC 302, and the function controlling lighting of the backlight LEDs 105 by the program which will be described below correspond to the illumination panel lighting control means contained in claim 6.

The set of the transparent plate 102 and the light box 100 containing the body board 300 and the white-chip LEDs 305 corresponds to the base frame contained in claim 8. The set of the magnets 101, the installation frame 103, and the LED opening window 104 formed on the light box 100 corresponds to the sheet installation means contained in claim 8.

Figure 8:
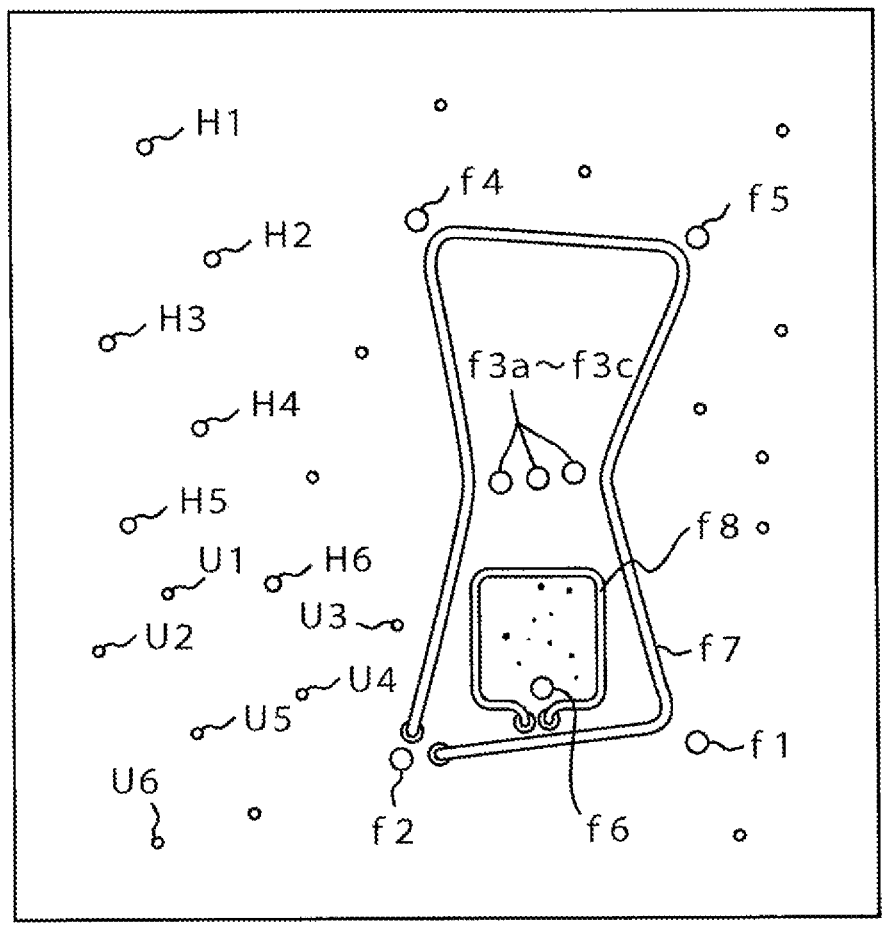
FIG. 8 A view illustrating the stars and line connecting the stars in the constellation on the starry sky reproducing sheet of Embodiment 1.
Figure 9:
FIG. 9 An enlarged drawing illustrating the area which is highlighted on the starry sky reproducing sheet of Embodiment 1.

Next, explanation on the starry sky reproducing sheet 200 is presented with reference to FIG. 5-10. The starry sky reproducing sheet 220 in this embodiment, as shown in FIG. 8, reproduces the Orion, which is a representative constellation in winter. The Orion nebula shown in FIG. 9 is especially introduced in an explanation program as a suitable area to be observe with an astronomical telescope.

The starry sky reproducing sheet 200 is attachable to and detachable from the light box 100. A user selects one of the plural starry sky reproducing sheets 200 that reproduce various areas of the starry skies and installs it on the light box 100. In the present embodiment, a starry sky reproducing sheet of the Orion is used; however, starry sky reproducing sheets reproducing other constellations are used in the same way. The side of the starry sky reproducing sheet 200 facing the transparent plate 102 is defined as the outside, and the opposite side facing toward the observer is defined as the inside. The same applies to following explanations of the other embodiments.

A fiber integrating part 205 collecting the end portions of plural plastic optical fibers 230 (f1-f8) is formed under the starry sky reproducing sheet 200. A contact board 206 is attached to a fiber integrating part 205 with elastic rubber adhesive 207. Plural optical-fiber insertion holes 212 are formed on the contact board 206. End portions of the plastic optical fibers 230 are inserted and fixed in the holes 212.

In the starry sky reproducing sheet of the Orion in this embodiment, the plastic optical fibers f1-f6 are used to reproduce the major stars having magnitudes of 0.18-2.75 and composing the Orion. Among them, the plastic optical fiber f3 branches to three plastic optical fibers f3a-f3c at the branching point 231 on the midway, and they reproduce three stars having approximately the same brightness and located near the belt of the Orion.

The plastic optical fibers f1-f6 are laid on the outside surface of the starry sky reproducing sheet 200 from the fiber integrating part 205 to the positions of individual stars. The fibers f1-f6 are put into the inside of the starry sky reproducing sheet 200 at the positions of individual stars through the through holes made on the starry sky reproducing sheet 200. Further, the fibers f1-f6 are fixed to the sheet 200 at the outside of the through holes with transparent adhesive, with the edge surfaces of the fibers f1-f6 exposed to the inside.

The plastic optical fiber f7 is used to display the lines connecting the stars in the constellation for indicating the shape of the Orion. The plastic optical fiber f8 is used to display the line indicating a specific area to be observed with magnified by an astronomical telescope.

The plastic optical fiber 230 is distinguished from a glass optical fiber in that the light leaks at a certain rate from the linear light guiding part. The leaking rate can be adjusted by processing on the surface such as by scratching. With regard to the plastic optical fibers f1-f6 to reproduce stars, the amounts of the leaking light are set to zero. With regard to the plastic optical fibers f7 and f8 to be used as the light-emitting lines, the amounts of the leaking light are increased so that the fibers emit light in the linear shape.

The routes along which the plastic optical fibers f7 and f8 are mounted are as follows: first, the plastic optical fibers f7 and f8 are laid on the outside surface of the starry sky reproducing sheet 200. Second, they are put into the inside of the starry sky reproducing sheet 200 through the through holes. Third, they are laid on the inside surface along prescribed routes. Fourth, they return to the outside of the starry sky reproducing sheet 200 through the through holes again. By setting such routes repeatedly, even discontinuous lines can be reproduced with the fibers. The terminal edges of the fibers are put out on the outside of the starry sky reproducing sheet 200 not to be conspicuous. Among the plastic optical fibers, fibers f1-f6 correspond to the optical fibers contained in claim 2.

Further, a star filter 210 made of transparent resin is fixed under the contact board 206. Printed filters 211 corresponding to the colors of the stars and the lines connecting the stars in the constellation which are to be reproduced with the plastic optical fibers 230 are formed on the surface of the star filter 210 beneath the optical-fiber insertion holes 212.

When the starry sky reproducing sheet 200 is installed to the light box 100, the fiber integrating part 205 is bended at a right angle with respect to the surface of the starry sky reproducing sheet 200, and held between the light emitting surfaces of the white-chip LEDs 305 and the installation frame 103. The peripheral edges of the contact board 206 are fitted on and positioned by the wall edges of the LED opening window 104 on the undersurface of the light box 100.

Thus, each edge surfaces of the plural plastic optical fibers 230 are located respectively at positions facing the light emitting surface of the white-chip LEDs 305. Further, the end portions of the contact probes 306a to 306d of the body board 300 are brought into contact with the contact pads 209a to 209d of the contact board 206 respectively, and they provide electric contacts therebetween.

Since the starry sky reproducing sheet 200 has the above-described structure, when the starry sky reproducing sheet 200 is installed to the light box 100 and the white-chip LEDs 305 are turned on, the light emitted from the light emitting surfaces of the white-chip LEDs 305 is colored by the printed filters 211 of the star filter 210, and then enter the edge surfaces of the plastic optical fibers 230 fixed to the optical-fiber insertion holes 212. The beams which have entered the edge surfaces are guided in the optical fibers 230. Among them, with respect to the fibers f1-f6, beams are emitted from the other edge surfaces of the plastic optical fibers 230 at the positions of the stars in the constellation, to be observed as point-shaped light-emitting element stars. With respect to the fibers f7 and f8 the light leaking from the parts of the fibers laying on the inside surface of the starry sky reproducing sheet 200 is observed as linear light-emitting lines. The light-emitting element stars reproduced by the fibers f1-f6 correspond to the light-emitting element stars contained in claim 2.

Figure 5:
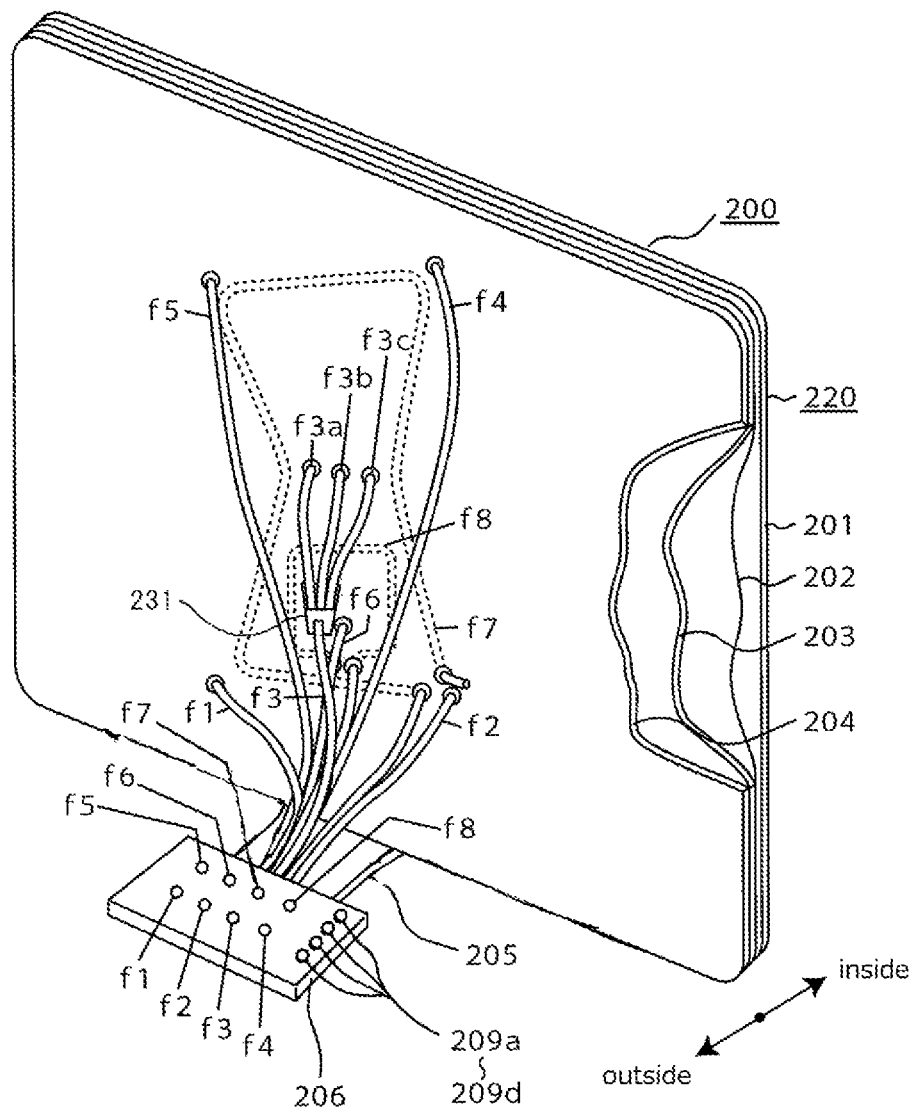
FIG. 5 A perspective diagram from the back side of the starry sky reproducing sheet of Embodiment 1.
Figure 6:
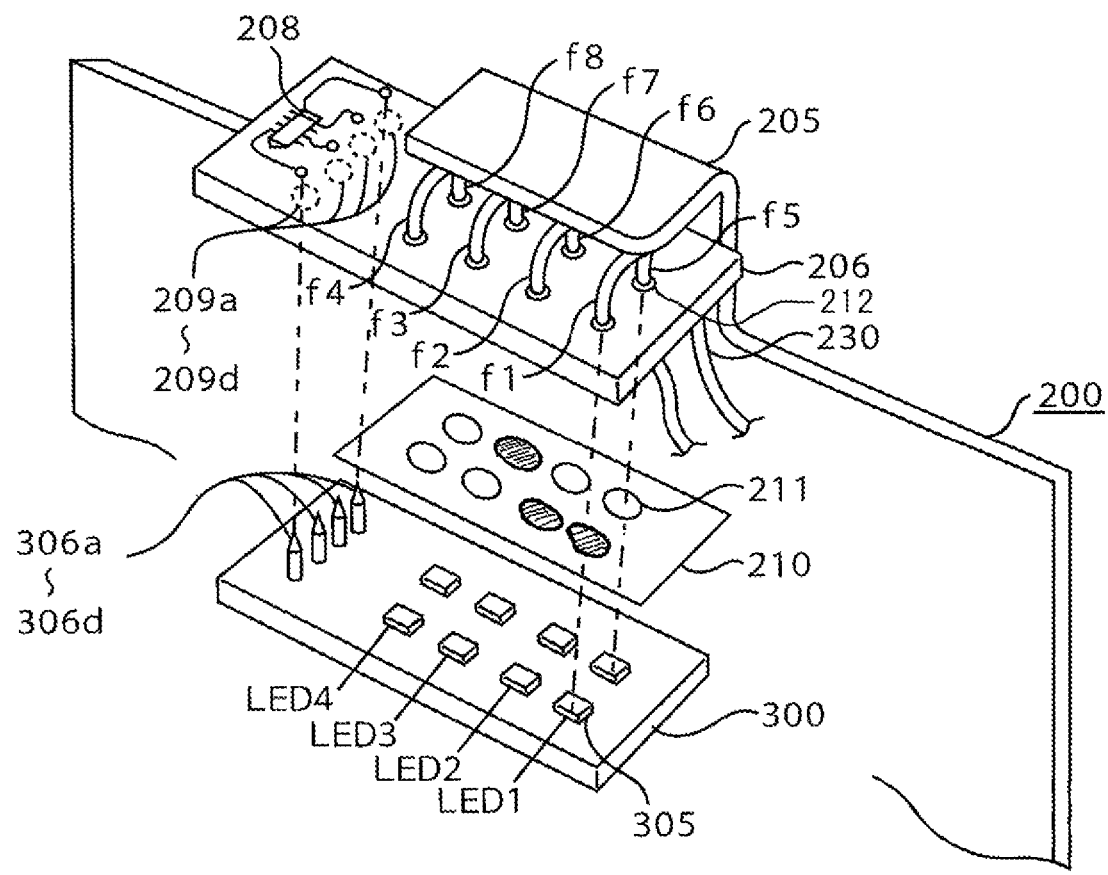
FIG. 6 A detailed drawing of the contact board and the body board in Embodiment 1.
Figure 7:
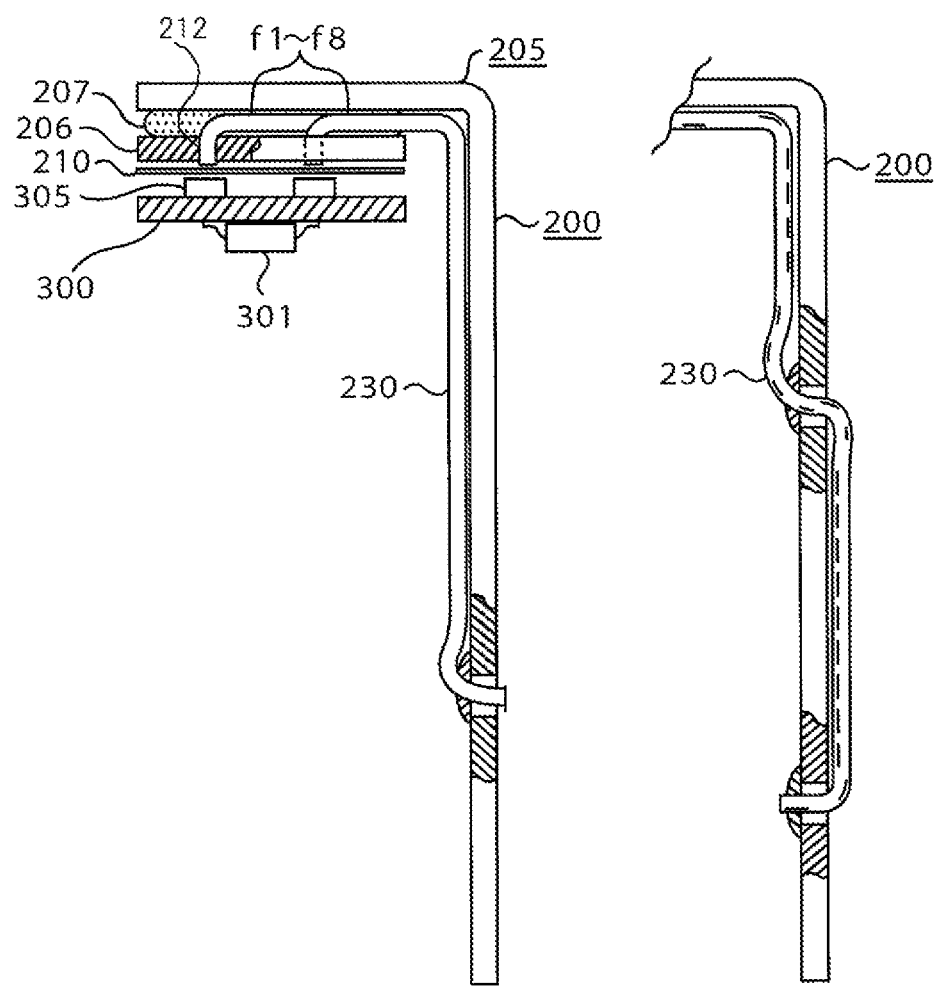
FIG. 7 A partial cross section illustrating the positional relationship of the contact board and the body board when the starry sky reproducing sheet is installed to the device of Embodiment 1.

The laminated sheet 220 of the starry sky reproducing sheet 200 has a laminate structure shown in the partial cross section in FIG. 5. From the inside to the outside, a 1st paper layer 201, an aluminum foil layer 202, a 2nd paper layer 203, and a 3rd paper layer 204 are laminated and stuck together with flame retardant glues.

The 1st paper layer 201, the 2nd paper layer 203, and the 3rd paper layer 204 are respectively about 0.15-mm thick white flame retardant paper sheets, and have self-extinguishing property by containing aluminum hydroxide. In this embodiment, the light transmittance of the paper is about 16%, which corresponds to a light reduction effect of two magnitudes. Among the layers, at least the 1st paper layer 201 desirably includes no fluorescent materials which emit light by ultraviolet irradiation. The aluminum foil layer 202 desirably has a thickness about nine micrometers so that the transmittance thereof is 0% and the layer 202 can block off the light perfectly.

The 1st paper layer 201, the aluminum foil layer 202, the 2nd paper layer 203, and the 3rd paper layer 204 correspond to the light reducing sheets contained in claim 1. Embodiment 1 corresponds to a case in which claim 1 is realized with N=4.

As shown in FIG. 8, many holes are made on the laminated sheet 220 to reproduce 3rd to 4th magnitude stars (H1) through 8th to 9th magnitude stars (H6) contained in the starry sky to be reproduce (the Orion in this embodiment). These holes are classified into three groups depending on which layers each hole passes through, among the 1st paper layer 201, the aluminum foil layer 202, the 2nd paper layer 203, and the 3rd paper layer 204. Specifically, the holes for the 3rd to 4th magnitude stars (H1) and those for the 4th to 5th magnitude stars (H2) belong to the 3rd group; the holes for the 5th to 6th magnitude stars (H3) and those for the 6th to 7th magnitude stars (H4) belong to the 2nd group; and the holes for the 7th to 8th magnitude stars (H5) and those for the 8th to 9th magnitude stars (H6) belong to the 1st group. Among these, the holes H1, H3, and H5 are respectively 0.3 mm in diameter. The holes H2, H4, and H6 are respectively 0.19 mm in diameter. The area ratio between the two sizes of holes is 2.51, whereby the holes belonging to the same group produces difference of one magnitude by the difference of the diameters.

Figure 10:
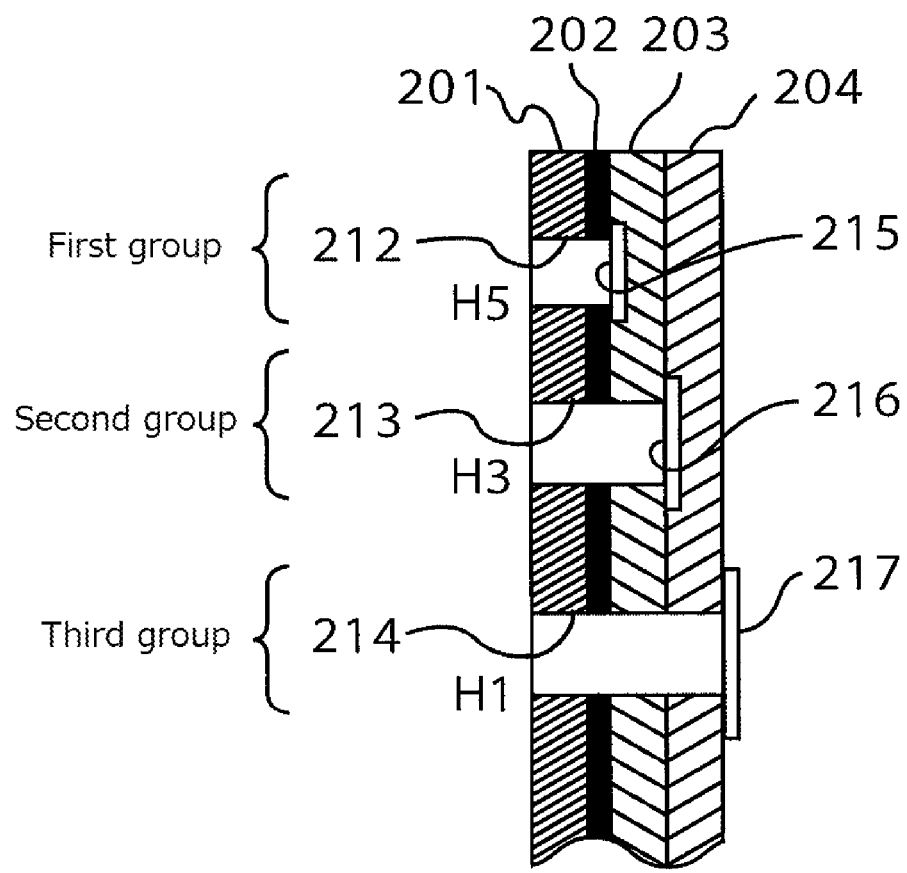
FIG. 10 A cross section illustrating the laminated sheets in Embodiments 1 and 2.
Figure 11:
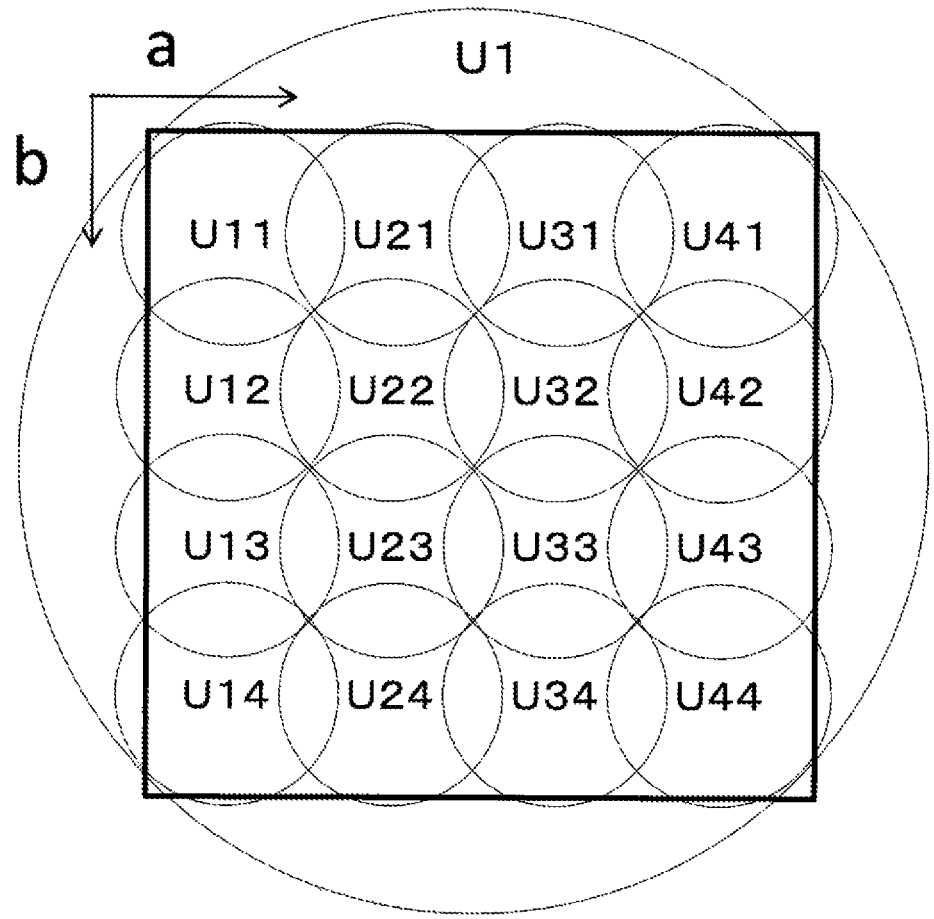
FIG. 11 A view illustrating the area which is irradiated with the UV lamp in Embodiments 1 and 2.

FIG. 10 is a cross section of the laminated sheet 220 which shows what kind of structure the holes H1, H3 and H5 have. Holes 212 in the 1st group pass through the 1st paper layer 201 and the aluminum foil layer 202. Holes 213 in the 2nd group pass through the 1st paper layer 201, the aluminum foil layer 202, and the 2nd paper layer 203. Holes 214 in the 3rd group pass through the 1st paper layer 201, the aluminum foil layer 202, the 2nd paper layer 203, and the 3rd paper layer 204. On the surface of the 2nd paper layer 203, 1st filter printings 215 having prescribed colors are formed around the axes of the holes 212 in the 1st group, covering the holes 212 in the 1st group. The 1st filter printings 215 give the prescribed colors to the light which passes along the axes of the holes 212 in the 1st group.

In the same way, on the surface of the 3rd paper layer 204, 2nd filter printings 216 having prescribed colors are formed around the axes of the holes 213 in the 2nd group covering the holes 213 in the 2nd group. The 2nd filter printings 216 give the prescribed colors to the light which passes along the axes of the holes 213 in the 2nd group.

In the same way, filter seals 217 are stuck on the 3rd paper layer 204, covering the holes 214 in the 3rd group formed on the 3rd paper layer 204. The filter seals 217 give prescribed colors to the light which passes along the axes of the holes 214 in the 3rd group.

Then, the method to make these holes is explained. After the 1st paper layer 201 and the aluminum foil layer 202 are stuck to each other, the holes 212 in the 1st group are made by insertion or penetration of processing needles having prescribed diameters from either the surface of the 1st paper layer 201 or the surface of the aluminum foil layer 202 with drilling apparatus, which is not illustrated in figures.

Further, after the holes 212 in the 1st group are made and the 2nd paper layer 203 is stuck to the aluminum foil layer 202, the holes 213 in the 2nd group are made by insertion or penetration of processing needles having prescribed diameters from either the surface of the 1st paper layer 201 or the surface of the 2nd paper layer 203 with the drilling apparatus.

Further, after the holes 213 in the second group are made and the 3rd paper layer 204 is stuck to the 2nd paper layer 203, the holes 214 in the 3rd group are made by insertion or penetration of processing needles having prescribed diameters from either the surface of the 1st paper layer 201 or the surface of the 3rd paper layer 204 with the drilling apparatus.

The holes 212 in the 1st group, the holes 213 in the 2nd group, and the holes 214 in the 3rd group are respectively classified based on the colors of the stars to be reproduced by the holes. During the formation of the holes in each of the groups, all holes corresponding to a same color may be formed first, and then coloring paint may be introduced from the surface of the 1st paper layer 201 to fill the holes corresponding to the same color.

Further, a protective coating which has optical transparency and protects a surface against dew condensation and oxidation may be applied to all over the surface of the 1st paper layer 201 after making the holes 214 in the 3rd group. A part of the protective coating fills the holes, and thus forms light guiding paths which guide the light after dried. The protective coating prevents the layers from being separated when bonding between the layers is incomplete, and also prevents the formed holes from getting smaller as time goes on to keep the brightness of the stars.

The light emitted from the backlight LEDs 105 reaches the surface of the 3rd paper layer 204 and passes along the axes of the holes 212 in the 1st group, the holes 213 in the 2nd group, and the holes 214 in the 3rd group, and it passes the holes penetrating the layers or the light guiding paths. Then, the light is emitted from the holes opened in the 1st paper layer 201, and finally reaches the observer's eyes.

While the light thus passes the elements of the sheet 220, such as the paper sheets and filters, through the holes, the light is subjected to the light reduction and the coloring effects of the elements. Thus, the light is observed by the observer as the transmitted-light stars having various colors and brightnesses.

Specifically, when the transmitted-light stars reproduced by the holes H1 is set as a standard, the holes H2 attenuate the light by the magnitude of +1 due to the difference in diameter. The holes H3 attenuate the light by the magnitude of +2 due to the light reduction by the 3rd paper layer 204, although the holes H3 have the same diameter as the holes H1. The holes H4 attenuate the light by the magnitude of +3 in total due to the difference in diameter and the light reduction by the 3rd paper layer 204. The holes H5 attenuate the light by the magnitude of +4 due to the light reduction by the 2nd paper layer 203 and the 3rd paper layer 204, although the holes H5 have the same diameter as the holes H1. The holes H6 attenuate the light by the magnitude of +5 in total due the difference in the diameter from the holes H5. The transmitted-light stars produced by the holes correspond to the transmitted-light stars contained in above-described Claims.

Here, the laminated sheet 220 in the embodiment described above corresponds to the starry sky reproducing sheet contained in claim 1 with N=4. The holes 212 in the 1st group correspond to the L-layer transmission holes with L=2 (two layers: the 1st paper layer 201 and the aluminum foil layer 202). The holes 213 in the 2nd group correspond to the M-layer transmission holes with M=3 (three layers: the 1st paper layer 201, the aluminum foil layer 202 and the 2nd paper layer 203). The lights passing along the axis of the holes 212 in the 1st group and the holes 213 in the 2nd group correspond to the L-layer transmitted beams and the M-layer transmitted beams, respectively.

The values of N, L, and M are not limited to those adopted in this embodiment. For example, when N=6 is adopted, the stars having wider range of magnitude can be reproduced as transmitted-light stars formed with the use of five paper layers, including transmitted-light star in the 1st to 5th groups.

Figure 54:
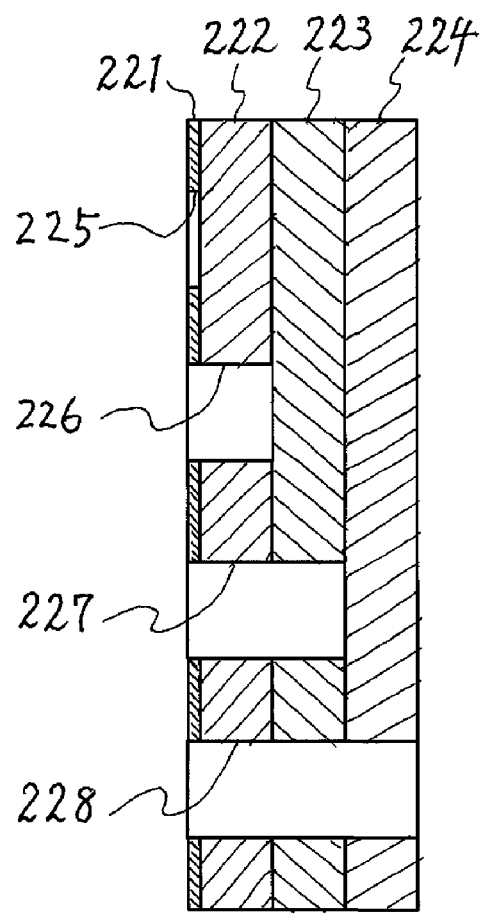
FIG. 54 A cross section illustrating the second example of the laminated sheet in Embodiments 1 and 2.

Further, in this embodiment, the starry sky reproducing sheet 200 contains the 1st paper layer 201, the aluminum foil layer 202, the 2nd paper layer 203, and the 3rd paper layer 204, laminated in this order from the inside; however the laminated structure is not limited thereto. FIG. 54 shows a cross section of a 2nd example of the laminated sheet 220. The laminated sheet 220 contains the aluminum foil layer 221, the 1st paper layer 222, the 2nd paper layer 223 and the 3rd paper layer, laminated in this order from the inside. Minute light transmitting holes 225 may be made on the aluminum foil layer 221 in advance by etching, for example, whereby the laminated sheet 220 may be made efficiently because the drilling process can be omitted. The aluminum foil layer 221 may be a laminate material made of a transparent PET film and an aluminum foil. If light transmission holes are made by etching on the aluminum foil, the holes work as light transmitting paths through which light passes.

There are plural methods to make the minute light transmission holes 225 in the aluminum foil layer 221 by etching. In the first method, the holes can be made by applying a liquid containing an etching agent, which can cause chemical reaction with aluminum and remove aluminum, onto the surface of the aluminum foil layer 221 with the use of an ink-jet printer, and thus by removing aluminum in the printed area through etching. In the second method, for formation of the holes, a resist layer is formed by application of a resist material, which does not react to an etching agent, onto the surface of the aluminum foil layer 221. Then, a liquid containing a material which can cause chemical reaction with the resist material and remove a part of the resist layer is applied onto the resist layer with the use of an ink-jet printer, whereby the resist material in the printed area is removed. Further, aluminum in the area where the resist material has been removed is removed by soaking the aluminum foil layer 221 in a liquid containing the etching agent.

In the methods making the light-transmission holes 225 in the aluminum foil by etching, the holes are made not through a mechanical process but through an etching process, and therefore the method is suitable for making many minute holes. The laminated sheet 220 in this second example corresponds to the laminated sheet contained claim 1 with N=4. The holes 225 correspond to the L-layer transmission holes with L=1 (one layer: the aluminum foil layer 221). The holes 226 correspond to the M-L-layer transmission holes with M=2 (two layers: the aluminum foil layer 221 and the 1st paper layer 222). The light passing along the axes of the holes 225 and 226 correspond to the L-layer transmitted beams and M-layer transmitted beams, respectively.

Figure 55:
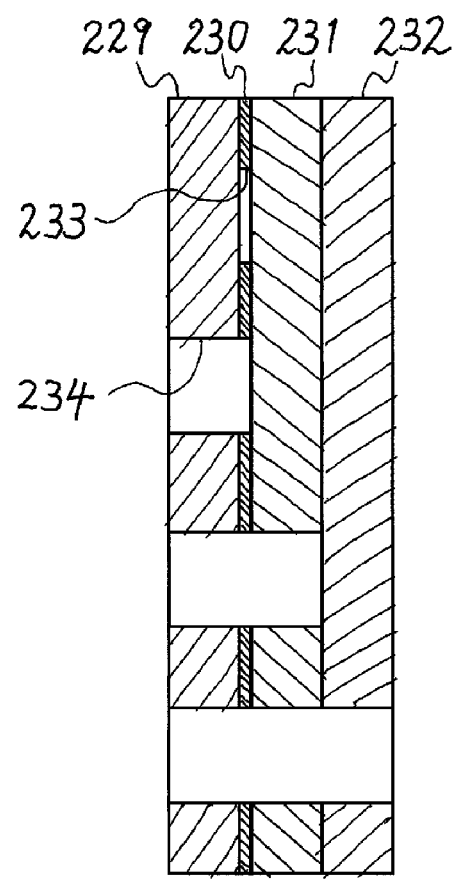
FIG. 55 A cross section illustrating the third example of the laminated sheet in Embodiments 1 and 2.

FIG. 55 shows a cross section of a 3rd example of the laminated sheet 220. The laminated sheet 220 contains the 1st paper layer 229, the aluminum foil layer 230, the 2nd paper layer 231 and the 3rd paper layer 232, laminated in this order from the inside. Minute light-transmission holes 233 may be formed in the aluminum foil layer 230 by, for example, etching in advance. In this case, the light passing through the holes 233 is subjected to the highest light reduction by the layers, and is diffused by the 1st paper layer 229 after passing through the holes 233 unlike the light passing through other light-transmission holes 234 penetrating the layers to the inside of the laminated sheet 220. Thus, the light passing the holes 233 is suitable for reproducing the celestial objects not observed as stellar-shaped objects, like diffuse nebulas.

The laminated sheet 220 according to any of the above-described three examples reproduces a dark background of the starry sky by the aluminum foil (202, 221, or 230) which block off the light perfectly. However, the present invention is not limited thereto; a metal foil other than the aluminum foil and/or a sheet that has a black printed layer having sufficiently low light transmittance on the surface thereof may be used to reproduce the dark background of the starry sky.

Figure 56:
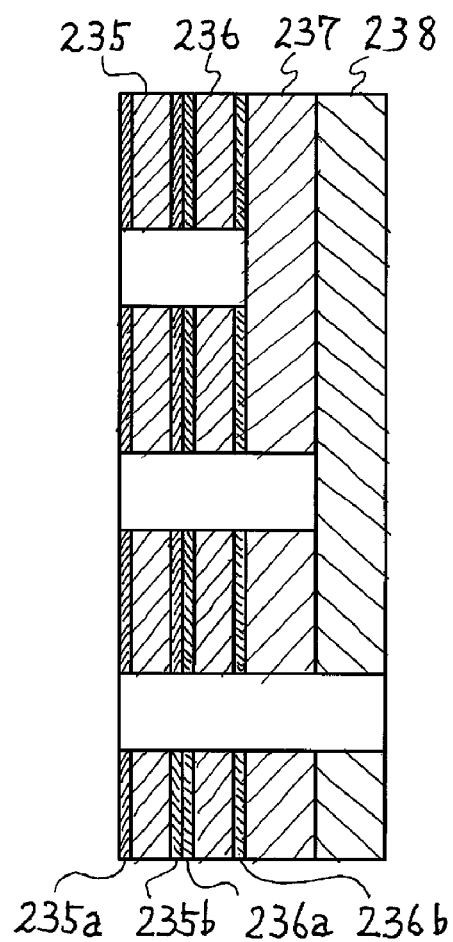
FIG. 56 A cross section illustrating the fourth example of the laminated sheet in Embodiments 1 and 2.

FIG. 56 shows a cross section of a 4th example of the laminated sheet. In this example, sheets having, on the surfaces thereof, black layers having sufficiently low light transmittance of about 5% are used. The laminated sheet 220 contains a 1st paper layer 235, a 2nd paper layer 236, a 3rd paper layer 237, and a 4th paper layer 238, laminated in this order from the inside. A 1st light shielding print 235a is printed on the inside surface of the 1st paper layer 235, and the 2nd light shielding print 235b is printed on the outside surface of the 1st paper layer 235. The 3rd light shielding print 236a is printed on the inside surface of the 2nd paper layer 236, and the 4th light shielding print is printed on the outside surface of the 2nd paper layer 236. The total transmittance of the laminated sheet 220 is determined by, in addition to the transmittances of the material of the paper layers 235-238 (16%), the transmittance of the four shielding prints 235a-235d.

Figure 57:
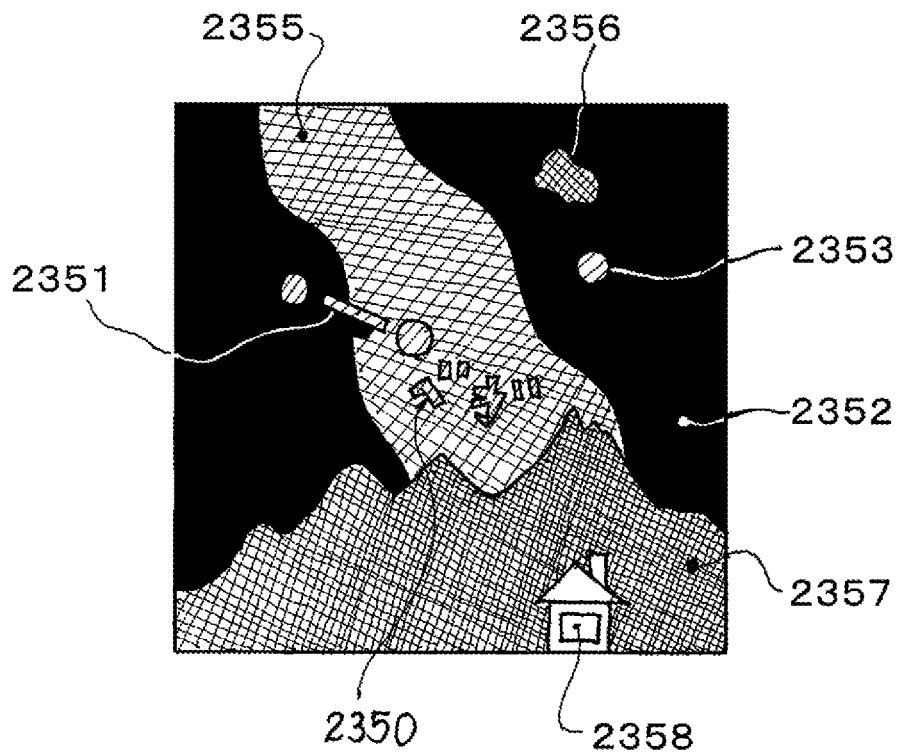
FIG. 57 A view illustrating the fourth example of the laminated sheet in Embodiments 1 and 2, observed with the indoor light.
Figure 58:
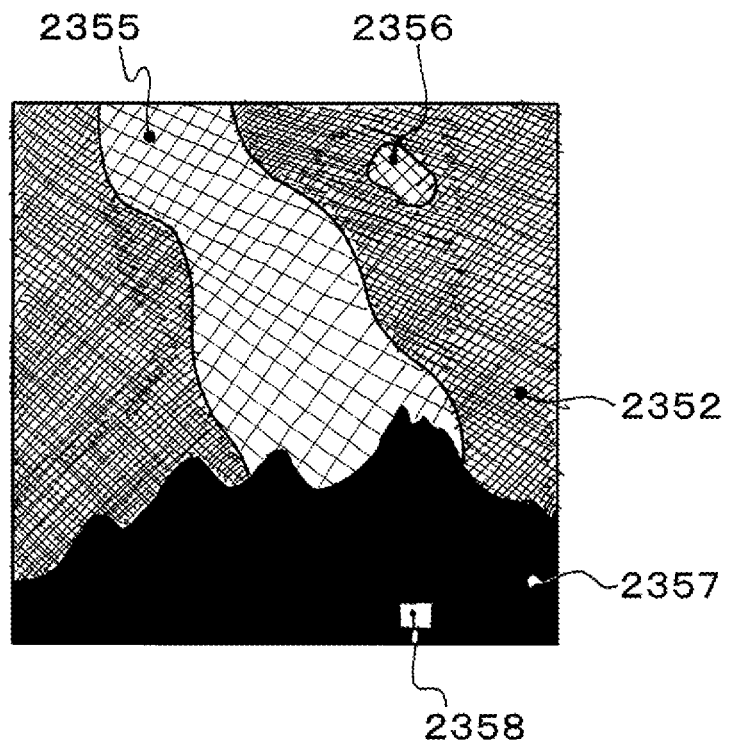
FIG. 58 A view illustrating the fourth example of the laminated sheet in Embodiments 1 and 2, observed with transmitted light.

FIG. 57 shows the states of the elements on the laminated sheet 220 of the 4th example when they are observed with the room light. FIG. 58 shows the states of the elements of the laminated sheet 220 when they are observed with the light from the light box 100. FIG. 59 shows the transmittances of the 1st to 4th paper layers 235-238 and the 1st to 4th light shielding prints 235a-236b at each of the elements. The transmittances are set so that the elements may be displayed in the states shown in FIGS. 57 and 58. FIG. 59 also shows the transmittances of the elements for the light from the light box 100 and their reflectance for the room light. In this embodiment, we set the reflectivity and transmittance to be equal.

As shown in FIG. 59, the reflectance of the 1st light shielding print 235a is set so that the non-stellar celestial objects like the galaxy 2355 and the diffuse nebula 2356, the explaining information like the line 2351 showing a constellation and the star name 2350, and the landscapes on the ground like the mountain 2357 and the hotel window 2358 are observed in the states shown in FIG. 57.

The transmittances of the 2nd light shielding print 235b, the 3rd light shielding print 236a, and the 4th light shielding print 236b are set as follows in order that the laminate sheet 220 may be observed in the state shown in FIG. 58 when they are observed with the room light turned off: the total transmittance determined by the product of the transmittances and light reduction ratio of the materials of the 1st to 4th paper layers 235a-236b and the transmittances of the 1st to 4th light shielding prints 235a-236b is observed in the state shown in FIG. 59 with respect to the light illuminating the back surface of the laminated sheet 220.

Specifically, the transmittance at the position of the background sky 2352 is set about 0.00000002 to reproduce a sufficiently dark background when it is observed with the backlight with the room light turned off. Further, the transmittances at the positions of the star name 2350 and the shining star 2353 are set as low as that of the background sky 2352. Thus, these elements are not recognized by being indistinguishable from the background sky 2352 when they are observed with the backlight.

Then, the transmittances at the positions of the galaxy 2355 and the diffuse nebula 2356 are set about six times higher than the transmittance at the position of the background sky 2352 so that they may be observed slightly shining. Further, the hotel window 2358 is set to be observed about twice as bright as the galaxy 2355. The mountain 2357 is set darker than the background sky 2352, whereby the black mountain 2357 is reproduced against the galaxy 2355 and the background starry sky 2352.

The above-presented example show adjustment of the transmittances of the 1st 4th light shielding prints 235a-236b; however, colors for printing on the layers can also be selected so as to adjust the coloring of the light reflected on the 1st light shielding print 235a and the coloring of the light transmitted through the whole laminated sheet 220.

Further, the above-presented example shows adjustment of the transmittance of the 1st to 4th light shielding prints 235a-236b on the 1st paper layer 235 and the 2nd paper layer 236; however, the 2nd paper layer may be omitted. In this case, display by reflected light may be performed with the use of the 1st paper layer and display by transmitted light may be performed by adjustment of the 2nd light shielding print 235b.

In a 4th example of the laminated sheet 220, the holes in the 1st group are made to penetrate the 1st paper layer 235 and the 2nd paper layer 236 after the 1st paper layer 235 and the 2nd paper layer 236 are stuck to each other. After the holes in the 1st group are made, the 3rd paper layer 237 is stuck, and then the holes in the 2nd group are made to penetrate the 1st paper layer 235, the 2nd paper layer 236, and the 3rd paper layer 237. After the holes in the 2nd group are made, the 4th paper layer 238 is stuck, and then the holes in the 3rd group are made to penetrate the 1st paper layer 235, the 2nd paper layer 236, the 3rd paper layer 237, and the 4th paper layer 238.

Thus, the 4th example of the laminated sheet 220 has an effect that stars having a wide range of magnitudes can be reproduced as transmitted-light stars as well as the 1st example of the laminated sheet 220. In addition, the observer can observe landscapes such as mountains and non-stellar celestial objects such as diffuse nebulas and the galaxies with transmitted-light stars at the same time. Therefore, it has an effect that a more real starry sky can be reproduced.

In this way, the 4th example of the laminated sheet 220 can be enjoyed as a picture of a beautiful starry sky with indoor reflected visible light in the daytime, and it works as an excellent starry sky reproducing device 1 by which a beautiful starry sky can be enjoyed with the transmission of the backlight in a dark room at night. Needless to say, stars having a still wider range of magnitudes can be reproduced if the laminated sheet 220 further contains the light-emitting element stars or below-described printed luminous stars, as in the case of the 1st example of the laminated sheet 220.

Figure 60:
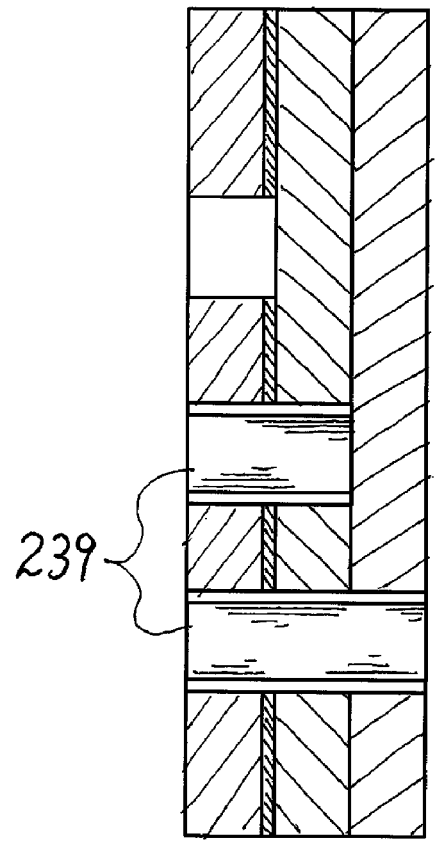
FIG. 60 A cross section view illustrating the fifth example of the laminated sheet in Embodiments 1 and 2.

FIG. 60 shows a 5th example of the laminated sheet 220. As the number of the laminated layers increases, the depths of the transmission holes may get deeper in comparison with their diameters. Then, there arises a problem that brightness of the transmitted-light stars may be significantly changed by the influence of the change in "directivity" when the observation angle from the inside of the laminated sheet 220 is changed. To solve the problem, after transmitted-light stars which passes a certain number or of layers or more are made penetrating the layers, optical fibers 239 which are as long as the transmission holes may be inserted and fixed in the holes. Then, the incident light which enters the outside edge surfaces of the optical fibers 239 is guided by the optical fibers 239 to the inside edge surfaces thereof, whereby the influence of directivity on observation from the inside is decreased.

Next, explanation on the printed luminous stars formed on the surface of the starry sky reproducing sheet 200 by a printing process will be presented. As shown in FIG. 8, in order to reproduce 9th-10th magnitude stars (U1) through the 14th-15th magnitude stars (U6) contained in the starry sky to be reproduced (the Orion in this embodiment), minute dots are printed on the inside surface of the 1st paper layer 201 with a fluorescent ink 218 which emits light by ultraviolet irradiation. The dots can be observed as printed luminous stars by emitting light when irradiated with ultraviolet rays emitted from the UV lamp 109.

In this way, the observer observing the laminated sheet 220 from the inside can observe the light-emitting element stars (f1-f6) reproduced by the light emitted from the white-chip LEDs 305, the transmitted-light stars (H1-H6) reproduced by the light emitted from the backlight LEDs 105 which irradiates the laminated sheet 220 from the outside, and the printed luminous stars (U1-U6) reproduced by the light emitted by ultraviolet irradiation by the UV lamp 109.

In this embodiment, the 1st paper layer 201 of the laminated sheet 220 is made of white flame-retardant paper; however, the layer 201 is not limited thereto. The layer 201 need not be made of flame-retardant paper, and a black sheet material or a white sheet material having a black print on the inside surface thereof may also be used. Printing may be applied on the aluminum foil layer instead of the 1st paper layer 201 as in the 2nd examples of the laminated sheet 220 described later. In this case, desirably, a corona treatment should be applied on the aluminum foil surface in order to improve the printing performance with the fluorescent ink 218. It is also desirable that, after printing with the fluorescent ink 218, the surface of the aluminum foil should be coated with a transparent protective paint to prevent the fluorescent ink 218 from peeling off after dried.

This configuration has the following effects. The surface of the laminated sheet illuminated with the light from the UV lamp is illuminated also with visible light because the light from the UV lamp contains a small visible component. Thus, the area of "sky", which is not occupied by stars and should be completely dark intrinsically, emit light slightly, and minute stars can not be observed. Likewise, if the paper layer contains an ingredient which emits light by the ultraviolet irradiation, the paper layer itself emits light and minute stars can not be observed. However, rise in luminance in the area of "sky" by the visible light can be suppressed if the surface of the 1st paper layer 201 of the laminated sheet 220 is black. Reflection of ultraviolet light from the UV lamp 109 is also suppressed and does not prevent observation of the starry sky reproduction sheet by the observers. Further, unintended light emission from the clothes of the observers and the objects nearby by the reflected ultraviolet light is prevented. In the case where the printing is applied on the aluminum foil, the same effects are obtained because the aluminum foil does not emit light by ultraviolet light irradiation.

In this embodiment, the printed luminous stars are formed on the inside surface of the 1st paper layer 201 of the laminated sheet 220; however, the configuration is not limited thereto. For example, the printed luminous stars can be formed on a surface of a removable light-transmitting sheet, and the sheet can be used with being attached or permanently fixed on the surface of the laminated sheet 220 on the observer side when reproduction by the printed luminous stars is demanded. In this way, formation of the printed luminous stars on the surface of the 1st paper layer 201 of the laminated sheet 220 can be omitted. Thus, it is easy to print objects that can be observed with visible light such as constellation pictures on the surface of the 1st paper layer 201, whereby the starry sky reproducing device would be suitable to be used as an interior decoration during the daytime when the device is not used for celestial observation.

Printing with the fluorescent ink is performed by an ink-jet printer. Details about the ink-jet printer are not explained in this specification because it is commonly used. The ink-jet printer has plural ink cartridges which can be filled with different kinds of inks respectively, an ink head having plural discharge nozzles which discharge the inks in the ink cartridges respectively as tiny droplets, a sheet transport mechanism, and an ink head transport means which transport the ink head in the direction orthogonal to the direction of the sheet transportation. The ink-jet printer discharges the ink droplets from more than one discharge nozzle among the plural discharge nozzles at a prescribed timing while moving the ink head and transporting the sheet. Then, printing is performed by putting the discharged droplets on the sheet on any positions on the sheet and in any combinations of the inks. In this embodiment, the ink-jet printer having twenty-one ink cartridges at maximum and an ink head is used.

Then, explanation on a first method to form the printed luminous stars in this embodiment is presented. As shown in FIG. 13, the printed luminous stars are printed with fluorescent inks n respective sizes, corresponding to the magnitude of the stars to be reproduced (six magnitude grades: 9th-10th magnitude stars (U1), 10th-11th magnitude stars (U2), 11th-12th magnitude stars (U3), 12th-13th magnitude stars (U4), 13th-14th magnitude stars (U5), and 14th-15th magnitude stars (U6)) and corresponding to their colors (seven kinds by spectral types: O, B, A, F, G, K and M types).

Thus, twenty-one kinds of fluorescent inks are used to form the printed luminous stars in total: three kinds of inks are used to reproduce the stars in every two magnitude grades and seven kinds of inks are used to represent the colors of the stars. Two groups of stars having different brightnesses by one magnitude can be reproduced with the same ink depending on the printing size: the brighter stars are reproduce by printed dots having a diameter of 0.3 mm while the darker ones are reproduced by printed dots having a diameter of 0.19 mm.

In the conventional technology, patterns having various colors and luminances are printed by combination of three kinds of fluorescent inks which respectively emit three primary colors of light of red, green, and blue when irradiated with ultraviolet rays. Meanwhile, it is necessary to print dots as minutely as possible for the present starry sky reproducing device. Therefore printing with smallest droplets which are discharged from the ink head should be desirably adopted.

However, although it is necessary to adjust the size of the droplets in a small range in order to reproduce subtle differences of star colors with the fluorescent inks of the three primary colors of light, it is difficult to achieve the adjustment for the smallest droplets. In addition, the droplets of the fluorescent inks of plural colors are needed to be shot on the same position precisely; or otherwise light having the primary colors free from mixing is observed, whereby the stars are expressed differently from their intrinsic features. However, it is technologically difficult to shoot the smallest droplets from the plural ink heads on the same position with no displacement. Thus, there are various problems to utilize the technology of the conventional ink-jet printer to reproduce the stars on the starry sky reproducing device.

However, in the examples disclosed in the present specification, stars are printed with one fluorescent ink among the plural kinds of fluorescent inks prepared in accordance with the magnitudes and colors of the stars to be reproduced. Thus, the above-described problems do not occur even if the stars are printed with the smallest droplets discharged from the ink head. This effect is much more significant in printing for the starry sky reproducing device than in printing of ordinary images because dots are mainly printed for the starry sky reproducing device.

Then, explanation on a second method to form the printed luminous stars is presented. In this method, the printed luminous stars are printed with plural fluorescent inks and plural absorbing inks in combination, with the use of an ink-jet printer containing the two types of inks. The fluorescent inks emit light having different colors and luminances while each of the absorbing inks changes the color and/or density of reflected light or transmitted light by absorbing light having a certain wavelength.

Figure 4:
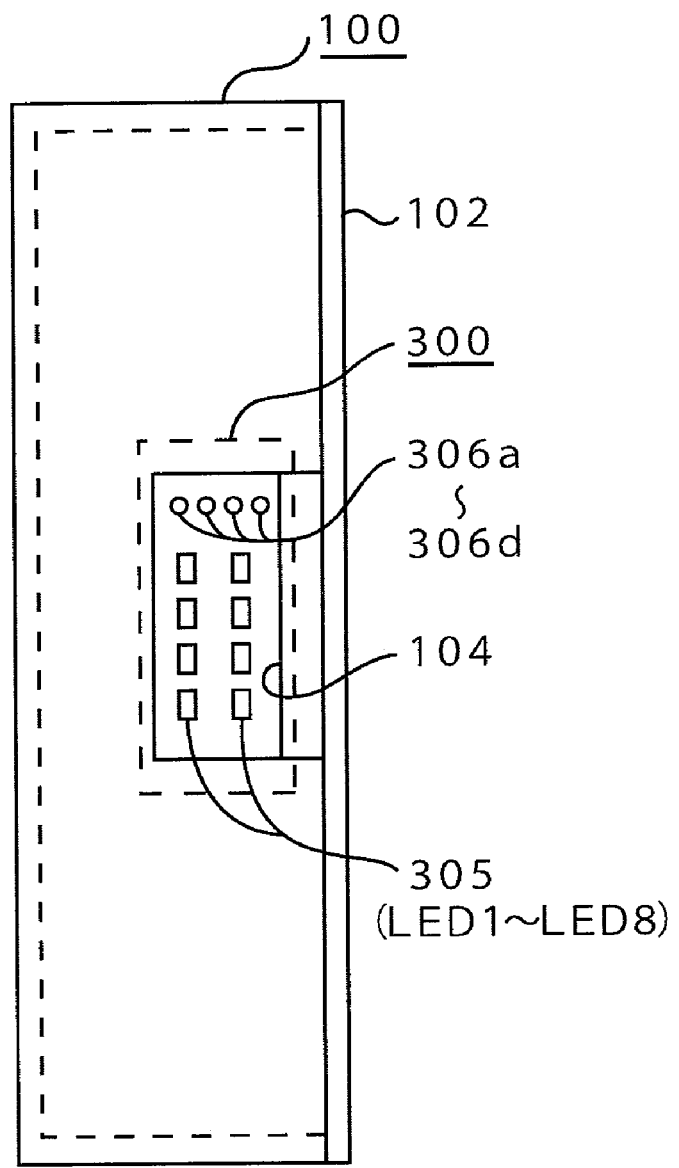
FIG. 4 A bottom view of the light box in Embodiment 1.

Specifically, as shown in FIG. 4, the ink head contains nine kinds of inks including three kinds of fluorescent inks which emit light corresponding to the color of the F-type stars defined as the standard of "white" and six kinds of absorbing inks which give colors corresponding to the colors of O-, B-, A-, G-, K- and M-type stars by absorbing the light from the fluorescent inks. The absorbing inks are not pigments but dyes, desirably. As shown in FIG. 14, printing is performed, selecting the size of the dots, the fluorescent ink, and the absorbing ink in accordance with the colors and the magnitudes of the stars to be reproduced.

In this method, printing is performed with the droplets discharged from the plural ink nozzles as in the conventional technique; however, the problems that arise when the conventional technique is used do not arise because a single type of fluorescent ink is used to produce the light of the printed luminous stars. That is, if the printed patterns with the fluorescent ink and the absorbing ink are displaced from each other due to the displacement of the positions where the inks are shot, the function of the absorbing ink is merely weakened in an analogue manner without causing remarkably bad influences such that the light of the primary colors are observed as in the case of the conventional technique. In order to solve the problem of weakening of the function of the absorbing ink, setting the printing size of the absorbing ink a little larger can make the absorbing ink work uniformly in the dot printed with the fluorescent ink. In this case, since the absorbing ink emits no light, the size of the observed stars are determined by the size of the dot printed with the fluorescent ink, whereby the effect of reproducing minute dot-shaped stars with smallest droplets of a single ink is achieved as in the first method to form the printed luminous stars.

In addition, while an ink-jet printer which can use twenty-one kinds of ink cartridge is required in the first method to form the printed luminous stars, only nine kinds of ink cartridges are necessary in the second method to form the printed luminous stars. Thus, the second method has a remarkable effect to reduce the types of the inks used for printing.

In the second method to form the printed luminous stars, seven kinds of fluorescent inks which emit light of the colors corresponding to the O-, B-, A-, F-, G-, K- and M-type stars and absorbing inks which have two different concentrations are used in combination, instead of the above-described combination. The absorbing inks used here work as light reduction filters which attenuate the light from the fluorescent inks in a wide wavelength range homogeneously. Needless to say, the same effects as in the method shown in FIGS. 13 and 14 are achieved also in this case.

Further, in the second method to form the printed luminous stars, printing by a 1st ink-jet printer containing the fluorescent inks and printing by a 2nd ink-jet printer containing the absorbing inks may be performed on an identical sheet. In this case, the problem of displacement between the positions where the fluorescent inks and the absorbing inks are shot can be solved by setting the printing size by the absorbing ink a little larger, as mentioned above.

Figure 63:
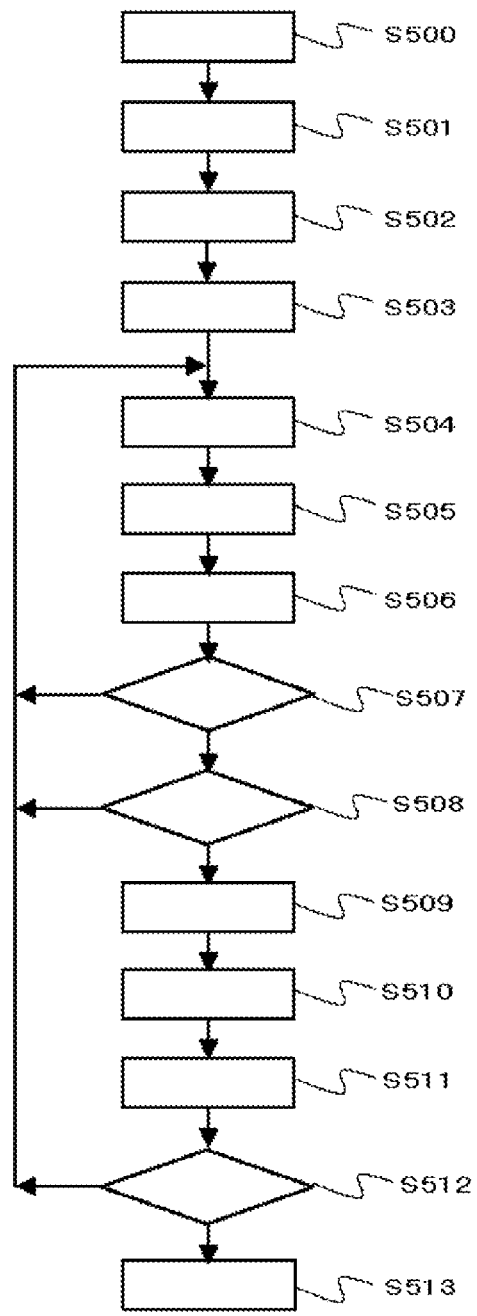
FIG. 63 A flowchart illustrating the production method of the laminated sheet in Embodiments 1 and 2.

Then, a method to produce the laminated sheet 220 of this embodiment, or specifically the laminated sheet 220 having the structure shown in FIG. 10, is explained based on the flowchart show in FIG. 63. First, in step S500, the star basic data "StarInfo" about the stars to be reproduced is obtained, which includes the position data "StarPos", the brightness data "StarMag", and the color data "Starcolor" from, for example, existing star catalogs. Then, the method proceeds to step S501.

The star basic data "StarInfo" may be prepared, as well as by obtaining it from the star catalogs, by extracting the images of stellar-shaped celestial objects through image processing on images observed by Telescopes such as Subaru Telescope and Hubble Space Telescope or astronomical photographs taken by astronomy enthusiasts, and by extracting the position data "StarPos", the brightness data "StarMag", and the color data "StarColor". Among them, the position data "StarPos" is calculated by adding relative brightnesses of the stars in an image to the magnitude of a star serving as a standard in the image.

In this case, based on the prepared star basic data, an image of non-stellar celestial objects "NebraImage" containing celestial objects that are not recognized as stellar-shaped stars, such as diffuse nebulas and tails of the galaxies can be obtained by removing the contribution of the image of stellar-shaped stars from the original image through image processing. The method is not explained in detail here because it is a conventional technique commonly used in the field of astronomy. In the case where the image of non-stellar celestial objects "NebraImage" is thus obtained, in addition to the processes for production of the laminated sheet 220 as described later, a process may be carried out in which printing with UV inks is applied on the surface of the 1st paper layer 201 to reproduce light emission corresponding to the brightness and the color shown by the image of non-stellar celestial objects "NebraImage".

Alternatively, while the laminated sheet 220 having the structure according to the 4th example shown in FIG. 56 is produced, the 1st light shielding printing 235a, the 2nd light shielding printing 235b, the 3rd light shielding printing 236a, and the 4th light shielding printing 236b may be formed through printing to give light-reduction and the coloring effects for the light from the back side of the sheet 220 so that the transmitted light is observed with the brightnesses and the colors shown by the image of non-stellar celestial objects.

Next, a transmitted-light star information "SheetInfo" for the laminated sheet 220 is obtained in step S501, and then the method proceeds to step S502. The transmitted-light star information "SheetInfo" obtained in step S501 contains a sheet magnitude information "SheetMag" related to the ratio of light reduction applied to the light passing through the transmission holes by the laminated sheet, the hole diameter magnitude information "HallMag" related to the magnitudes determined by the diameters of the transmission holes made in the sheet, the filter color information "FilterColor" related to the colors of the filter printings corresponding to the colors of the stars, and the filter magnitude information "FilterMag" related to the ratio of the light reduction applied to the transmitted light by the filter printings of respective colors. Specifically, the transmitted-light star information is as follow.

In the sheet magnitude informations for the 2nd and 3rd paper layers "SheetMag (2nd paper layer)" and "SheetMag (3rd paper layer)", light reduction corresponding to the magnitude of +2 is represented by the same value. With respect to the diameter number "DiaNo" in the hole diameter magnitude information "HallMag (DiaNo)", the largest diameter of 0.3 mm is represented as "DiaNo=MaxDiaNo=0", and the transmission holes having the diameter serve as a standard of the 0th magnitude represented as "HallMag(0)". The second largest diameter of 0.18 mm is represented as "DiaNo=1", and the transmission holes having the diameter correspond to a magnitude of +1 is represented as "HallMag(1)". The maximum hole light reduction magnitude "HallMagMax" representing a magnitude corresponding to the highest light reduction, which is realized with the holes having the smallest diameter, is defined as a magnitude of +2. When the colors of stars are represented by spectral types, the filter color information and filter magnitude information are represented as the "FilterColor (spectral type)" and "FilterMag (spectral type)". Specifically, "FilterMag (spectral type)" is defined as FilterMag (O-type)=magnitude 0.1, FilterMag (B-type)=magnitude 0.08, FilterMag (A-type)=magnitude 0.05, FilterMag (F-type)=magnitude 0, FilterMag (G-type)=magnitude 0.05, FilterMag (K-type)=magnitude 0.1, and FilterMag (M-type)=magnitude 0.2, for types O, B, A, F, G, K and M, respectively. These values are mere examples for explanation, and thus it goes without saying that appropriate values corresponding to the filter printings to be used are set.

Next, in step S502, for the plural hole groups made on the laminated sheet 220, the ratios of the light reduction by the sheets which cause the light reduction effect on the light passing through the transmission holes are calculated, or in other words, a total ratio of light reduction "GunMag" by the sheets to be laminated after formation of the transmission holes is calculated. Then, the method proceeds to step S503.

Specifically, in the case of this embodiment, in step S502, the relationship "GunMag (1st group)=SheetMag (2nd paper layer)+SheetMag (3rd paper layer)=magnitude of 4" holds because the holes in the 1st group are subjected to the light reduction by the 2nd paper layer and the 3rd paper layer. Likewise, the relationship "GunMag (the 2nd type)=SheetMag (the 3rd paper layer)=magnitude of 2" holds because the holes in the 2nd group are subjected to the light reduction by the 3rd paper layer. Further, the relationship "GunMag (the 3rd type)=magnitude 0" holds because the holes of the 3rd type are subjected to the light reduction not by the sheet, but by coloring of the seals, which is taken into consideration as "FilterMag".

Next, in step S503, the brightness of the brightest stars to be reproduced as transmitted-light stars on the laminated sheet 220 is designated as the transmitted-light star minimum magnitude "MagMin". The brightness is contained in the star basic data. In the present embodiment "MagMin=3rd magnitude" holds. Then, the method proceeds to step S504.

Then, in steps S504 to S510, the following informations are obtained: the lamination information "SheetStack" on the sheets that the transmission holes penetrate, the diameters of the transmission holes "HallDia", and the colors of the filter printings "FilterColor". The informations are contained in the transmitting-light star process information "WorkInfo", which is required to reproduce the stars as transmitted-light stars, and are obtained based on the star basic data "StarInfo" and the transmitted-light star information "SheetInfo". The positions where the transmission holes are to be formed are uniquely determined based on the "StarPos", and therefore explanation on the positions is omitted here.

Specifically, in step S504, one star to be handled is selected, and the color of the filter printing "FilterColor" and the filter magnitude information "FilterMag" for the star is obtained based on the color of the star "StarColor". Then, the method proceeds to step S505. For example, when the color of the star is "K-type", the color of the filter printing represented as "FilterColor (K-type)" and the filter magnitude information is determined as "FilterMag (K-type)=0.1 magnitude". Next, in step S505, the value of the filter magnitude information is subtracted from the brightness of the star, and the obtained value is set as the modified magnitude of the star "StarMag2". Then, the method proceeds to step S506.

Specifically, in step S506, when the brightness of the selected star is represented as "StarMag=magnitude 6", the following calculation is performed: StarMag2=StarMag−FilterMag (K-type)=magnitude 6−magnitude 0.1=magnitude 5.9.

Next, in step S506, the difference between the modified magnitude of the star "StarMag2" and the transmitted-light star minimum magnitude "MagMin" is calculated, as "SheetDecMag=StarMag 2−MagMin". The obtained value is set as the sheet light reduction magnitude "SheetDecMag". Then, the method proceeds to step S507. In the case of the selected star, the following calculation is performed in step S506: "SheetDecMag=magnitude 5.9−magnitude 3=magnitude 2.9".

Next, in step S507, the "SheetDecMag" is evaluated. If the value is a negative number, it means that a star brighter than the transmitted-light star reproduced by the transmission hole having the largest diameter is needed to be reproduced, and therefore it is determined that the star should be reproduced not as a transmitted-light star but as a light-emitting element star. Then, the calculation for reproducing the star as a transmitted-light star is finished, and step S504 is performed again to handle another star. On the other hand, if the value of "SheetDecMag" is a positive number above 0, step S508 is performed. In the case of the selected star, step S508 is performed because the value is not a negative number.

Then, in step S508, "SheetDecMag" is compared with the sum of "GunMag" of the group that is subjected to the highest light reduction by the sheets and the maximum hole light reduction magnitude "HallMagMax". If the "SheetDecMag" is larger, the result means that the star is darker than the darkest star which can be reproduced as a transmitted-light star, and it is determined that the star should be reproduced not as a transmitted-light star but as a printed luminous star. Then, the calculation for reproducing the star as a transmitted-light star is finished, and step S504 is performed again to handle another star. On the other hand, "SheetDecMag" is smaller, step S509 is performed.

In the case of the selected star, the value "SheetDecMag=magnitude 2.9" has been obtained, and the value is smaller by 6 magnitudes than the sum of the value "GunMag=magnitude 4" of the group subjected to the highest light reduction by the sheets and the value "HallMagMax=2", and therefore, step S509 is performed.

Next, in step S509, the group number "Gun" to reproduce the star as a transmitted-light star. Then, the method proceeds to step S510. Specifically, in step 509, for each of the groups subjected to the highest to lowest light reduction, the values of "GunMag" and "SheetDecMag" are evaluated, and the group number "Gun" that provides the relation SheetDecMag>GunMag (Gun) is determined. If the group number is determined, the lamination information "SheetStack" on the sheets that the transmission hole penetrates is determined. In the case of the selected star, the following relationship holds: "GunMag (the 1st group)=magnitude 4≥SheetDecMag=magnitude 2.9>GunMag (the 2nd group)=magnitude 2. Therefore, the following result is obtained: "Gun=2nd group".

Next, in step S510, the diameter number "DiaNo" of the transmission hole that gives the light reduction of the magnitude corresponding to the difference between the "GunMag (Gun)" and "SheetDecMag" of the star, based on the hole diameter magnitude information "HallMag". Then, the method proceeds to step S511.

Specifically, in step S510, the difference between "GunMag (Gun)" and "SheetDecMag" is evaluated in the order from the diameter number representing the smallest diameter to the diameter number (0) representing the largest diameter. Then, "DiaNo" that provides the relationship SheetDecMag−GunMag (Gun)≥HallMag (DiaNo) is determined.

In the present embodiment, the following relationships hold: "HallMag (0)=magnitude 0", "HallMag (1)=magnitude 1", and the diameter number representing the smallest diameter is "1". Therefore the result of the above-described evaluation for the selected star is: SheetDecMag−GunMag (Gun)=magnitude 2.9−magnitude 2=magnitude 0.9, then HallMag (1)=magnitude 1>magnitude 0.9≥HallMag (0)=magnitude 0. Thus, the result is: "DiaNo=0".

Next, in step S511, for the group number "Gun" determined in step S509, the following parameters are determined: the lamination information "SheetStack" on the sheet that the transmission hole in the group penetrates and the diameter of the transmission hole "HallDia" corresponding to the "DiaNo" determined in step S510. Then, the method proceeds to step S512.

Specifically, in step S511, since the group number is determined as "Gun=2nd group" for the selected star, the laminate information is obtained as: "SheetStack=1st paper layer•aluminum foil layer". Further, since the diameter number is determined as "DiaNo=0", the hole diameter is obtained as "HallDia=0.3 mm".

Next, in step S512, it is judged whether the evaluation about all stars has been finished. If it has been finished, step S513 is performed. If the evaluation has not been finished, step S504 is performed again.

Next, in step S513, the processes to make the laminated sheet 220 including laminating and sticking of the sheets, forming of the transmission holes through drilling, and printing of the colored filters, based on the data of "SheetStack", "HallDia" and "FilterColor" for all stars determined to be reproduced as transmitted-light stars. Thus, the production method is completed.

Specifically, in step S513, for formation of the laminated sheet of the embodiment, the 1st paper layer 201 and the aluminum foil layer 202 are laminated and stuck to each other. Then, for all stars determined as "SheetStack=1st paper layer•the aluminum foil layer", light-transmission holes 212 having the diameters provided by "HallDia" are formed at the positions provided by "StarPos" on the inside surface of the 1st paper layer 201. Thus, the holes in the 1st group are formed.

Next, the colored printings 215 based on the "FilterColor" are formed for respective stars through printing at the positions provided by the "StarPos" on the inside surface of the 2nd paper layer. Then, the 2nd paper layer 203 is laminated and stuck to the aluminum foil layer 202 so that the position of each colored printing 215 may match the position of the transmission hole 212 for each star. Alternatively, after the 2nd paper layer 203 is laminated and stuck to the aluminum foil layer 202, colored printings based on the "FilterColor" are formed through printing at the positions provided by the "StarPos" for respective stars on the outside surface of the 2nd paper layer 203. In the latter way, there is an advantage the influence of the positional displacement occurring in the sticking process is smaller.

Next, for all stars in the 2nd group determined as "SheetStack=1st paper layer•aluminum foil layer•2nd paper layer", transmission holes 213 having the diameters provided by the "HallMag" are formed at the positions provided by the "StarPos". Thus, the holes in the 2nd group are formed.

Then, the colored printings 216 based on the "FilterColor" are formed for respective stars through printing at the positions provided by the "StarPos" on inside surface of the 3rd paper layer 204. Then, the 3rd paper layer 204 is laminated and stuck to the 2nd paper layer 203 so that the position of each colored printing 216 may match the position of the transmission hole 213 for each star. Alternatively, after the 3rd paper layer is laminated and stuck to the 2nd paper layer, the colored printings based on the "FilterColor" are formed through printing for respective stars at the positions provided by the "StarPos" on the outside surface of the 3rd paper layer. In the latter way, there is an advantage the influence of the positional displacement occurring in the sticking process is smaller.

Then, for the stars in the 3rd group determined as "SheetStack=1st paper layer•the aluminum foil layer•the 2nd paper layer•the 3rd paper layer", transmission holes 214 in the 3rd group having the diameters provided by the "HallDia" are formed at the positions provided by the "StarPos". Thus, the holes in the 3rd group are formed. Then, the colored seals 217 having colored printings formed through printing based on the "FilterColor" to cover the transmission holes 214 are stuck.

By the method to produce the laminated sheet 220 for the starry sky reproducing device 1 explained above, appropriate sheets can be laminated in an appropriate procedure to have a multilayer structure, which characterizes the starry sky reproducing device, and light-transmission holes having appropriate diameters can be formed on the laminated sheets. These processes are performed based on the star basic data about stars having various brightnesses and colors contained in the starry sky to be reproduced, extracted from the star catalog or astronomical photographs, and based the transmitted-light star information of the laminated sheet 220.

The transmitted light is attenuated by the inks forming the colored printings to give colors to the transmitted-light stars; however, in the present method, appropriate types and diameters of transmission holes can be selected taking account of the effect of light reduction. Consequently, the starry sky reproducing device can reproduce stars as the transmitted-light stars having accurate brightnesses and colors.

Further, even based on the same basic configuration data about the starry sky to be reproduced, starry sky reproducing devices which fit specific purposes for the use thereof can be produced by changing the transmission-star information depending on the purposes.

Though all the steps explained above are performed manually by a maker, a part or all of the steps may be performed by non-human apparatus, instead.

The above-presented explanation shows the method to produce the laminated sheet 220 in which information on the materials required for the production of the starry sky reproducing device is obtained through steps S500-S512, and laminating and sticking of the sheets, formation of the transmission holes through drilling, and printing of the colored filters are carried out in step S513 based on the obtained data. In the methods, steps S500-S512 is a characteristic process to produce the present starry sky reproducing device; however, the process to solve the problem of the present invention is not limited thereto, but variations explained below are available.

For example, a star chart making program already exists which extracts basic data of stars contained in the starry sky to be reproduced from a star catalog or astronomical photographs, and displays the data on a screen or prints them with any designated size, layout, and range of magnitude of stars to be reproduced. A program which implements the process of steps S500-S512 can be incorporated in the star chart making program. Steps S500-S512 can be carried out by the star chart making program. Then, based on the data generated by the program, printing is applied to the sheets which need printing process among the materials required for implementation of the production method. The process of step S513 is carried out through lamination of the sheets and formation of transmission holes. Producing the laminated sheet 220 for the starry sky reproducing device by this method has the same effects as described above.

A first maker who is a consumer may carry out steps S500-S512. Then the first maker makes an order data which includes the data generated through the steps, information data on the first maker, and payment information, and orders the laminate sheet 220 by sending the order data to an order-processing server on the internet. After that, a second maker obtains the order data, and produces the laminated sheet 220 by performing step S513 based on the data included in the order data. The second maker send the produced laminated sheet 220 to the first maker, and receives the production cost of the sheet 220 from the first maker based on the payment information. Producing the laminated sheet 220 for the starry sky reproducing device by this method has the same effects as described above.

The method stated below is also available. Specifically, the second maker carries out steps S500-S512, and prepares the materials required for performing step S513 based on the obtained data. And the second maker offers the first maker a production kit containing the materials and tools to form light-transmission holes on the materials through drilling. The first maker as a consumer carries out step S513 by laminating the sheets and forming the light-transmission holes with the use of the materials and tools contained in the production kit. Producing the laminated sheet 220 for the starry sky reproducing device by this method has the same effects as described above. In this method, moreover, the first maker as a consumer can enjoy the experience of hand crafting.

In the present specification, the "materials required for implementation of the production method" means the materials which are required in implementation of the method of production of the disclosed starry sky reproducing device. Specifically, the materials include a first paper layer 201 which has on the surface thereof marks showing the positions and sizes of the holes in the first group to be formed, an aluminum foil layer 202, a second paper layer 203 which has colored printings 215 corresponding to the holes in the first group on the surface thereof, a second-group drilling instruction sheet which has on the surface thereof marks showing the positions and sizes of the holes in the second group to be formed, a third paper layer 204 which has colored printings 216 corresponding to the holes in the second group on the surface thereof, and a third group drilling instruction sheet which has on the surface thereof marks showing the positions and sizes of the holes in the second group to be formed. They may be separated from or combined with each other.

The second maker may produce a drilled laminated sheet as a half-completed product by, in advance, laminating the first paper layer 201 and the aluminum foil layer 202 among the materials required for implementation of the production method and forming the holes in the first group, and then may offer a production kit which contains the drilled laminate sheet to the first maker as a consumer. In this case, the load in the drilling process is greatly reduced: the drilling process in step S513 performed by the first maker as a consumer is limited to the process to form the holes in the second and third groups, by the consumer need not form the holes in the first group. Therefore, various consumers as first makers can carry out this production method and produce starry sky reproducing devices.

Alternatively, a third maker may carry out steps S500-S512, in advance. Then, the third maker prepares a print data for applying printing on the sheets that need printing process among the materials for implementation of the production method, and publishes them on a web site. Then, a second maker as a host of an event for crafting obtains the print data. The second maker prints out the print data on sheets with the use of his printer and offers the printed sheets to s first maker. The first maker carries out the rest of step S513, by laminating the printed sheets and forming light-transmission holes. Producing the laminated sheet 220 for the starry sky reproducing device by this method has the same effects as described above. Further, the second maker as a host of an event for crafting can easily offer the experience to implement this production method to consumers.

Figure 69:
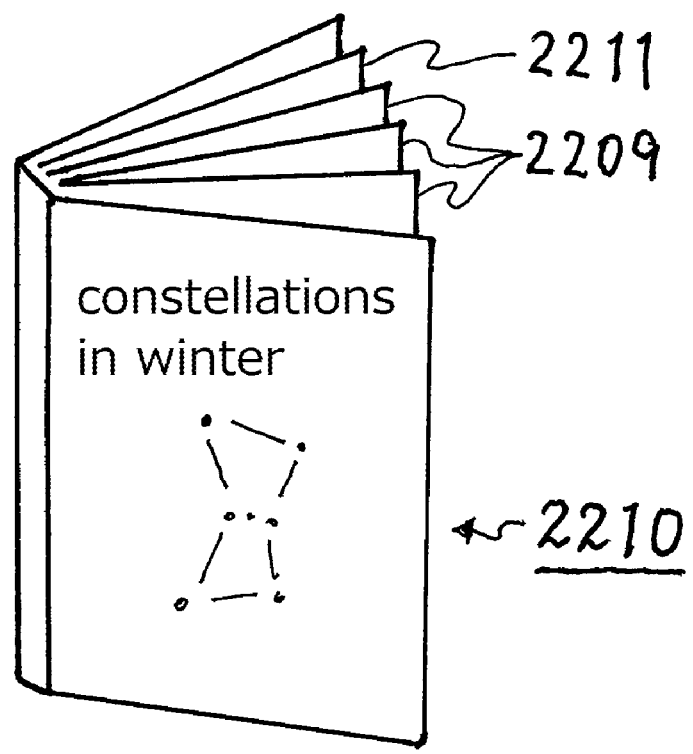
FIG. 69 A view illustrating the book which contains the laminated sheet.

As shown in FIG. 69, a second maker may make a book 2210 containing the materials 2209 required for implementation of the production method, prepared based on the information obtained through steps S500-S512 and instruction pages 2211 which carry the information explaining the production method of the starry sky reproducing device and commentary information on the starry sky reproduced by the device. In this case, the materials 2209 required for implementation of the production method are offered in the form of the book 2210 to a first maker as a consumer. After purchasing the book 2210, the first maker parts out the material 2209 from the book 2210 and carries out the rest of the process in step S513 by laminating and sticking the sheets and forming the transmission holes. Thus, the first maker can easily carry out the production method of the laminated sheet 220. Moreover, learning effect is increased by this method because the first maker can use the starry sky reproducing device referring to the commentary information on the starry sky in the book.

Figure 75:
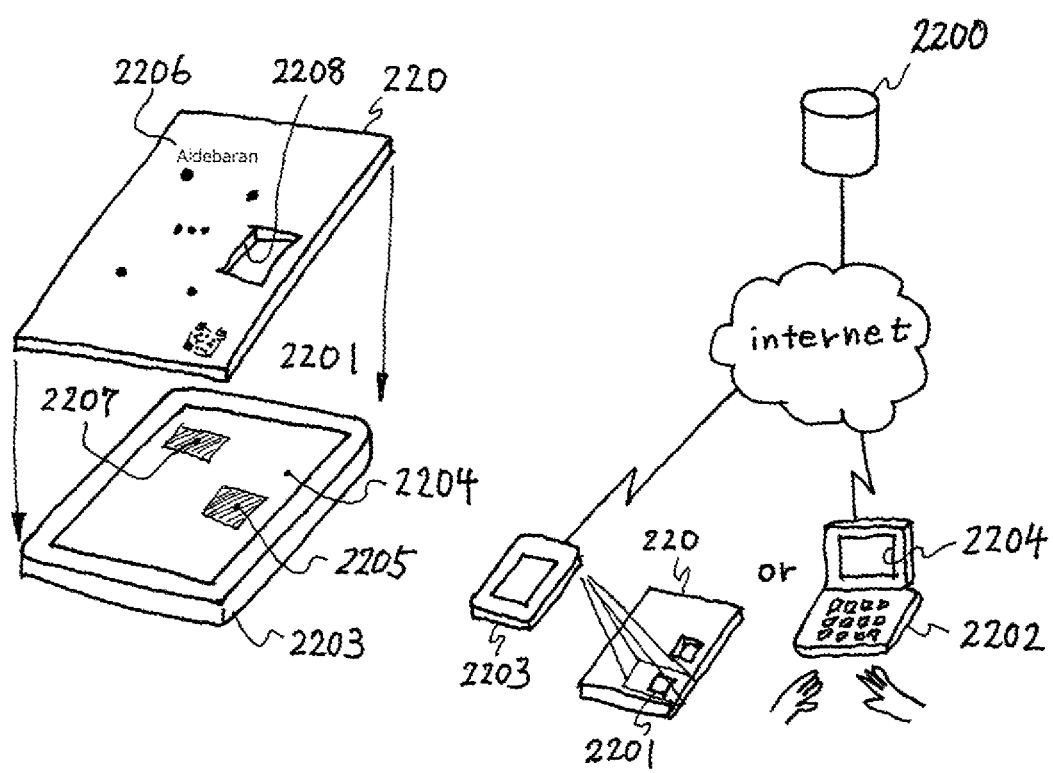
FIG. 75 A view illustrating the simple observation method for the laminated sheet.

The laminated sheet 220 may be observed in a simple way shown in FIG. 75. Specifically, the access information 2201 to access a server 2200 on the internet providing commentary information is provided on the laminated sheet 220. A user obtains the commentary information from the server 2200 based on the access information 2201 by using the user's computer 2202 or mobile information terminal 2203. Then, the user displays the commentary information on a screen 2204. After that, the user puts the laminated sheet 220 over the screen 2204 and observes the transmitted-light stars with illuminating the back side of the laminated sheet 220 with the light from the screen 2204. Thus, the laminated sheet 220 may be observed easily along with commentary information.

In this case, it is advantageous if the commentary information is provided with a movie to reproduce blinking of stars by changing the luminance at respective positions on the screen 2204 depending on time.

Further, an image 2207 displayed on the screen 2204 corresponding to displayed elements disposed at plural positions on the laminated sheet 220, such as a star name indication 2206 showing a first-magnitude star "Aldebaran", may be changed so that the luminances of the transmitted light on the displayed elements are changed with synchronized to the content of the voice commentary. Thus, the displaying state of the displayed elements can be changed depending on demands, whereby the range of variety in the celestial objects reproduced by the laminated sheet 220 and the commentary displayed on the screen 2204 can be made wider. In this case, the displaying state of the displayed elements on the laminated sheet 220 may be controlled minutely by putting the outer surface of the laminated sheet 220 close to the screen 2204 consisting of a displaying device which can be controlled per pixel, such as a liquid crystal display.

A commentary displaying area 2205 may be set on a part of the screen 2204, and a window 2208 to observe the commentary displaying area 2205 therethrough may be formed on the laminated sheet 220 in an area corresponding the commentary displaying area 2205 so that an observer can observe commentary information displayed on the commentary displaying area 2205. Thus, detailed images of celestial objects, graphs, or reference images can be displayed depending on demands, and an observer with hearing difficulties can understand the content of the voice commentary information through a caption.

For observation of the starry sky reproducing device in the daytime, the laminated sheet 220 may be covered with a hood having an observation hole and observed through the observation hole, whereby the transmitted-light stars are observed beautifully with the sheet 220 shielded from the light from the environment.

Figure 12:
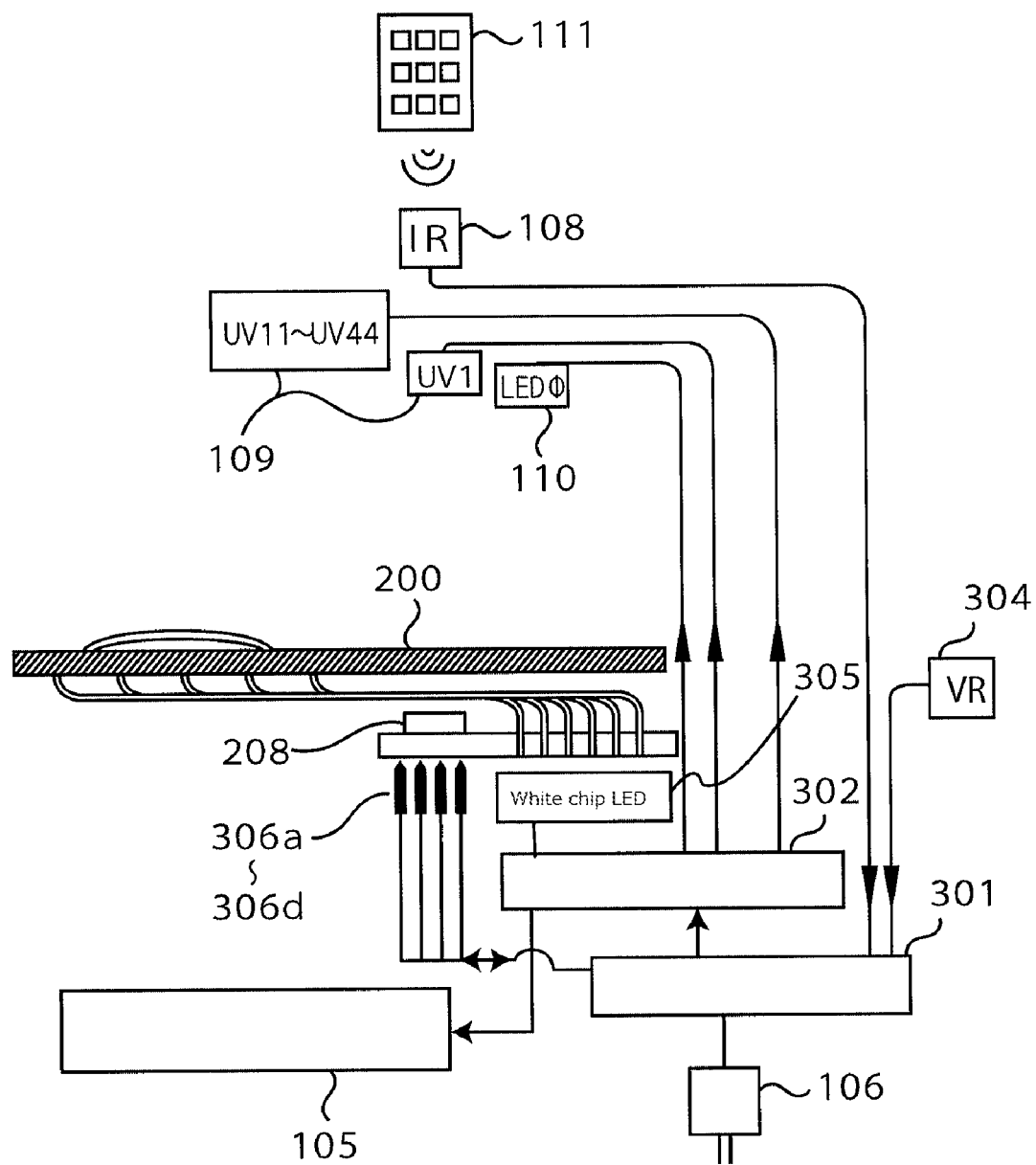
FIG. 12 A block diagram of the electronic circuit in Embodiment 1.
Figure 19:
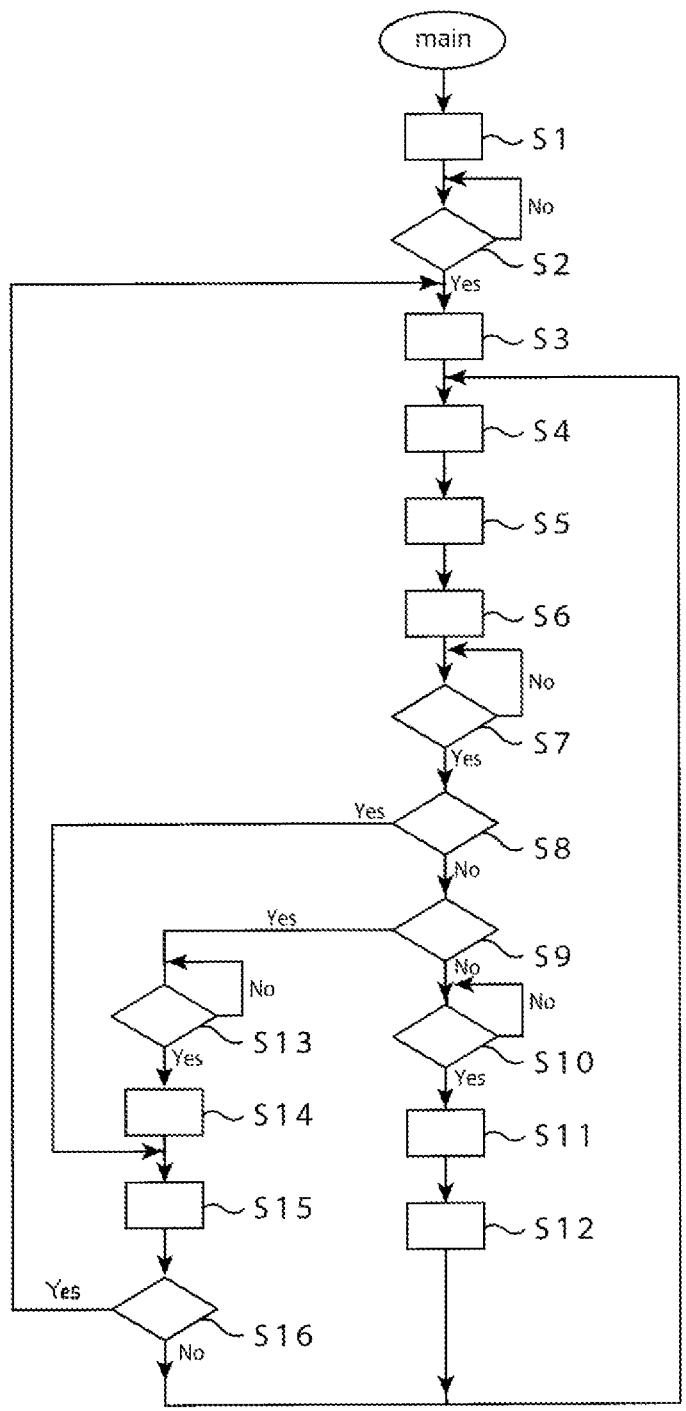
FIG. 19 A flowchart showing the main routine in Embodiment 1.
Figure 20:
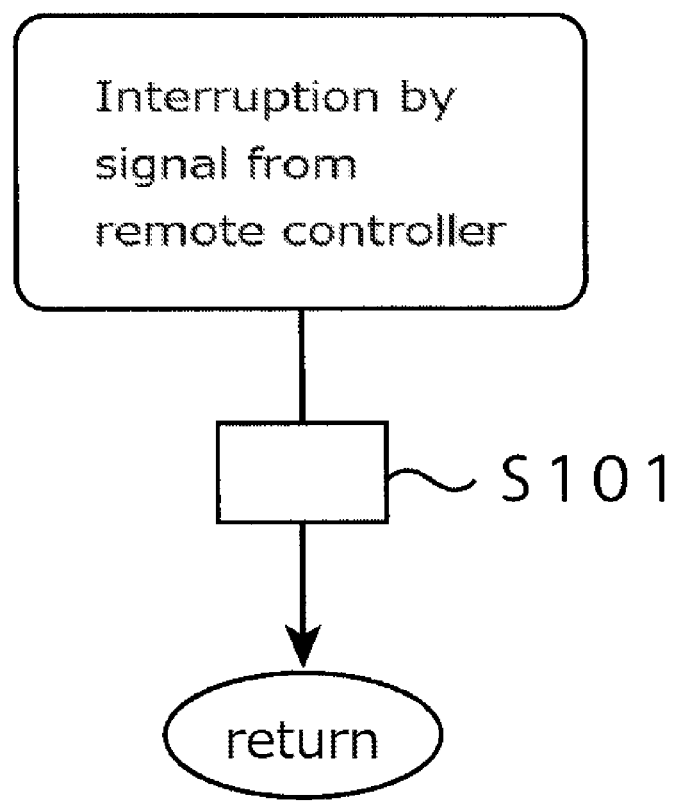
FIG. 20 A flowchart showing the interruption routine for signal input from infrared remote controller in Embodiments 1 and 2.
Figure 21:
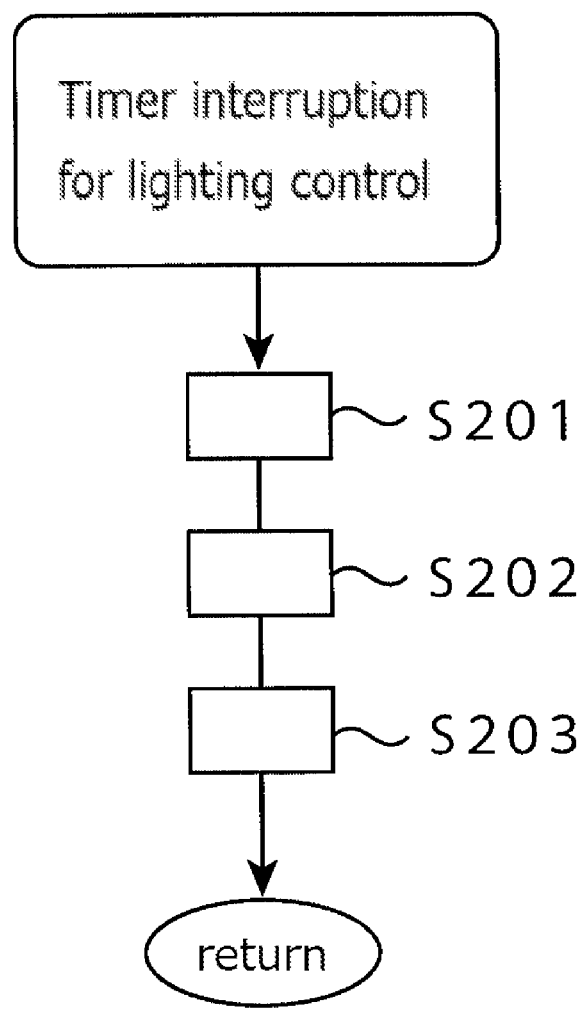
FIG. 21 A flowchart showing the timer interruption routine for lighting control in Embodiments 1 and 2.
Figure 22:
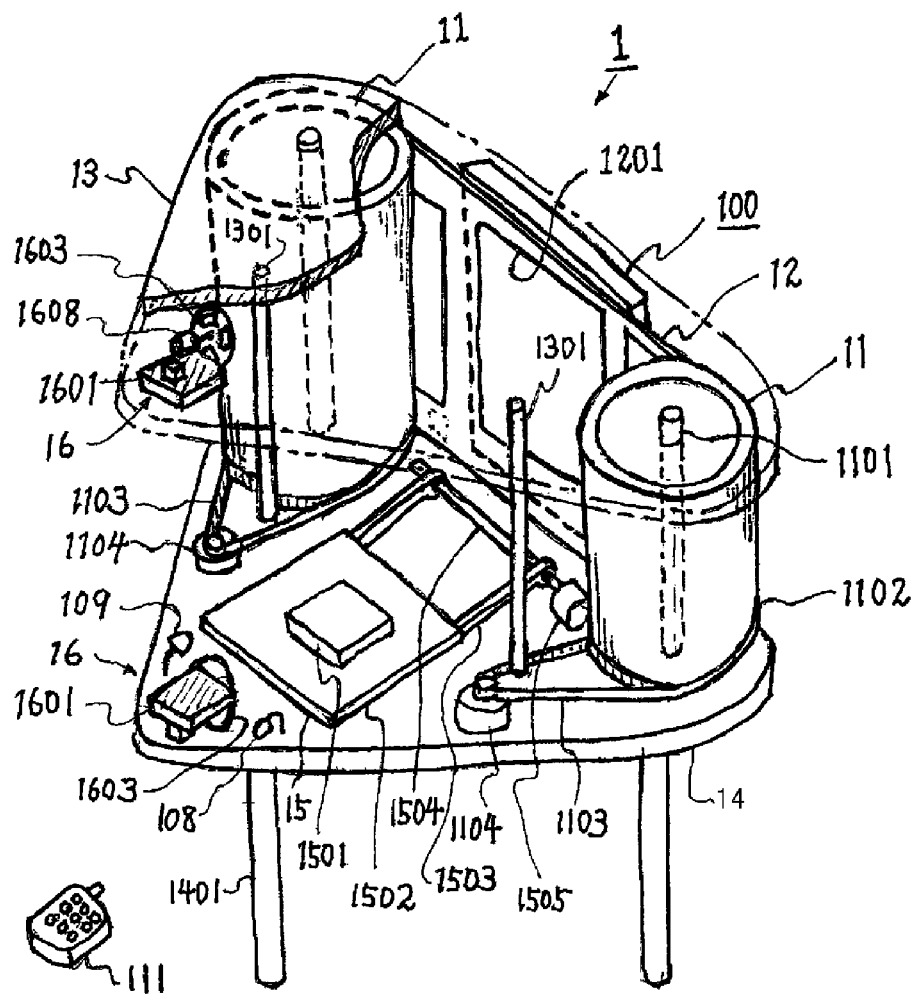
FIG. 22 A partial cross section illustrating the starry sky reproducing device 1 of Embodiment 2.
Figure 23:
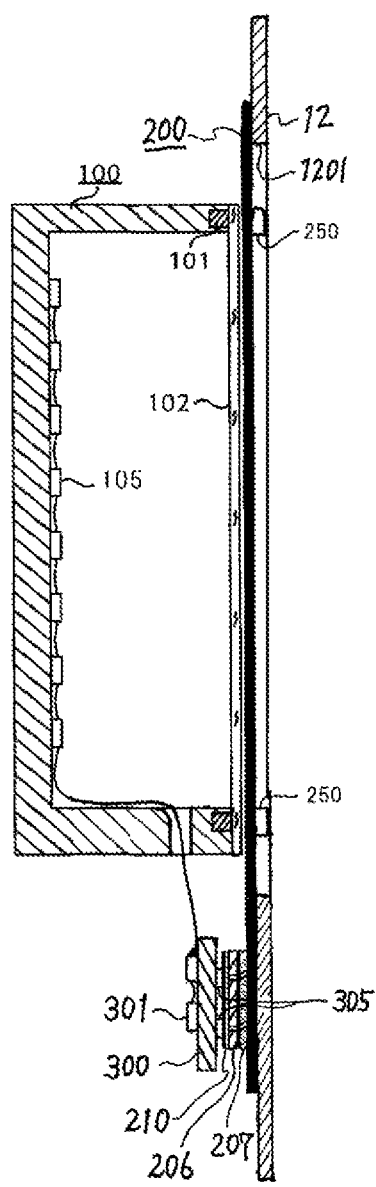
FIG. 23 A central cross sectional drawing of the light box in Embodiment 2.

Next, the operation of the one-chip CPU is explained based on a system configuration diagram shown in FIG. 12, a data structure chart recorded in the RAM area of the one-chip CPU shown in FIG. 5, and flowcharts showing the program recorded in the ROM shown in FIGS. 19, 20, and 21. First, the operation in the main routine shown in FIG. 19 is explained.

In step S1, the one-chip CPU 301 turns off the LED elements whose lighting is controlled by the one-chip CPU 301 through the LED driving IC 302: namely, all of the backlight LEDs 105 (LED111-LED444), the white-chip LEDs 305 (LED1-LED8), the light pollution lamp 110 (LED0), the wide-angle UV lamp (UV1), and the narrow-angle UV lamps (UV11-UV44). Then, the program proceeds to step S2.

In step S2, the one-chip CPU 301 try to read the number assigned to the starry sky reproducing sheet recorded in the nonvolatile memory. If the CPU 301 can read correct data, the operation proceeds to step S3. If the CPU can not read the correct data, the program iterates step S2. In this case the program proceeds to step S3 because the starry sky reproducing sheet is installed correctly. In step S3, the one-chip CPU 301 sets RAM variables "Mode No" and "Step No" both at "1". Then, the program proceeds to step S4.

In step S4, the one-chip CPU 301 reads the following parameters from the information relating to the starry sky recorded in the nonvolatile memory, based on variables "Mode No" and "Step No": "Timer", "Scene No", and "Trig" which indicate a duration, a scene number, and a transition condition, respectively, of the specified step in the operating mode and "Max Step No" which indicates a number of the steps included in the operating mode. Then, the CPU 301 records the parameters in the RAM. Then, the program proceeds to step S5. In step S5, the one-chip CPU 301 reads a scene information corresponding to the "Step No". Then the program proceeds to step S6.

In step S6, the one-chip CPU 301 sets data which indicate luminance and amount of scintillation for each of the LED elements controlled by the timer interruption routine for lighting control described below. Then, the program proceeds to step S7. If the data is set here, the one-chip CPU 301 performs the operation, in parallel, to drive each of the LED elements with the specified luminance and amount of scintillation in step S201 of the timer interruption routine for lighting control described below. The explanation on detail of the data structure is omitted in this specification because there are many groups of elements.

In step S7, the one-chip CPU 301 judges whether time elapsed after step S4 is longer than "Timer" or not. If the CPU 301 judges as "No", the program iterates the operation in step S7. If the CPU 301 judges as "Yes", the program proceeds to step S8.

In step S8, the one-chip CPU 301 judges whether "Trig" is "0", which indicates that the next step is performed automatically after a predetermined time, or not. If the CPU 301 judges as "Yes", the program proceeds to step S15. If the CPU 301 judges as "No, the program proceeds to step S9.

In step S9, the one-chip CPU 301 judges whether "Trig" is "1", which indicates the next step is performed if the "0" button of the infrared remote controller is pressed after a predetermined time. If is the CPU 301 judges as "Yes", the program proceeds to step S13. If the CPU 301 judges as "No", the program proceeds to step S10.

In step S10, the one-chip CPU 301 refers to information "Key No" on the operation buttons of the infrared remote controller, which is detected and input in interruption process for the remote controller signal described below. Then the CPU 301 judges whether any of "0" to "9" buttons was pressed. If the CPU 301 judges as "No", the program iterates the operation in step S10. If the CPU 301 judges as "Yes", the program proceeds to step S11. In step S11, the one-chip CPU 301 set the number of the button indicated by "Key No" in "Mode No". Then, the program proceeds to step S12. In step S12, the one-chip CPU 301 initializes "Step No" to "1". Then, the program returns to step S4.

In step S13, the one-chip CPU 301 refers to the information "Key No" on the operation buttons of the infrared remote controller and judges whether the "0" button was pressed. If the CPU 301 judges as "No", the program iterates the operation in step S13. If the CPU 301 judges as "Yes", the program proceeds to step S14. In step S14, the one-chip CPU 301 once sets "Step No" at "–", which indicates that no operation is performed, and the program proceeds to step S15. In step S15, the one-chip CPU 301 add a value of "+1" to the "Step No". Then, the program proceeds to step S16. In step S16, the one-chip CPU 301 judges whether "Step No" is over "Max Step No". If the CPU 301 judges as "Yes", the program returns to step S3. If the CPU 301 judges as "No", the program proceeds to step S4.

Then, the operation in the interruption routine for the remote controller signal shown in FIG. 20 is explained. The one-chip CPU 301 executes this interruption routine when the operation signal is input from the infrared remote controller. In step S101, the one-chip CPU 301 reads the information on the button operated on the infrared remote controller, sets the information to "Key No", and then finishes the interruption routine. Since transmission of the operation data from the infrared remote controller by infrared rays and detection of the information on the state of buttons based on the signal received by an infrared sensor are commonly known techniques, detailed explanation on the techniques is omitted in the present specification.

Then, the operation in the timer interruption routine for lighting control timer shown in FIG. 21 is explained. The routine is a timer interruption routine started by a timer contained in the one-chip CPU 301. In step S201, the one-chip CPU 301 carries out PWM control (pulse width control) based on the data which indicates the luminance and amount of scintillation of each of the LED elements set in step S6 of the main routine. Then the program proceeds to step S202. Since PWM control of an LED element based on predetermined values in a timer interruption routine started by timer interruption is a common technique, detailed explanation on the technique is omitted.

In step S202, the one-chip CPU 301 reads the value of the luminance adjusting volume controller connected to the one-chip CPU 301, and calculates the ratio "Volume" of the value to a standard value. Then, the program proceeds to step S203.

In step S203, the one-chip CPU 301 change the luminances of the LED elements except the light pollution lamp (LED0) based on the value of "Volume". In the step, the luminances of the LED elements are varied as a whole according to the ratio according to the operation of the luminance adjusting volume controller. As a result, the balance among the brightness of the transmitted-light stars reproduced by the backlight LEDs (BL111-BL444), the brightness of the printed luminous stars reproduced by the UV lamp (UV0, UV11-UV44), and the brightness of the light-emitting element stars reproduced by the white-chip LEDs (LED1-LED6) does not change. Therefore, the interruption routine does not cause any problem in reproducing the starry sky.

Then, this article explains about the operation when the user uses the device according to the present embodiment based on the starry sky reproducing sheet related information recorded in the nonvolatile memory of the installed starry sky reproducing sheet (FIGS. 16-18).

First, the user installs the starry sky reproducing device in a dark room or outdoor at night and the astronomical telescope ten meters away from the starry sky reproducing device. Next, the user removes the installation frame from the lightbox, and installs the starry sky reproducing sheet selected from the plural starry sky reproducing sheets between the transparent plate and the installation frame. Then, the contact board is installed in the prescribed position, and the contact pin is contacted to the contact pad and connected electronically.

Then, when the power switch is turned on, the one-chip CPU 301 is reset and the main routine starts. At first, the operation starts in the case of the operation mode is "1": the star observation mode. After that, the operation according to the program operation of the one-chip CPU 301 described above is as follows.

That is, the star observation mode (ModeNo=1) is the mode composed of one step, and operates to repeat SceneNo=2: the scene reproducing the sky of the mountainous area in Timer=10: until "1" to "9" are pushed with the button operation of the infrared remote controller after the scene continues ten seconds.

Now, in the scene to reproduce the sky of the mountainous area, as shown in FIG. 17, the luminance of the light pollution lamp (LED0) which determines the brightness of the background sky is rather dark 10. Also, the luminance of the white-chip LEDs (LED1-LED6) which determine the brightness of the printed luminous stars which are bright stars is the standard value (at least 8 to at most 85) provided by the stars of the Orion shown in FIG. 18. This standard value is set to the value which shows the luminance to be observed in the same magnitude as the real stars when the starry sky reproducing sheet is observed in the supposed distance: now ten meters. Also, as the luminance of the backlight LEDs (BL111-BL444) which determine the brightness of the transmitted-light stars which are intermediately bright stars, likewise the standard value (=100) which is provided by the stars of the Orion shown in FIG. 18, is set as the value of all backlight LEDs. Then, the value of scintillation is set to the value ±30% to reproduce the standard blink which occurs in observing from the ground. That shows the standard blink without the highlight indication is reproduced. Besides, as the luminance of the UV lamps (UV0, UV11-UV44) which determine the brightness of the printed luminous stars which are dark stars, that of the wide-angle UV lamp (UV0) is set to 50, and those of the narrow-angle UV lamps (UV11-UV44) are 0 in non-lighting. That shows there is no highlight indication. Moreover, the luminance of the white-chip LEDs (LED7, LED8) which determine the brightness of the light-emitting lines are set to 0 in non-lighting. That shows the light-emitting lines for the explanation are not used.

As a result, the stars which are reproduced with the starry sky reproducing sheet blink in the dark sky without light pollution in the mountainous area rich in nature, then the beautiful starry sky is reproduced.

Next, when the observer pushes the button "2" of the infrared remote controller, the one-chip CPU 301 operates according to the program operation already explained, and performs the operation named "light pollution explanation" shown in FIG. 16. In this operating mode, desirably the user views it playing the explanation contents such as video sites on the Internet.

In this operating mode, the scenes of "urban sky", "mountainous area sky" and "starry sky viewed from space" in the four scenes go on by pushing the button "0" of the infrared remote controller.

Now, as shown in FIG. 17, in "urban sky", the light pollution lamp (LED0) is rather bright (=100), and the white-chip LEDs (LED1-6), the backlight LEDs (BL111-BL444), and the wide-angle UV lamp (UV1) are respectively darker two magnitudes than the standard value adopted in "mountainous area sky". Therefore, the stars becoming dark by the light reduction by the dirty air are reproduced in the night sky which gets bright because of the light pollution. Also, in "starry sky viewed from space", the starry sky which is observed in space with no air is reproduced. That is, the night sky without the light pollution is reproduced, and it is characteristic that the stars never blink without scintillation. After that, the scene goes back to "mountainous area sky" and it is kept until the buttons "1" to "9" of the infrared remote controller are pushed.

In the above operating modes, the "starry sky viewing" mode is suitable for enjoying the starry sky with the naked eyes installing it on the bedroom wall. The "light pollution explanation" mode is suitable for the environment study to view a change of the whole starry sky with the naked eyes. Both of them are used for observing with the naked eyes.

On the other hand, "the Orion explanation" which is selected by pushing the button "3" of the infrared remote controller by the observer is the useful operating mode for the use with the astronomical telescope. In this operating mode, it is desirable to use the astronomical telescope which has the diameter of about 8 cm and the digital CCD camera installed about ten meters away from the starry sky reproducing device.

In "the Orion explanation" mode, as shown in FIG. 17, the three scenes of "urban sky", "mountainous area sky" and "constellation picture" switches every one minute and automatically go to the scene of "position of the Orion Nebula". It is assumed that they are viewed while playing the explanation contents such as video sites on the Internet.

In the scene of "constellation picture", the plastic optical fiber (f7) to reproduce the constellation lines of the Orion which is one of the light-emitting lines emits light, and the state of the Orion is reproduced. On this occasion, the stars such as the light-emitting element stars, the transmitted-light stars, and the printed light stars are one magnitude darker in order to make the constellation lines easy to view.

In "position of the Orion Nebula", the explanation of the Orion Nebula is provided in the explanation video, and the observer looks for the position of the Orion Nebula according to the explanation. At this time, the plastic optical fiber (f8) emits light and the light-emitting lines are displayed to indicate the position of the Orion Nebula (M42), therefore the observer can easily find the Orion Nebula.

In the conventional starry sky reproducing device, in order to display the constellation lines and the positions of certain celestial objects, the constellation pictures are projected with the projector, drawn with the phosphorescent paint, and the constellation pictures drawn by the fluorescent ink are lightened with the UV lamp. However, there are problems that the equipment is necessary to use the projector, emitting light cannot be controlled by the phosphorescent paint, and the constellation pictures are displayed with the printed luminous stars always at the same time by drawing the fluorescent ink.

However, the starry sky reproducing device of the present invention can display the positions of the celestial objects by the linear light-emitting lines which can adjust the luminance with no operation of the UV lamp, therefore there is the effect that the constellation pictures and so on can be reproduced easily and appropriately according to the explanation.

At this time, the stars are reproduced as well as "mountainous area star". Also, the luminance of the light pollution lamp (LED0) is set to zero so that the darkest stars to reproduce with the printed luminous stars (U6) are not covered with the brightness of the sky, and the darkest starry sky on the earth is reproduced. Therefore, in the case that the Orion Nebula is photographed for a long time with the digital CCD camera, there is no duplication.

At this time, the observer observes the Orion Nebula in detail with the binoculars or the astronomical telescope. With the binoculars, the observer can view the expanse of the light of the faint clouds of gas and dark stars. The dark slits toward the trapeziums in the middle of the Orion Nebula also can be viewed. Next, the observer observes with the astronomical telescope which has a diameter of 8 cm. Then, the faint clouds of gas are observed and seemed as if a bird is flying. The trapeziums are also can be viewed in detail.

In the real astronomical observation, the slits of the complicated dark belt of the clouds of gas are viewed more clearly, and the wonderful views are enjoyed with the astronomical telescope which has a large diameter of more than 30 cm. However, the astronomical telescope which has a large diameter is expensive and too big to use in the limited space. In addition, it has so long a focus length that it cannot focus on the near starry sky reproducing sheet.

In the next scene "details of the Orion Nebula", the LED elements related to the light-emitting element stars, the transmitted-light stars and the printed luminous stars included in the area that the Orion Nebula exists are set to be two magnitudes brighter than each standard luminance.

Specifically, the LED6 corresponding to the plastic optical fiber (f6) to reproduce the Orion Lot star (magnitude 2.75 star) as the light-emitting element star, the backlight LEDs (BL331-BL334) to reproduce the transmitted-light stars in the area of stars that the Orion Nebula exists, and the narrow-angle UV light (UV33) to reproduce the printed luminous stars in the area of stars that the Orion Nebula exists likewise are set to be two magnitudes brighter than each standard luminance.

If the stars become two magnitudes brighter, the luminance becomes sixteen times as bright as its original. That is equivalent to magnifying the light-gathering power of the telescope which has a diameter of 8 cm sixteen times. Therefore, the same observation experience as to observe with the astronomical telescope having a diameter of 32 cm which is four times bigger if it is converted into diameter. At this time, the brightness balance of the light-emitting element stars, the transmitted-light stars, and the printed luminous stars, which are concluded in a certain area operates not to change, therefore the starry sky same as real one with the astronomical telescope which has a big diameter can be observed.

Now, this function which is realized by the program of the one-chip CPU and the information recorded in the starry sky reproducing sheet related information in the nonvolatile memory, correspond to the function provided by the light-emitting element control means, the illumination panel control means, and the UV-lamp control means.

The practical example of the starry sky reproducing device of the present invention has the structures and functions as above, therefore the effect such as described in "effect of invention" occurs. The following article explains about the items which can more concretely compliment the function effect explained in "effect in invention".

First, with the starry sky reproducing device of this embodiment, the light-emitting element stars reproduce the bright stars whose magnitudes are 0.18-3, the transmitted-light stars reproduce the intermediately bright stars whose magnitudes are 3-9, and the printed luminous stars reproduce the dark stars whose magnitudes are 9-15. Of these, the transmitted-light stars are formed by the mechanical drilling process, however the minimum diameter which can be processed with cheap technology is limited to about 0.1 mm. Also, in order that the starry sky is observed as minute as real one when it is observed about ten meters away by magnifying ten times with the astronomical telescopes, the maximum apparent diameters of the stars are needed to be 6 minutes or less so that they are observed as dots with the human eyes. That is, the diameters of the stars are needed to be 0.3 mm or less.

For these reasons, the holes are 0.19 mm to 0.3 mm in the present embodiment. It is one magnitude if it is converted into the difference of magnitude. In the case that the stars which are included in plus or minus 0.5 magnitude by each hole, the stars whose magnitude ranges are only two can be reproduced. However, the starry sky reproducing device of the present invention has the structure of the laminated sheet as shown in the present embodiment, therefore there is the effect that the stars whose magnitude ranges are six can be reproduced.

In addition, the starry sky reproducing device makes use of the law of nature that "The brighter the natural stars are, the fewer the number of them is. The darker they are, the more it is.", and optimizes the combination of the light-emitting element stars and the printed luminous stars which are different in the principles of the reproduction methods, therefore the effect which cannot be fulfilled by the method only combining the conventional technology simply occurs.

That is, with the printed luminous stars, if the luminance of the UV lamp increases, the intensity of visible light which is included in the light of the UV lamp also increases, the irradiated surface of the 1st paper layer of the laminated sheet is illuminated by the visible light, the originally dark parts of "sky" other than the stars emit light slightly, and the minute stars cannot be viewed. Therefore, the luminance of the UV lamp cannot be increased recklessly. That is remarkable in the ultra violet type LEDs.

On the other hand, the diameters of the printed luminous stars cannot be enlarged recklessly so that they are observed as dots even when they are magnified with the telescope. The light emission efficiency of the fluorescent ink: the luminance per unit area is also limited. For these reasons, there is the defect that the brightness of the stars which can be reproduced by the printed luminous stars is limited.

On the other hand, there is the advantage that the printed luminous stars can form a lot of stars rapidly and at a low cost in comparison with the transmitted-light stars and the light-emitting element stars because they are formed by the printing process of the ink-jet printer. Therefore, it is effective to apply the technology of the printed luminous stars to the reproduction of a lot of dark stars of the stars to reproduce.

Also, the transmitted-light stars have a large formation cost per one star in comparison with the printed luminous stars because they need to be made one by one with the processing needle. On the other hand, the luminance of the backlight LEDs increases, the minute light emission of the printed luminous stars printed on the surface of the 1st paper layer of the laminated sheet is not disturbed and the starry sky having a high contrast is reproduced because the light of the parts of "sky" other than stars is blocked off by the light shielding layer having a high light shielding performance such as an aluminum foil. Therefore, the luminance per unit area is set high in comparison with the printed luminous stars by irradiating to the outside of the laminated sheet by high illuminance with the backlight LEDs having a high luminance. Therefore, it is effective to apply the technology of the transmitted-light stars to the reproduction of the stars brighter than the magnitude of the stars which are reproduced by the printed luminous stars.

Also, the light-emitting element stars have a large formation cost per one star in comparison with the printed luminous stars and the transmitted-light stars because the plastic optical fibers need to be laid on the laminated sheet. On the other hand, the entry faces of the plastic optical fibers are located near the light emitting faces of the white-chip LEDs, and they can condense the lights with high efficiency and guide them to the inside of the laminated sheet as the light-emitting element stars. Therefore, the light-emitting element stars can reproduce the brighter star in comparison with the transmitted-light stars which is reproduced by the transmittance of the lights of the backlight LEDs which are scattered apart at a prescribed distance. Therefore, it is effective to apply the technology of the light-emitting element stars to the reproduction of the stars brighter than the magnitude of the stars to reproduce by the transmitted-light stars. There is also the effect that the cost rise is reduced because the brighter stars are few in number.

In this way, in the embodiment of the starry sky reproducing device of the present invention, there is the great effect that the stars in a wide range of brightness ranging from the magnitude 0.18 shining star to magnitude 15 star can be reproduced cheaply and effectively in size 0.3 mm or less to be viewed as dots even when they are observed ten meters away by magnifying ten times with the astronomical telescope. By using these design concepts, the ten billion times dynamic range of magnitude 25 described in the target capacity 1 of the present invention can be realized.

Also, the starry sky reproducing sheet to reproduce Orion is explained in detail in the embodiment, the plural starry sky reproducing sheets of various scales and areas of stars can be made in the same way. On this occasion, they can be changed easily by removing the installation frame, and only one backlight and one body board may be prepared, which is very good economically.

Also, the information related to the starry sky reproducing sheet is recorded in the nonvolatile memory in advance, therefore there is the great effect that the one-chip CPU inputs it concurrently with the change of the starry sky reproducing sheet, and operates the stars to perform the lighting control in an appropriate luminance automatically. When it is used as a learning faculty in science museums, the learners select the starry sky reproducing sheet they want to learn, install it on the device, and they can learn flexibly while switching the operation modes with the infrared remote controller and playing the related explanation video contents.

In addition, the present invention is not limited to this embodiment and various configurations are possible. For example, in the case of this embodiment, the information related to the starry sky reproducing sheet is recorded in the nonvolatile memory, however the starry sky reproducing sheet related information which is appropriate to the installed starry sky reproducing sheet may be recorded in other storage means. For example, the starry sky reproducing sheet related information may be recorded as second dimensional bar codes on the surface of the starry sky reproducing sheet, read with reading device like smartphones, sent to the infrared sensors by infrared rays, and inputted through the infrared sensors by the one-chip CPU. Also, if all starry sky reproducing sheet related information are not recorded in the starry sky reproducing sheet itself, the shortage of the starry sky reproducing sheet related information may be obtained by sending the distinction ID of the starry sky reproducing sheet recorded in the starry sky reproducing sheet to the Internet server, and communicated to the one-chip CPU. On this occasion, there is the effect that the learning effect improves when the learner obtains the explanation information about the starry sky on the Internet, and listens to the explanation voice while displaying a useful image on the smartphone screen. This application is explained in detail in Embodiment 2.

Embodiment 2

Next, we will explain about Embodiment 2 of the present invention referring to the figures. Within Embodiment 2, we realize the target capacity 5 to 11 in addition to performance 1 to 4. Furthermore, the symbols in the figure are indicated with the same symbol within the other figures in the above-mentioned Embodiment 1 if the technological construction are the same.

Before the explanation of Embodiment 2, we will explain about the problems related to target capacities 5 to 12 the conventional technology shown in the Patent Literature 1 and 2 has. If there is no particular description, the projection planetarium in the Patent Literature 1 and 2 is referred to as the conventional technology in the explanation below.

Figure 34:
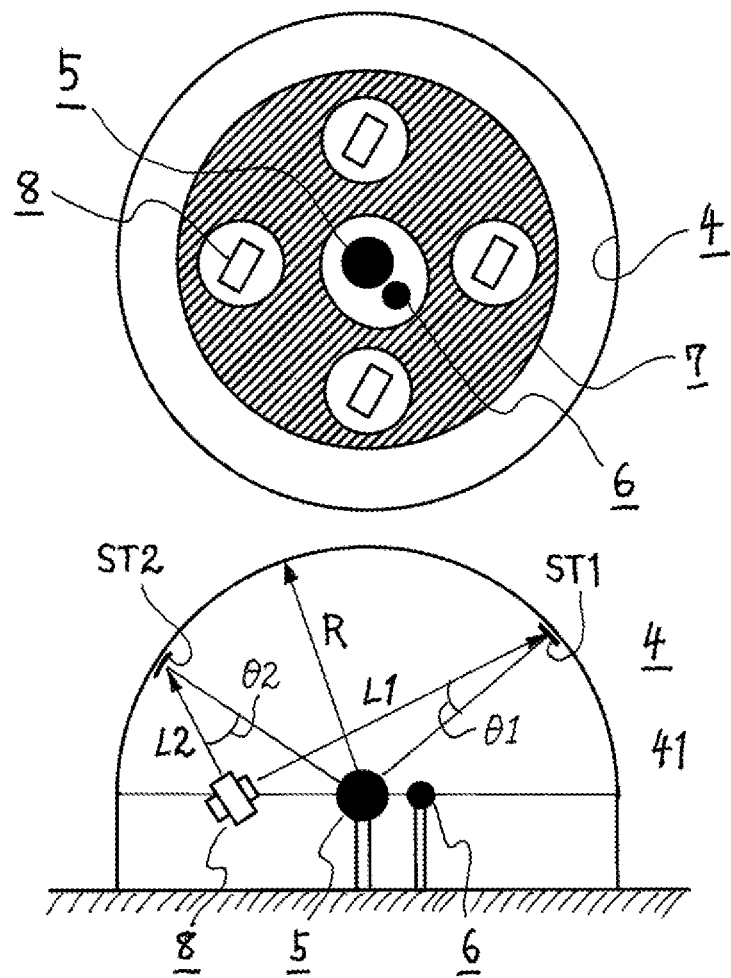
FIG. 34 A layout drawing of the equipment in the conventional planetarium.

As in the conventional technology shown in FIG. 34, projection device 5 to project stars, projection device 6 to project the whole sky and multiple seats 7 for the audience to observe the stars and commentary images projected on dome 4 are placed inside the dome 4. Projection device 5 to project stars reproducing the starry sky on dome 4 by projecting the light from the lamp, which passes through the hole formed on the original star board with the star projection lens. The projection device 6 to project the whole sky projects the starry sky shown on the high resolution display, commentary images and so on dome 4 through a wide angle lens. In the conventional technology from the Patent Literature 2, projection device 5 to project stars project stars brighter than a certain level and projection device 6 project stars below the level on dome 4.

The conventional technology are consisted of the factors mentioned above. So, the audience can experience introducing the celestial object (target capacity 7) or observe multiple reproduced celestial objects above the horizon (part of target capacity 8), confirm the observed star's location in the sky (target capacity 9) by using the either telescope 8 placed inside the dome 4.

In the conventional technology as shown in FIG. 34, 4 telescope 8 are placed inside the dome 4. But the conventional technology has many problems such as mentioned below.

Firstly, to observe the projected stars on dome 4 in a position where it is not distorted, the telescope 8 is desired to be placed in the normal direction of the surface of dome 4. But in the conventional technology, projection device 5 to project stars and projection device 6 to project the whole sky exists in the normal direction so it is difficult to place the telescope there. Thus, the telescope 5 is desired to be placed near the center of dome 4 although it would be separated from the projection devices 5, 6. But then, a new problem occurs. Near the center of dome 4 is an excellent position for the audience who observes with the naked eye and when a telescope is placed there, the number of seats that can be placed becomes fewer. Even if this problem is ignored and telescope 8 is placed by removing part of the audience seats 7, due to the position of telescope 8 not placed in the center of the dome 4, an angle (θ1) occurs between the normal direction of where the celestial object (ST1) is projected on the surface of dome 4 and the line connecting the telescope 8 and the celestial object. Due to this angle (θ1) the location of the star will be observed distortedly, and this problem cannot be ignored.

Also, depending on the location of the star other problems occur. For example, when observing a different celestial object (ST2) the angle (θ2) becomes larger and the location of the star will be observed distortedly. Furthermore, the distance (L1, L2) between the telescope 8 and each celestial object (ST1 and ST2) changes, so the observed largeness of the star changes due to the celestial object and the telescope 8's location and therefore the focus of the telescope 8 changes too. For these reasons the conventional technology has many problems due to the failure in achieving target capacity 5.

Furthermore the celestial objects (ST1, ST2) are projected on the surface of dome 4 so the distance between each celestial object (ST1, ST2) and telescope 8 (L1, L2) cannot be made significantly larger than the dome 4's radius(R). This problem prevents in achieving target capacity 6. This problem appears conspicuously when telescope 8 is positioned near the center of the dome to achieve target capacity 5 as much as possible.

In particular, many diameter of the dome of the planetarium facilities existing inside Japan are 12 to 20 meters in length. As an example, when the diameter of the dome is 16 meters, the distance between the celestial object and telescope 8 cannot be made much larger than 8 meters.

If target capacity 6 is not achieved, the focus position moves largely and also the aberration of the lens becomes worse when a telescope on market is used because the telescope is designed to observe celestial objects at infinite. This appears conspicuously when the telescope used is a high light-gathering large diameter telescope with a lens over 200 mm in length to observe a dark celestial object. Thus the conventional technology has many problems due to the failure in achieving target capacity 6.

Next, regarding target capacity 8, multiple celestial objects reproduced above the horizon can be observed at the same time by preparing multiple telescopes. But, largely separated celestial objects on the celestial sphere, such as the Sagittarius in the summer galaxy, the Orion in the winter galaxy, Coma Berenices located in the galactic north pole and the Sculptor located in the galactic south pole cannot be all projected on the dome at the same time while showing multiple nebulas and star clusters existing inside each constellation. So, there was a problem that they could not be observed at the same time.

Also with the conventional technology, many problems occur when observing multiple celestial objects because the celestial objects reproduced on dome 4 is reproduced in the same size and color as observed on the celestial sphere. Specifically, when observing a relatively bright celestial object with a large apparent diameter, a small diameter telescope 8 with a low focus length is desired to gain low magnification. Conversely, when observing a dark celestial object with a small apparent diameter, a large diameter telescope 8 is desired for high light gathering power. Thus the telescope needs to be frequently changed depending on the celestial object observed. Also within the same telescope, the eyepiece needs to be changed in order to change the magnification.

Therefore, the setting needs to be changed frequently and this is obstructive to offering efficient services to a large audience. Especially when observing a dark celestial object, a large telescope is needed and it becomes physically difficult to place it inside the dome. Also other problems occur for the telescope on the market is designed to observe celestial objects at infinite, the focus becomes out due to the distance between the telescope and the surface of the dome.

Thus the conventional technology has difficulty in achieving target capacity 10 due to the celestial object observed with the telescope being reproduced in the actual size and brightness seen on the celestial sphere.

Next, regarding target capacity 11. At star observation parties where the actual starry skies are observed, observing a single celestial object with multiple telescopes are used from before, for efficient observation among plural number of observers. This method is necessary for providing efficient learning opportunity to many observers as possible, and this is the same to the device reproducing the starry sky concerning the present invention. Therefore, by using the projection device 6 to project the whole sky and by projecting the name of the celestial object and information near the reproduction image, it can be used for greater understanding.

However, when observing a single celestial object with multiple telescopes in the conventional invention, if the commentary information projected near the celestial object were the same, appropriate commentary cannot be chosen for all of the audience using the telescope 8 due to the difference in school age, the mother tongue, the astronomical knowledge they have from past experience such as other star observation parties and events they took part in. In a limited projection space, it is not realistic to show all the commentary information for various situations due to the lack of visibility, thus has problem in providing appropriate commentary information for each audience. Also, if the observer does a star observation by using the device which reproduces the starry sky in the conventional technology, there was a problem when the observer does a similar observation again with the device because there is no record of the past experience. Therefore the past observing experience was not reflected on the commentary information or the commentary from the instructor.

Next, regarding target capacity 12. With the conventional technology, projection device 5 to project the star and projection device 6 to project the whole sky are placed near the center of dome 4 to project the stars and images on the surface of dome 4. So when the observers want to experience in taking realistic astrophotography by bringing in a model of objects on ground, such as the mountains, trees, buildings, people and so on inside the dome, a devise is needed for the projected images from the projection device 5 and 6 to not project on the model of the ground objects.

Among the conventional technology, the technology in Patent Literature 1 can erase the stars projected from the projection device 5 in the area where ground objects such as clouds and buildings are projected, while projecting those ground objects from the projection device 6 to project the whole sky. So the method of projecting the starry sky on dome 4 but not projecting on clouds or on ground objects is possible.

This technology can accept to clouds or buildings which are assumed in advance, but is not suggested to flexibly accept to the various ground objects or to the various setting of the model the user brings in.

Also, the appropriate projection state between the ground objects and the starry sky is only established by the technology in Patent Literature 1 only when it regards the projected sky and ground objects on dome 4. So, when an object is placed inside the dome 4 or when multiple objects are placed in different positions, when seen from positions apart from the position of the projection device 5 to project stars, it is geometrically impossible to establish the state. Therefore with conventional technology, there is a problem in difficulty of providing an experience of astrophotography, based on the observer's various requests.

From the descriptions above, it is clear that the conventional technology has many problems in achieving the 12 target capacities the present invention aims to achieve and was difficult to provide an appropriate developing learning environment using an astronomical telescope.

Next, we will explain about Embodiment 2 by referring to the figures. Embodiment 2 introduces a device to reproduce the starry sky which solves the problems the conventional technology has and also achieve the target capacities 1 to 11 within the 12 target capacities the present invention aims to achieve.

Figure 36:
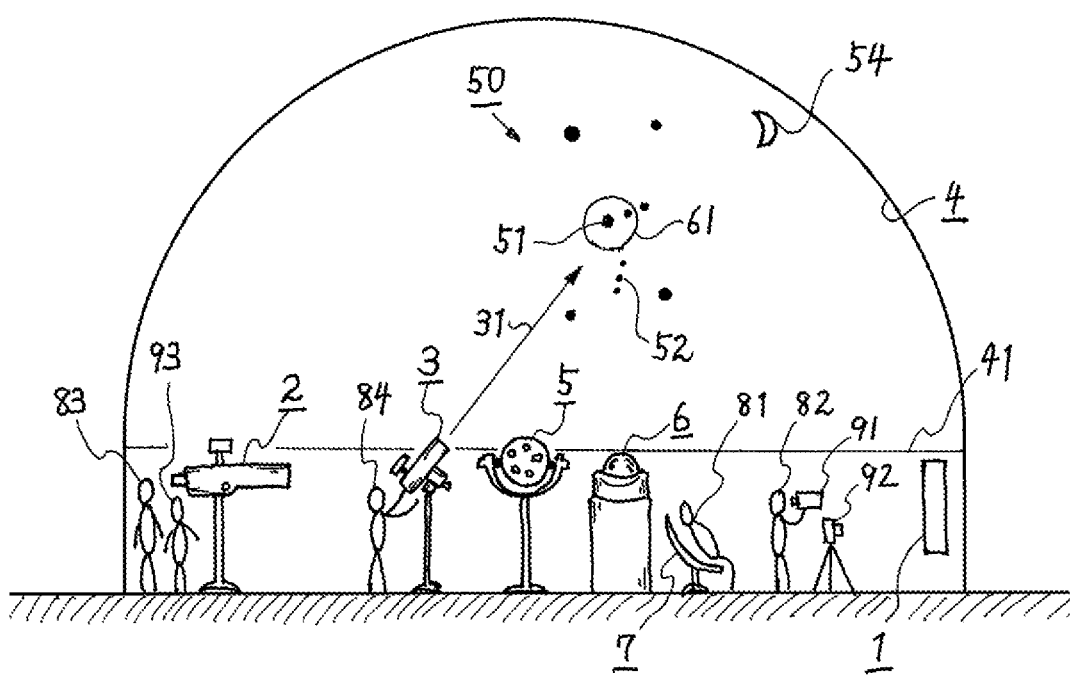
FIG. 36 A side view illustrating the arrangement of the starry sky reproducing device of Embodiment 2 and other equipment in the horizontal dome.
Figure 37:
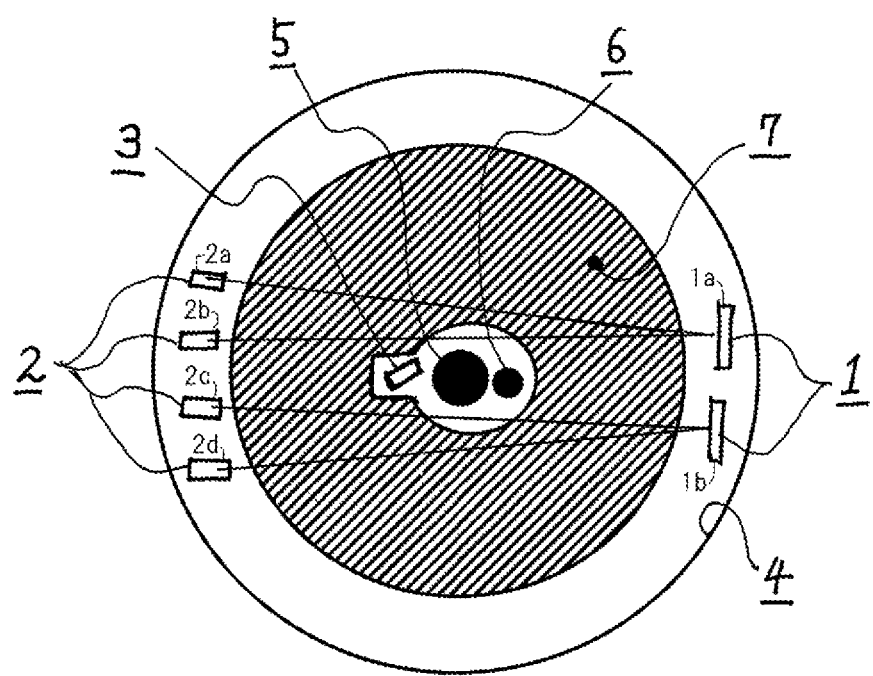
FIG. 37 A top view illustrating the arrangement of the starry sky reproducing device of Embodiment 2 and other equipment in the inclined dome.

Firstly we will explain about the position of the starry sky reproducing device 1 inside the dome 4 of the planetarium facility. As shown in FIG. 36 and FIG. 37, inside the dome 4 of the planetarium facility is the star projection device 5 which reproduces the starry sky by projecting the lamp light, which passes through the holes formed on the original star board and expanded with the star projecting lens onto the surface of dome 4. Also inside the dome 4 there is a projection device 6 to project the whole sky, which projects the starry sky and commentary images displayed on the high resolution display, through a wide angle lens onto the surface of dome 4. Also there is multiple seats 7 set for the audience to view the starry sky projected on dome 4.

Moreover, there are two starry sky reproducing device 1 to reproduce a starry sky which is smaller than dome 4 (a starry sky section area) and 4 telescope 2 and a dummy telescope 3 to operate the introduction of the celestial object inside the dome 4 of the planetarium facility. Telescope 2 is allocated so that one starry sky reproducing device can be observed with two telescope 2 and the line of sight is positioned and fixed to the direction of the starry sky reproducing device 1. It should be noted that the number of the starry sky reproducing device 1 and telescope 2 shall not be applied to this number and for example, more telescope 2 can be used for a larger number of starry sky reproducing device 1. The starry sky reproducing device 1 and telescope 2 are both positioned outside the space where the audience seats will be set and below the horizon 41.

Moreover, the number and position of the starry sky reproducing device 1 and telescope 2 shall not be applied to this, and other examples are available. FIG. 85 is one example of another example of the starry sky reproducing device 1 and telescope 2. The starry sky reproducing device 1 and telescope 2 are placed inside a dome with a round floor, or near the outer wall of a square room. The starry sky reproducing device 1 and telescope 2 form a counterpart and is placed in the opposed position. When the starry sky reproducing device is positioned 2 meters above the floor, telescope 2 and the observer 83 does not prevent the observation sight from the opposing telescope 2 when positioned below the device. When it is difficult to place the starry sky reproducing device in a high position, by placing the starry sky reproducing device 1 and telescope 2 alternately along the surface of the wall, telescope 2 and observer 83 will also not prevent the observation sight from the telescope 2 observing the neighboring starry sky reproducing device 1.

When positioned as in FIG. 85, it has an effect on providing observation experience by using multiple pairs of starry sky reproducing device 1 and telescope 2 when providing a star observation experience to a large number of observer 83 taking part in the planetarium. In that case, by widening the space between the telescope 2, it has an effect on securing space for the audience waiting for the observation opportunity near the telescope 2.

It should be noted that this device of positioning is also effective when the starry sky reproducing device 1 in Embodiment 1 is used.

Also the starry sky reproducing device 1 is placed near the wall of dome 4 to secure enough distance for the short distance observer 82 to observe the starry sky reproducing device 1 with the binocular 9 or digital camera 10.

Moreover, telescope 2 is placed at a position to take distance as much as possible from the starry sky reproducing device 1, That is, in the opposing direction of the star reproducing device 1 crossing the center of the dome 4. Also the position of telescope 2 has to be in a position where enough space is secured for the observer 83 observing telescope to use it, and where the star projection device 5, projection device 6 to project the whole sky and the head of the audience 81 sitting on the audience seats 7 does not hinder the optical path when observing the starry sky reproducing device.

Next, we will explain about the structure of the starry sky reproducing device in Embodiment 2 by referring to FIGS. 22, 23, 24, 25, 30, 31, 32, 33, 62. The starry sky reproducing device 1 is placed on the floor of dome 4 under the table 14 by fixing it with the legs 1401. Under the table 14, lightbox 100, infrared sensor 108, and UV lamp 109 are fixed at a position.

Also, two drum 11 which consists of the shaft of the drum 1101 which supports the rotation and drum drive motor 1104 which enables to rotary drive via the timing belt 1103 are placed on lower table 13.

On these two drum 11 are star retention sheet 12, which has multiple retention window 1201 to fix the star sheet 200. The star retention sheet 12's either side is fixed on drum 11 and also is wound around it. By the rotating motion of the 2 drum 11, it makes it possible to place the star sheet 200 which is fixed by the retention window 1201, to the designated position compared to the light box 100. Two-dimensional bar code sensor 17 and drum drive motor 1104 are connected to the one-chip CPU 301 and is made to operate under the behavior of the program described later.

Figure 31:
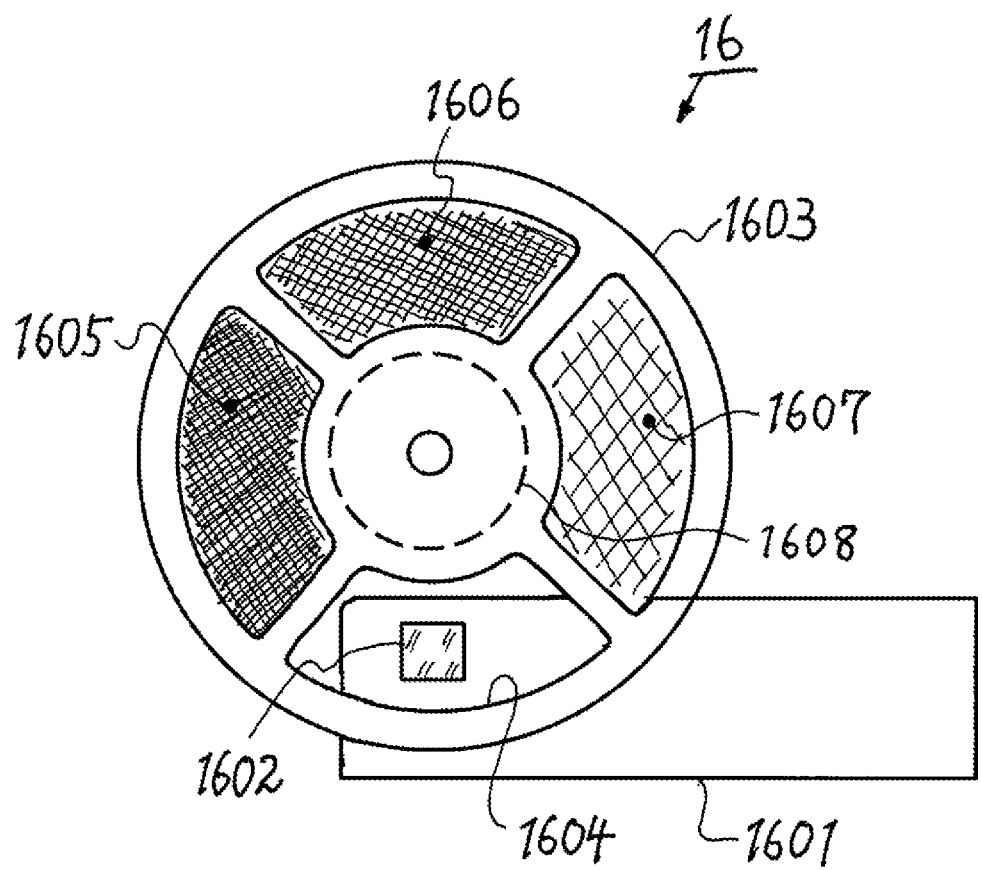
FIG. 31 A view illustrating the structure of the projector unit in Embodiment 2.
Figure 32:
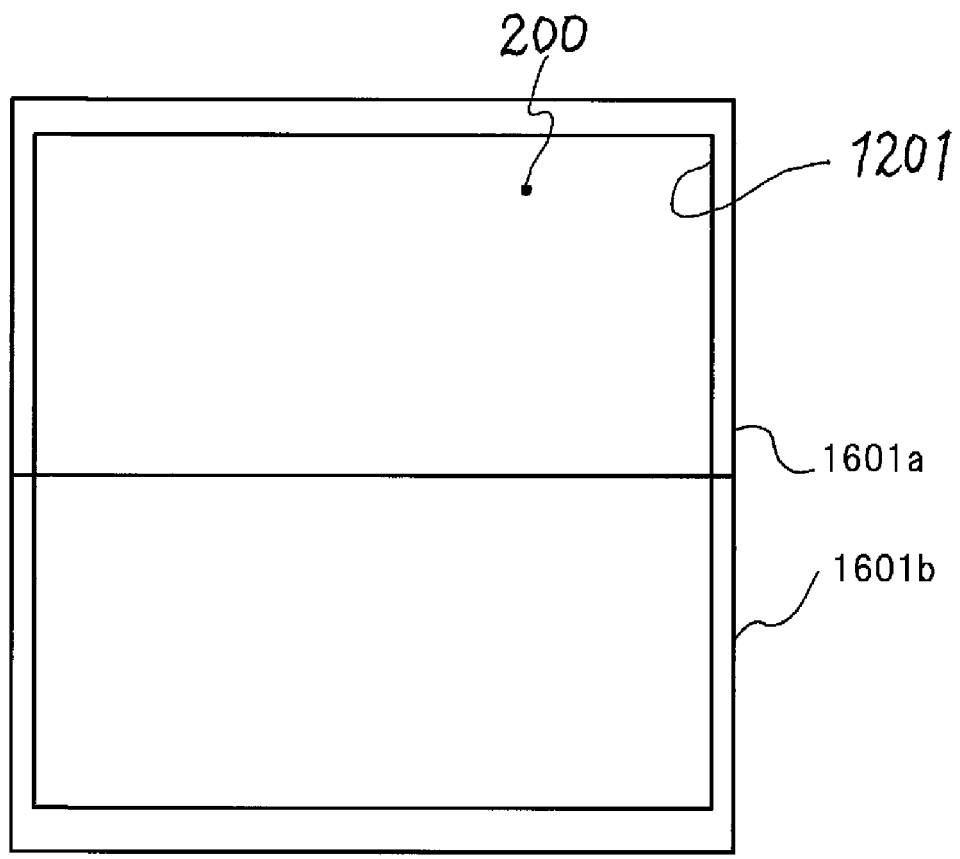
FIG. 32 A view illustrating the location of the images which is projected on the starry sky reproducing sheet in Embodiment 2.
Figure 33:
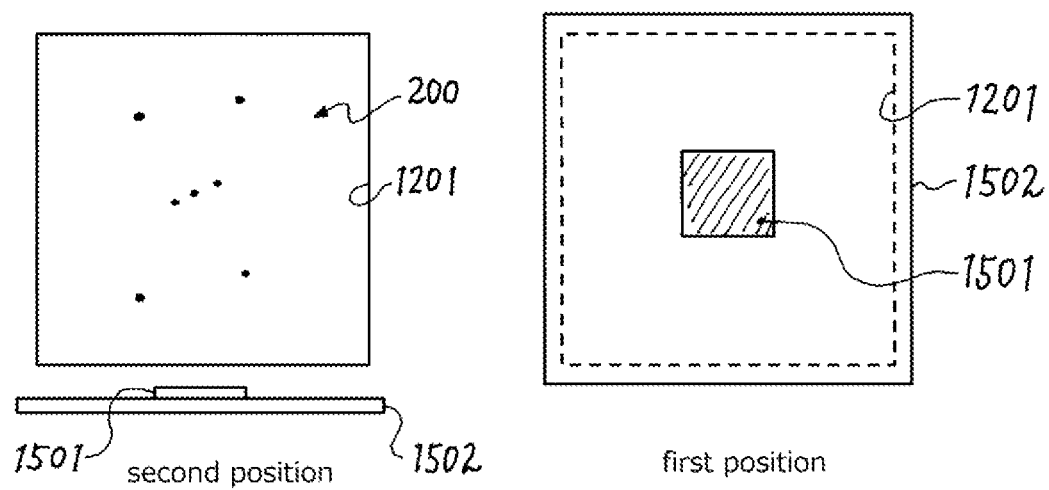
FIG. 33 A front view of the settled location of the display unit in Embodiment 2.

Upper table 13 is fixed above the lower table 13 by two pillar 1301 and two drum shaft 1101. Also, projector unit 16 which consists of projector 1601, filter disk 1603 and filter disk drive motor 1608, is equipped to both lower table 14 and upper table 13. As shown in FIG. 32, both of the projector unit 16 is fixed to a position where it can project on the surface of the split upper-half and lower-half of star sheet 200(1601a, 1601b). It should be noted that as shown in FIG. 31, fixed on filter disk 1603 are 3 light reduction filters which the degree of light reduction are different. High light reduction filter 1605, medium light reduction filter 1606 and low light deduction filter 1607 are fixed. The degree of light reduction of the medium light reduction filter 1606 is 16 times lower than that of high light reduction filter 1605. Also, formed on filter disk 1603 is a window 1604 which a filter is not fixed. Projector 1601 and filter disk drive motor is connected to one-chip CPU 301. One-chip CPU operates the filter disk drive motor 1608 under the behavior of the program described later. The filter disk drive motor 1608 rotates the filter disk 1603 and changes the filter positioned in front of the lens 1602 of projector 1601. This projector unit 16 corresponds to the projector contained in claim 4.

It should be noted that by making the light source of projector 1601 changeable and lower the brightness to the same degree as when the high light reduction filter 1605 is applied, application of filter disk 1603 can be substituted.

Figure 62:
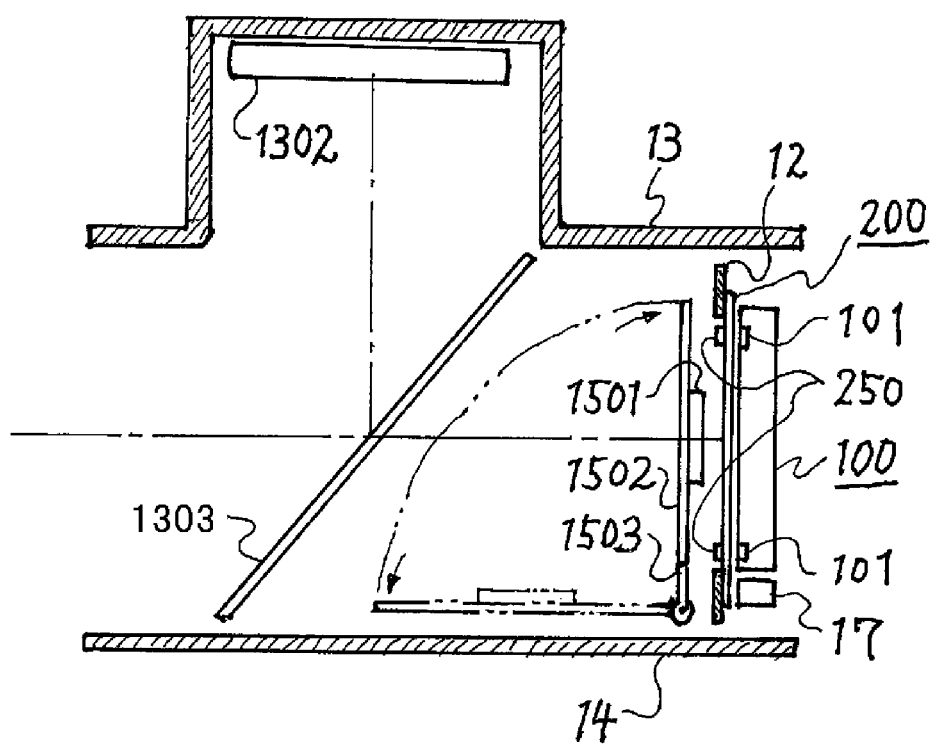
FIG. 62 A view illustrating a variation of the display unit on Embodiment 2.

Also as shown in FIG. 62, instead of applying projector unit 16, display 1302 which can display images on the surface can be applied by fixing it to the upper table 13. By placing a half mirror 1303 which reflects the light of the image from display 1302 while transmitting the light from star sheet 200, it is possible to see the image from display 1302 and the light from star sheet 200 at the same time. For this half mirror 1303, the structure can be made so that the observer can view the commentary information about the reproduced starry sky by the starry sky reproducing device and the reproduced starry sky at the same time through the field of view of the telescope. The brightness of the backlight illumination from the display 1302 can be changed in 4 levels, high, medium, low and very low. This structure is equivalent to the structure of the prompter, who provides the orator with reference information about the manuscript.

From the description here, the effect is the same if projector 1601 is replaced with display 1302. If replaced, the brightness of the backlight illumination should correspond to each filter set by filter disk 1603 as described below. When it is window 1604 without a filter, the brightness should be high. When the filter applied is the low light reduction filter 1607, it should be medium. When it is the medium light reduction filter 1606, it should be low and when it is the high light reduction filter, the brightness should be very low. Shown in FIGS. 41 to 48 are images of the projection from projector 1601, synthesized together from the top and bottom half. In this case if the projector is replaced with display 1302, the synthesized image should be regarded as the image displayed on display 1302.

This display 1302 and half mirror 1303 each corresponds to the display and transmitting reflection plate contained in claim 5.

Display unit 15, which consists of display 1501 which can display high-definition images, display retention plate 1502, arm 1503 and rotation shaft 1504 is fixed to the lower table 14 with the rotation shaft 1504 placed in the center so it can rotate. This display unit 15 can be moved to position 1 by the display unit drive motor 1505, where the observer looking at the star sheet 200 through the telescope 2 which is placed in front of the star sheet 200 and light box 100, can view the display on display 1501. Also it can be moved to position 2, where it is set near the lower table 14 and is evacuated from the observer's sight.

The surface of the display retention plate 1502 is a screen-like picture plane to project the images from projector 1601. The size of the window formed near the center of the plate is smaller than that of the area of which the display 1501, which is fixed behind the picture plane, can display images. It makes it possible to reproduce the projected images from the 2 projector 1601 and images displayed on display 1501 without joints, on the entire surface of display retention plate 1502 when the display unit 15 is set on position 1. The display 1501 and display unit drive motor 1505 are both connected to one-chip CPU 301 and is made to operate under the behavior of the program described later.

Figure 24:
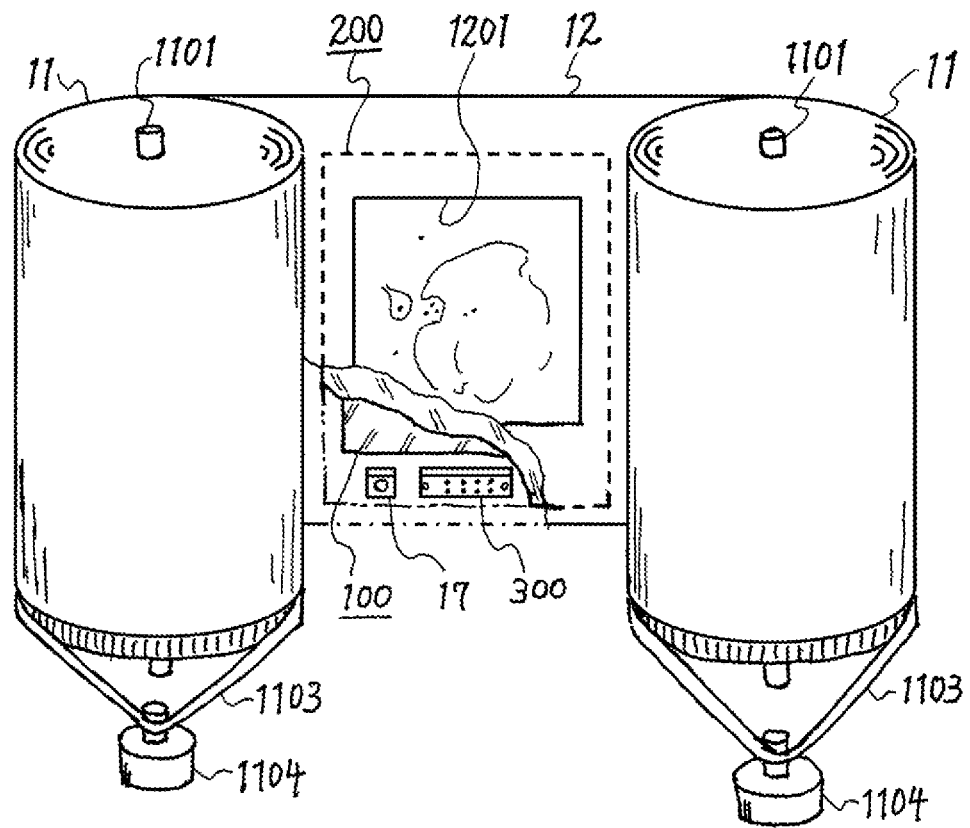
FIG. 24 A partial sectional front drawing illustrating the conversion movement of the drum and laminated sheet in Embodiment 2.
Figure 25:
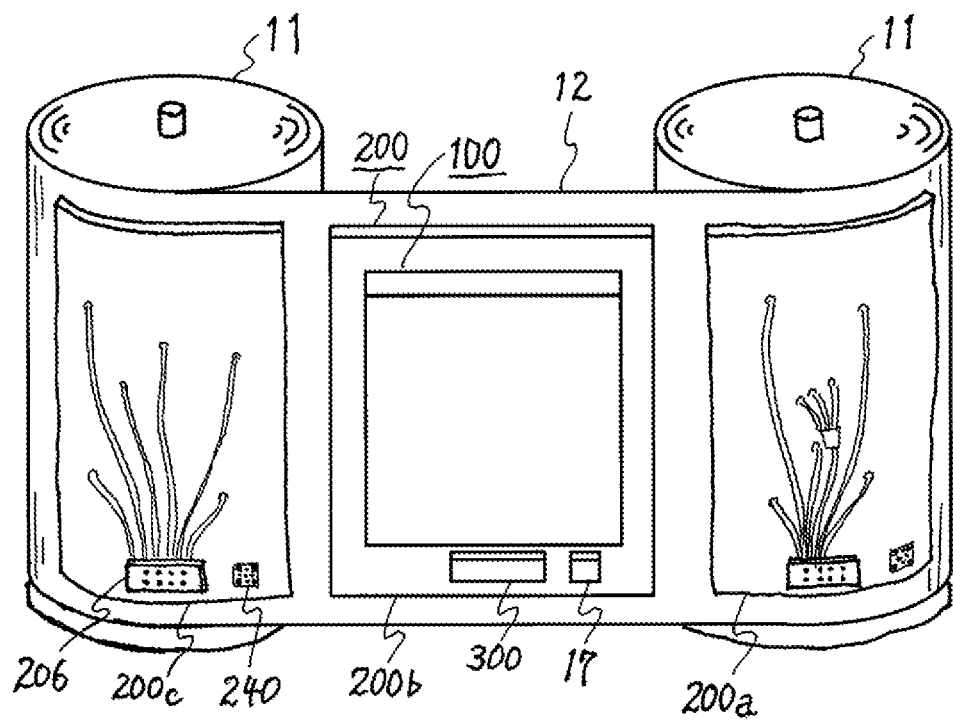
FIG. 25 A back view illustrating the conversion movement of the drum and laminated sheet in Embodiment 2.
Figure 26:
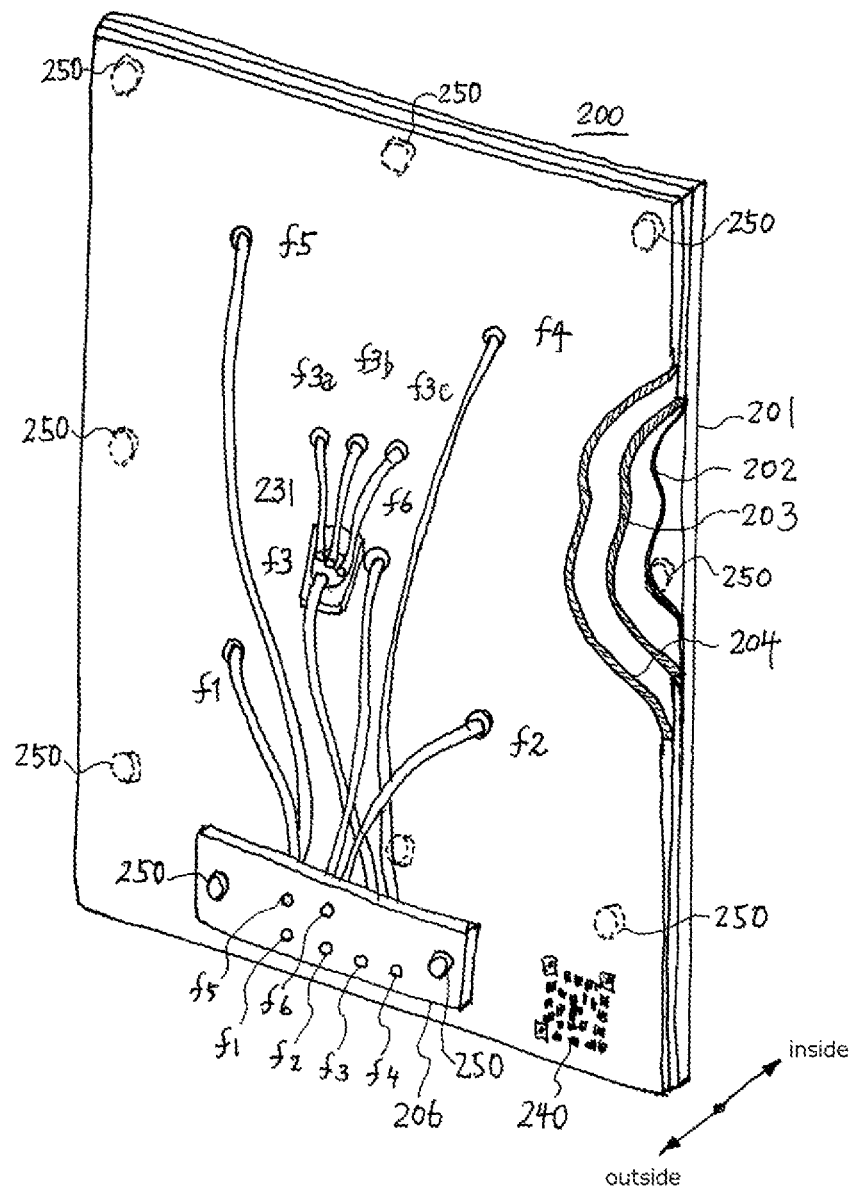
FIG. 26 A back perspective diagram illustrating the first starry sky reproducing sheet inn Embodiment 2.
Figure 27:
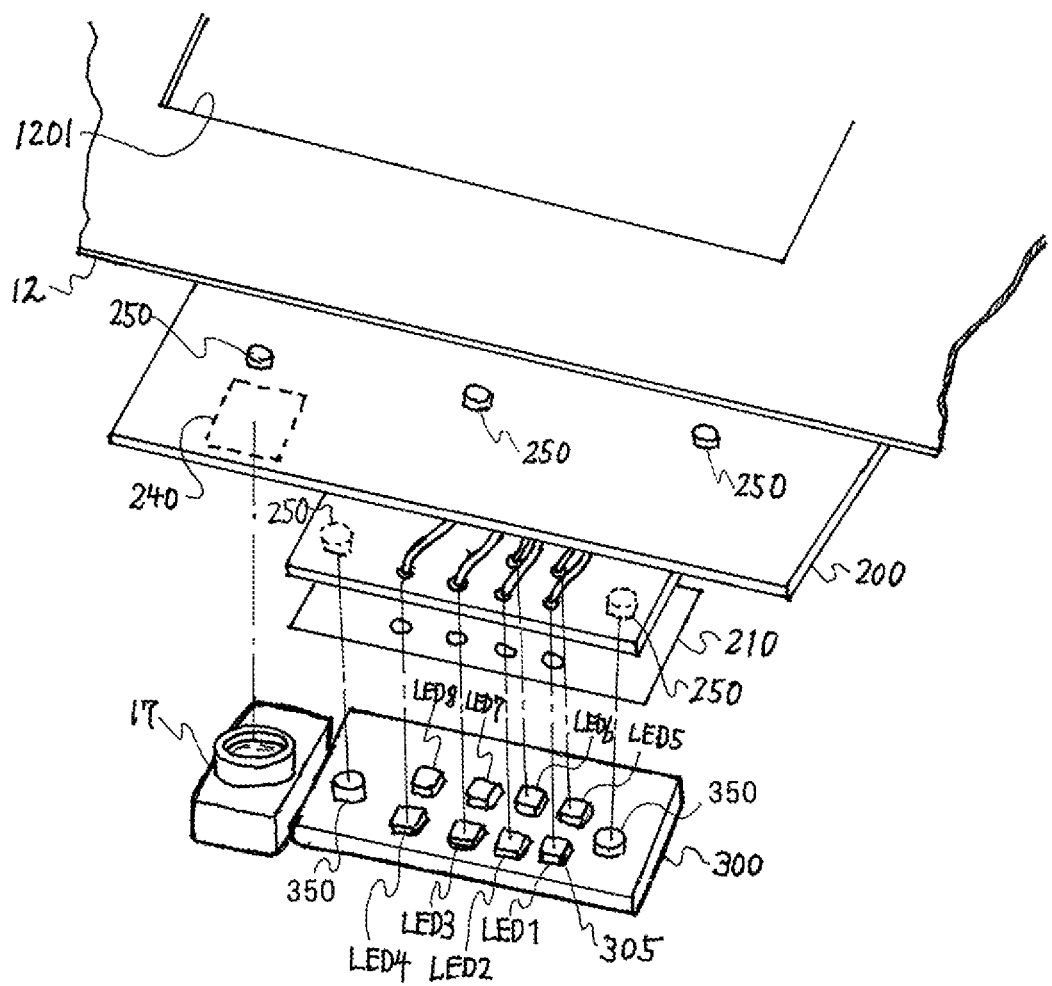
FIG. 27 A detailed drawing illustrating the contact board and body board in Embodiment 2.
Figure 28:
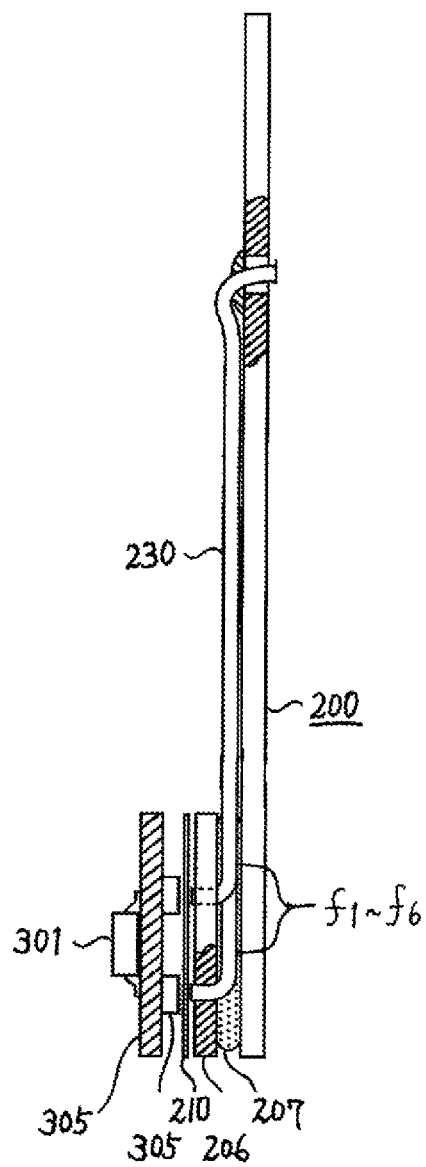
FIG. 28 A partial cross section illustrating the positional relationship of the contact board and the body board when the starry sky reproducing sheet is installed to the starry sky reproducing device in Embodiment 2.
Figure 29:
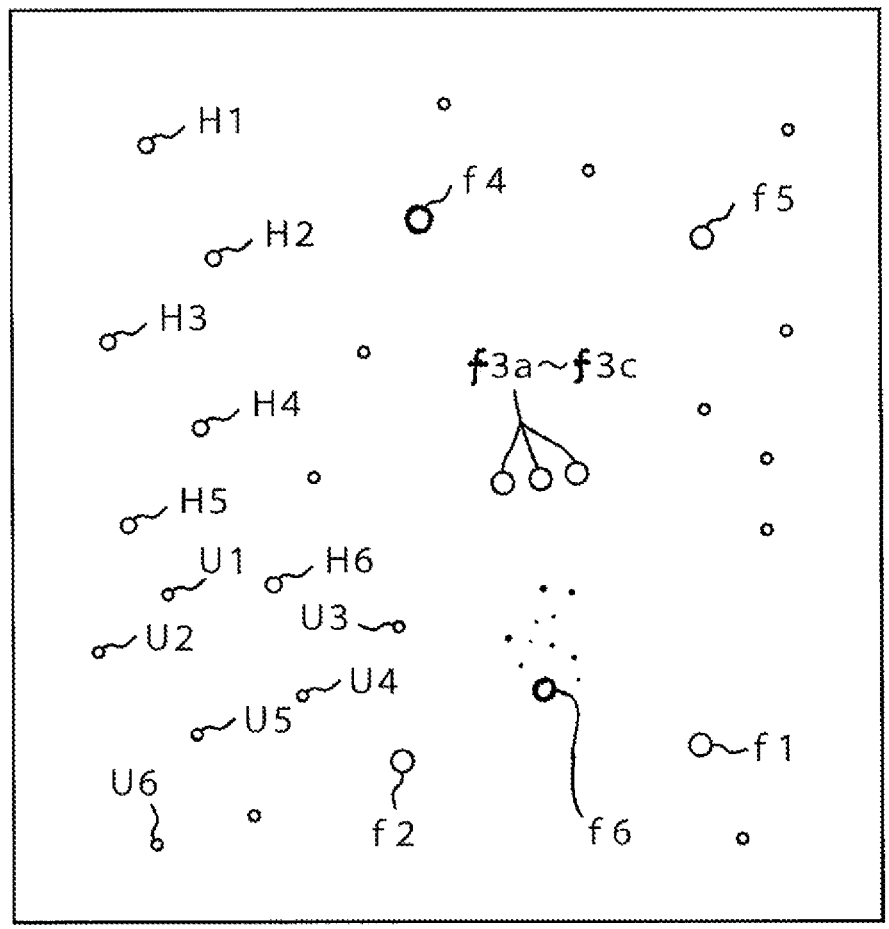
FIG. 29 A view illustrating the reproduced stars on the starry sky reproducing sheet in Embodiment 2.
Figure 30:
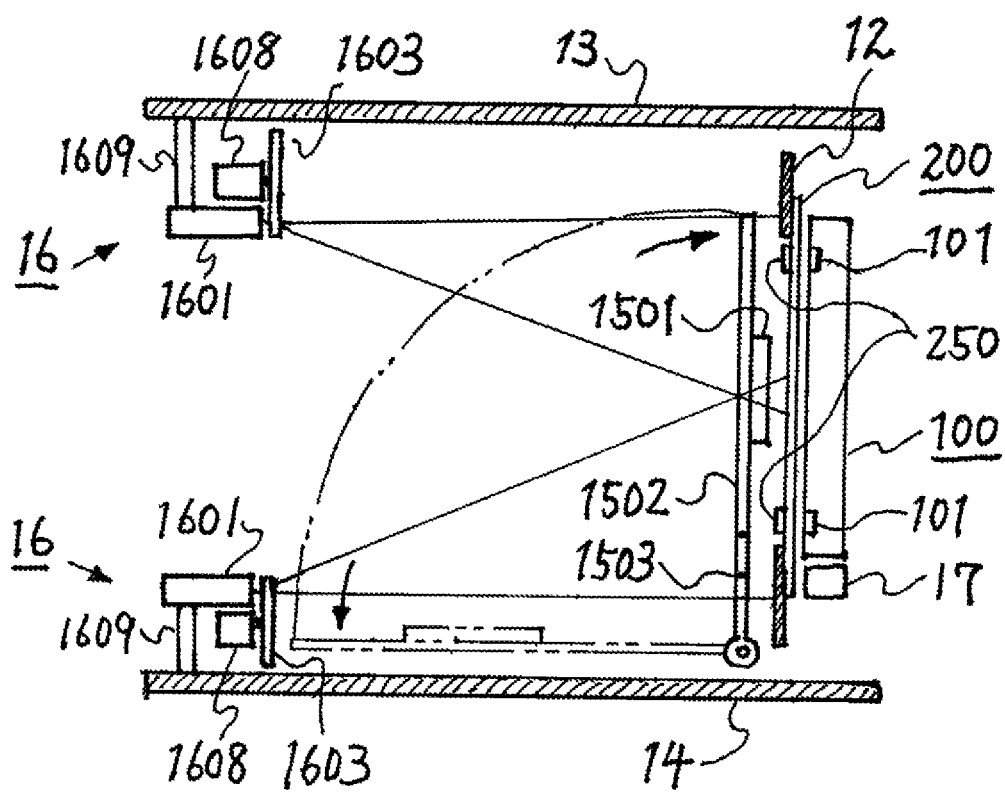
FIG. 30 A partial sectional side view illustrating the starry sky reproducing device in Embodiment 2.

FIGS. 24 and 25 are an image of multiple star sheet 200 on the star sheet retention sheet 12 which is fixed on drum 11. By the rotation of drum 11, it is positioned in front of light box 100 and FIG. 24 is an image seen from the front of the starry sky reproducing device 1. FIG. 25 is an image when seen from behind. In these figures, due to the suction among the magnets 250 which are fixed around the periphery of the star sheet 200, magnets 101 which are fixed around the periphery of the light box 100 and magnets 350 which are fixed on the body board, star sheet 200 are pressed on the transparent plate 102 of the light box 100 and body board 300. Also, the two-dimensional bar code sensor 17 takes the image of the two-dimensional bar code 240, which is printed on the most outer side of star sheet 200, on the third layer of paper 204. For the one-chip CPU 301's program, it can read the information which is written and the position of the bar code. The information written in the two-dimensional bar code 240 holds a peculiar information of the star sheet 200 and the program which runs on the one-chip CPU 301 makes it able to take the appropriate move for the star sheet 200. Also, depending on the detected position of the two-dimensional bar code 240, the drum drive motor 1104 is driven so that the drum 11 can rotate at the appropriate position.

As shown in FIGS. 26 to 29, star sheet 200 and body board 300 are similarly constructed to that in Embodiment 1, but different in the ways explained below. Firstly, the star sheet 200 in Embodiment 2 does not have an integrated optical fiber 205 in the lower area. Secondly, beneath the face of the lamination sheet 220 there is a contact board 206. Thirdly, the contact board does not have a non-volatile memory 208 or a contact pad 209a-209d. Next, around the periphery of the star sheet 200 there are magnets 250 fixed. Also, there is a two-dimensional bar code printed on the third paper layer 204 to identify the type of star sheet 200. Finally, there are no optical fibers f7 and f8 which are laid on the first layer of paper 201 to show the line connecting the constellations and the area in detail.

The one-chip CPU 301 has the functions below in addition to the functions explained in Embodiment 1. The extra functions the one-chip CPU 301 has are, ways to make the projector 1601 and display 1501 output the images, ways to output the field of view display to insert the field of view 61 onto the image projected by the projection device to project the whole sky, which shows the viewing direction from the dummy telescope 3 or the area of view from telescope 2. Also it has means of network communication to gain information from a server connected to the internet which provides information or to send reference information about the commentary to the device the commentator has. In addition it has ways to enter the observer identification information read from the observer identification information reading device 832 which reads the ID card 831 the observer 83 has. Also it has means to drive each motor, motor to drive the drum of the reading device 1104, display unit driving motor 1504, filter disk driving motor 1608 and draw tube driving motor 23 of telescope 2, means to input the information of the telescope's settings from the detection signal sent by the eyepiece detection sensor 25 of telescope 2 or the focus adjusting switch 2302. Finally, it has means to input the introduction information from the detection signal sent by the H-axis and Z-axis sensor of dummy telescope 3, which is for introducing the stars.

The one-chip CPU 301 of Embodiment 2 is explained as an element with all of these means. But it does not necessary have to be this way and can be a composite mean of electric control which consists of multiple elements such as a stick PC or a personal computer.

Also, the means of gaining information can be to access to saved information on a computer's hard disk instead of saving and gaining information on an information providing server.

The other different points are, the face of optical fibers f1 to f7 are placed to the illuminating face of the white chip 305 and fixed to the retention board extended from the light box 100, at a position parallel to the contact board for motor driving function 206. Also, it differs in that it has a magnet 250 and that it has no contact probes 306a to 306d. Except these differences, the constitution are the same so the explanations are omitted.

Next, we will explain about the contents to reproduce the starry sky with the starry sky reproducing device 1 in Embodiment 2, such as the image data. It should be noted that the present invention is not limited to the cases explained below and can accept to various contents related to starry skies.

Figure 38:
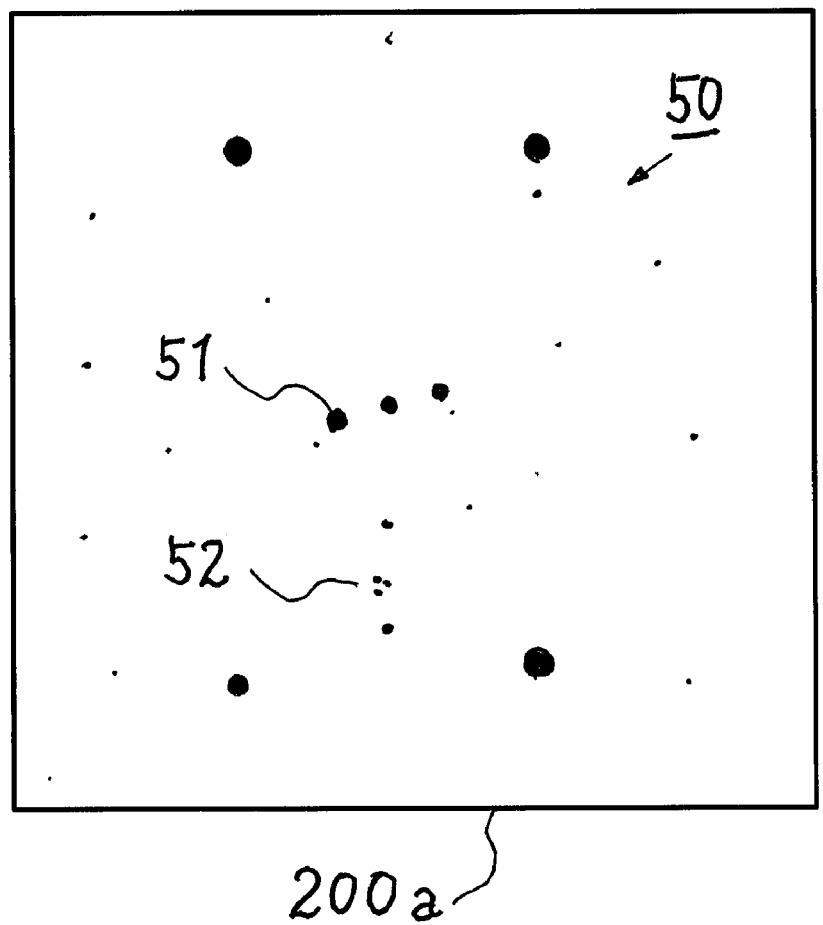
FIG. 38 A view illustrating the starry sky reproduced by the first starry sky reproducing sheet in Embodiment 2.
Figure 39:
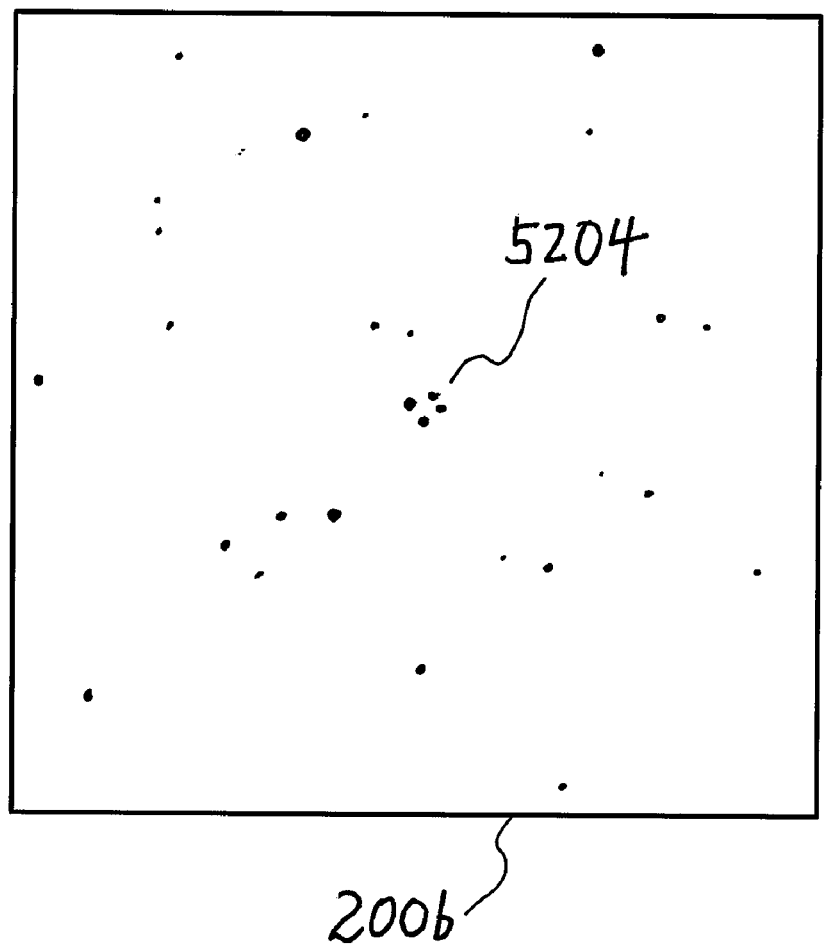
FIG. 39 A view illustrating the starry sky reproduced by the second starry sky reproducing sheet in Embodiment 2.
Figure 40:
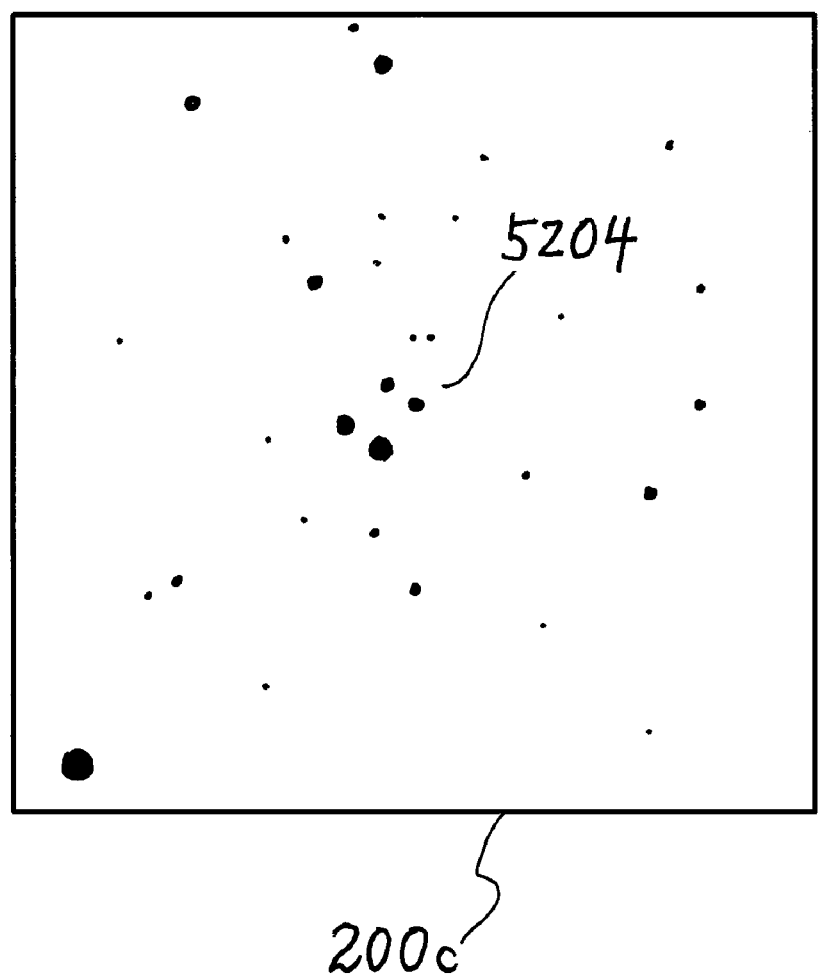
FIG. 40 A view illustrating the starry sky reproduced by the third starry sky reproducing sheet in Embodiment 2.

FIGS. 38, 39 and 40 are images of the starry sky each reproduced by the stars lit up with light-emitting elements, transmitted light and spontaneous luminescent stars from multiple(three, in this embodiment) star sheets, the first: 200a to the third: 200c which are attached to the star sheet retention sheet 12. To be precise, FIG. 38 is an image of the whole Orion 50, reproduced by the first star sheet, 200a. In the Orion 50, the sequence of tristar 51 and the small tristar 52 is distinctive. Next, FIG. 39 is an image of the great nebula of Orion reproduced by the second star sheet, 200b and the trapezium 5204 inside the great nebula can be seen in the image. Also, FIG. 40 is an image of the center of the great nebula of Orion, reproduced by the third star sheet 200c and the trapezium 5204 is reproduced in detail.

FIGS. 41 to 46 and FIG. 51 are images synthesizing the projected images from the 2 projector unit 16. The upper half of each image is projected by the projector unit 16, fixed on the upper table 13 and the lower half is projected by the projector unit 16 fixed on the lower table 14. These images are projected on the surface of the display retention plate 1502 when the display unit 15 is in the first position, and projected on star sheet 200 when set in the second position.

Figure 41:
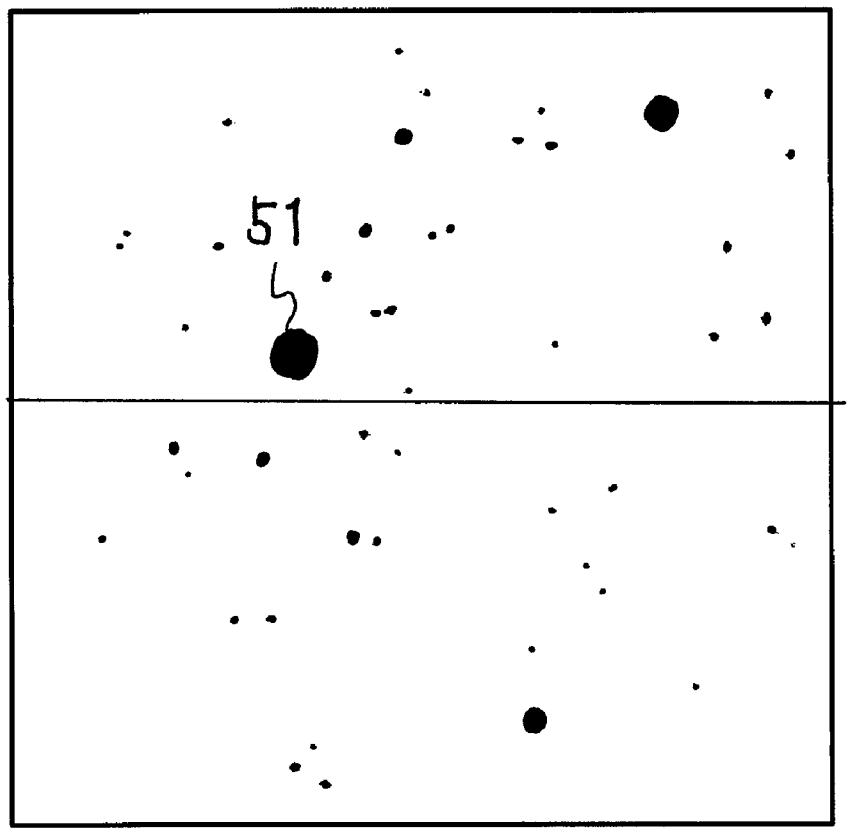
FIG. 41 A view of the first picture projected in the 3rd section in the planetarium program in Embodiment 2.
Figure 42:
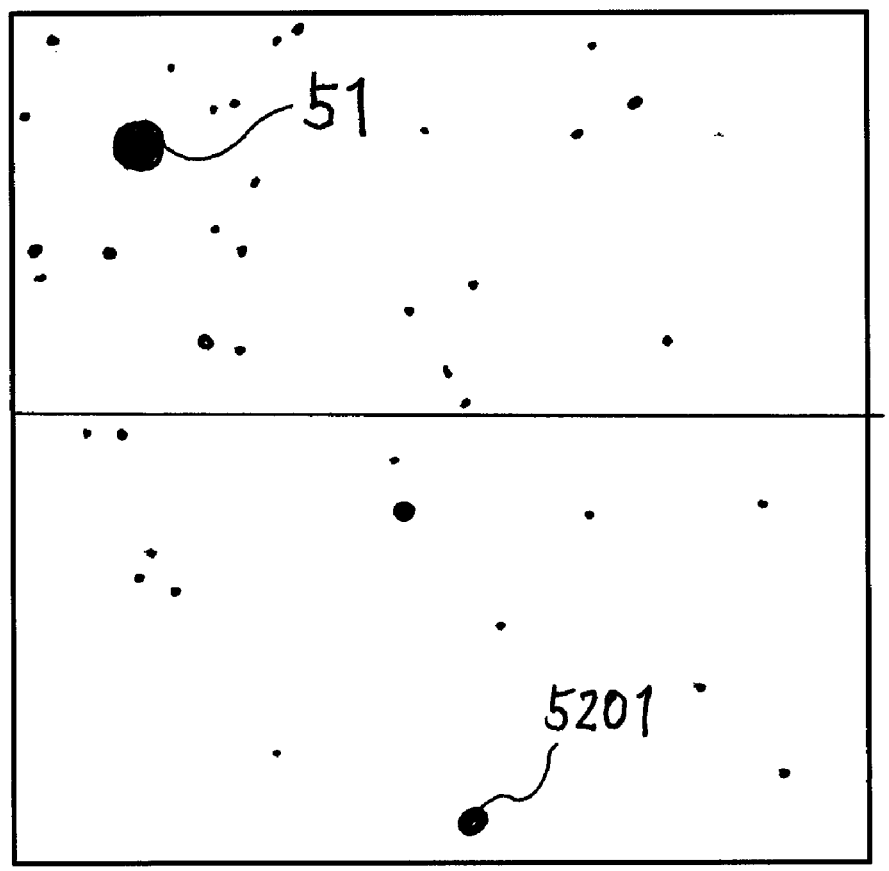
FIG. 42 A view of the second picture projected in the 3rd section in the planetarium program in Embodiment 2.
Figure 43:
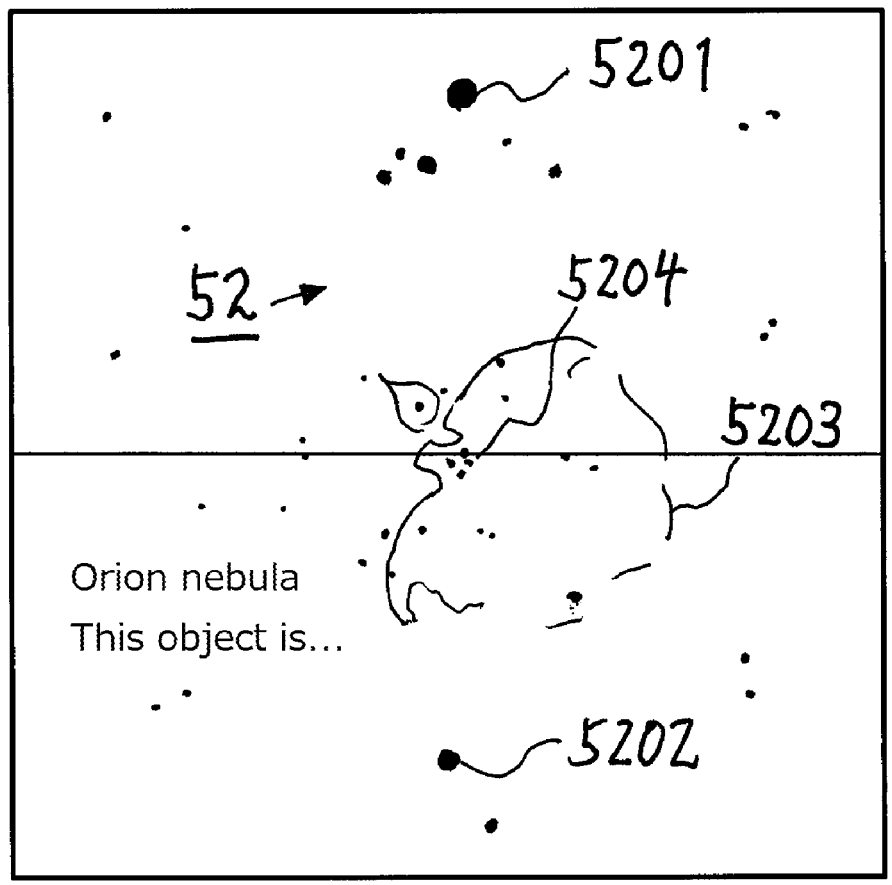
FIG. 43 A view of the third picture projected in the 3rd section in the planetarium program in Embodiment 2.

FIG. 41 is an image which shows the tristar 51 around the Orion's belt. FIG. 42 is an image of the starry sky of which the star 5201 located most north in the small tristar 52, starts to show when the view is moved downwards from the position of FIG. 41. FIG. 43 is an image of which the stars 5201 to 5203 which forms the small tristar 52, starts to show in the view when the view is moved more downwards from the position of FIG. 42. In the middle of the small tristar 52 is the great nebula of Orion, and the pale shaft of light from the diffuse nebula 5203 is reproduced. The brightness of the image of FIGS. 41 to 43 are adjusted so that the observer 83 observing through telescope 2 can observe the projected image in the same brightness as the true sky, when the projector unit 16 is in the most bright display mode which is, when a filter is not applied.

Figure 44:
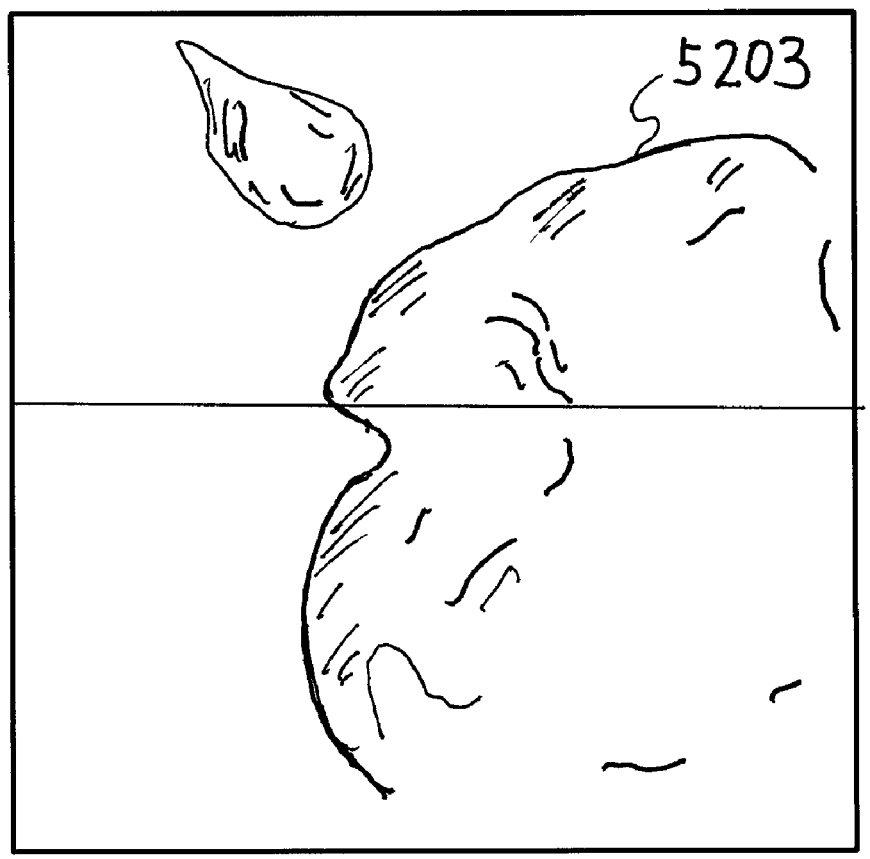
FIG. 44 A view of the picture projected in the 4th section in the planetarium program in Embodiment 2.
Figure 45:
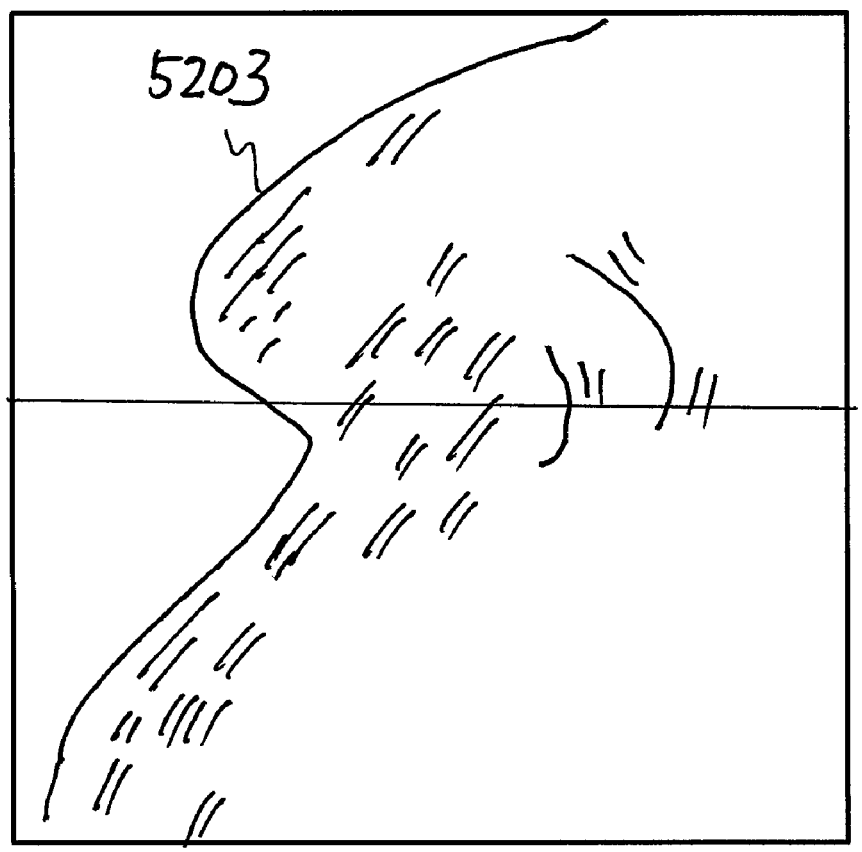
FIG. 45 A view of the picture projected in the first half of the 5th section in the planetarium program in Embodiment 2.
Figure 46:
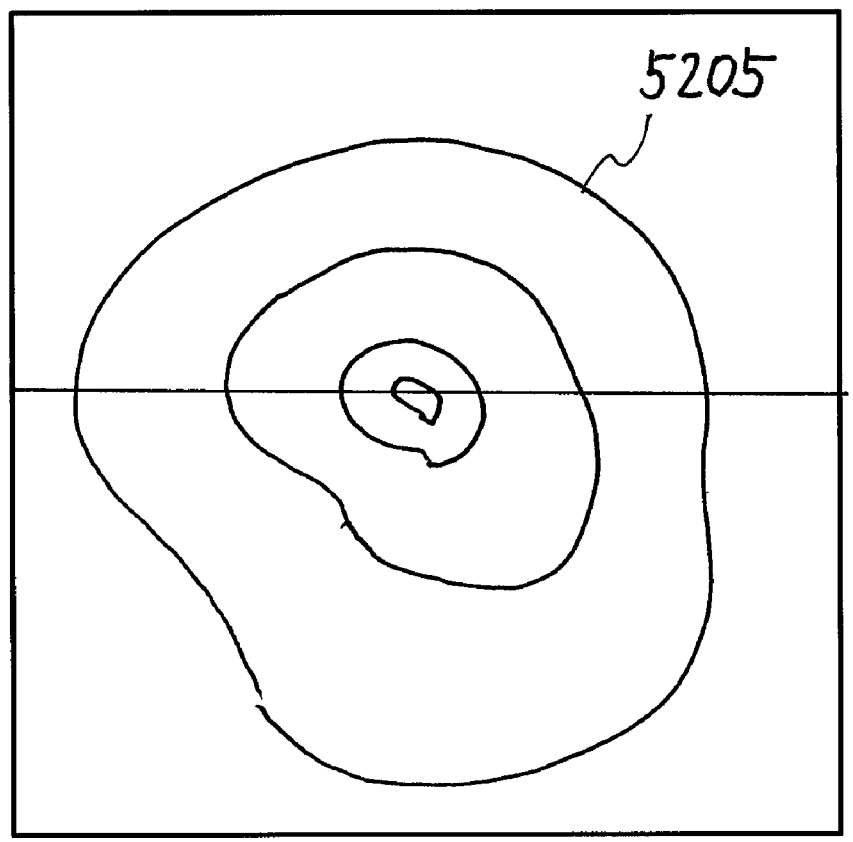
FIG. 46 A view of the picture projected in the latter half of the 5th section in the planetarium program in Embodiment 2.

FIG. 44 is a magnified image of the great nebula of Orion. Also, FIG. 45 is an image of the stars near the center of the great nebula of Orion, when it is higher magnified than FIG. 44. It contains darker stars than the darkest star which can be reproduced by the starry sky reproducing sheet 200c. FIG. 46 is an image of the distribution of field intensity near the center of the great nebula of Orion, when observed by a radio telescope.

The brightness of the image indicated by FIG. 44 and FIG. 45 is adjusted to the same brightness so that the brightest star the observer 83 can observe through telescope 2 when the high light reducing filter 1605 loaded on projector unit 16 at the darkest indication state, becomes the same brightness to the darkest star reproduced by starry sky reproducing sheet 200. Also, the medium light reducing filter 1606 has 16 times lower dimness rate than high light reducing filter 1605. Therefore when filter 1606 is loaded and observer 83 observes through a telescope which has 16 times light-gathering power (the caliber of the lens 4 times larger in size) compared to telescope 2, the image observed is indicated to the same brightness as the real starry sky. When the low light reducing filter 1607 is loaded, the density of the filter is set so that the image indicated becomes the same brightness to a picture of the real sky taken by a digital camera loaded on a telescope which has the same optical performance as telescope 2. Therefore, observer 83 can observe a picture identical to the real starry sky.

Figure 47:
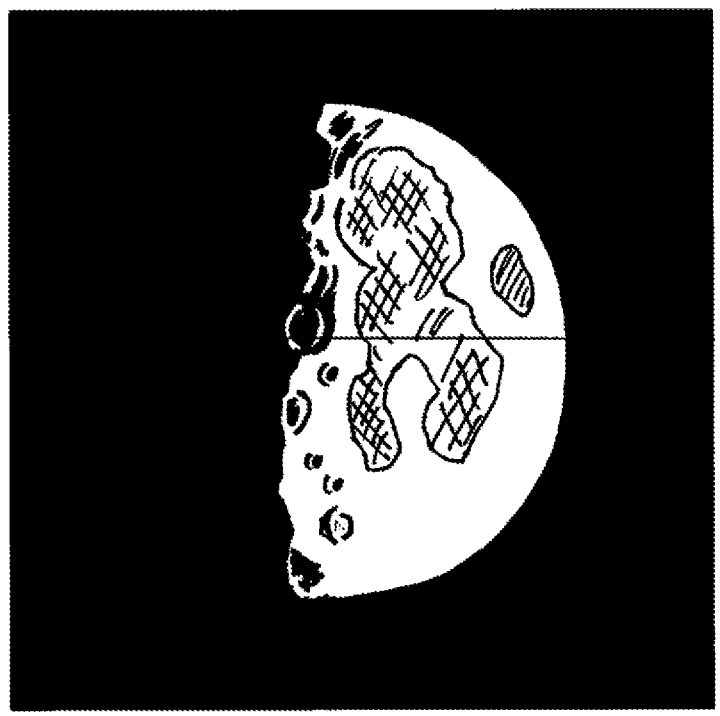
FIG. 47 A view of the picture projected in the first half of the 6th section in the planetarium program in Embodiment 2.
Figure 48:
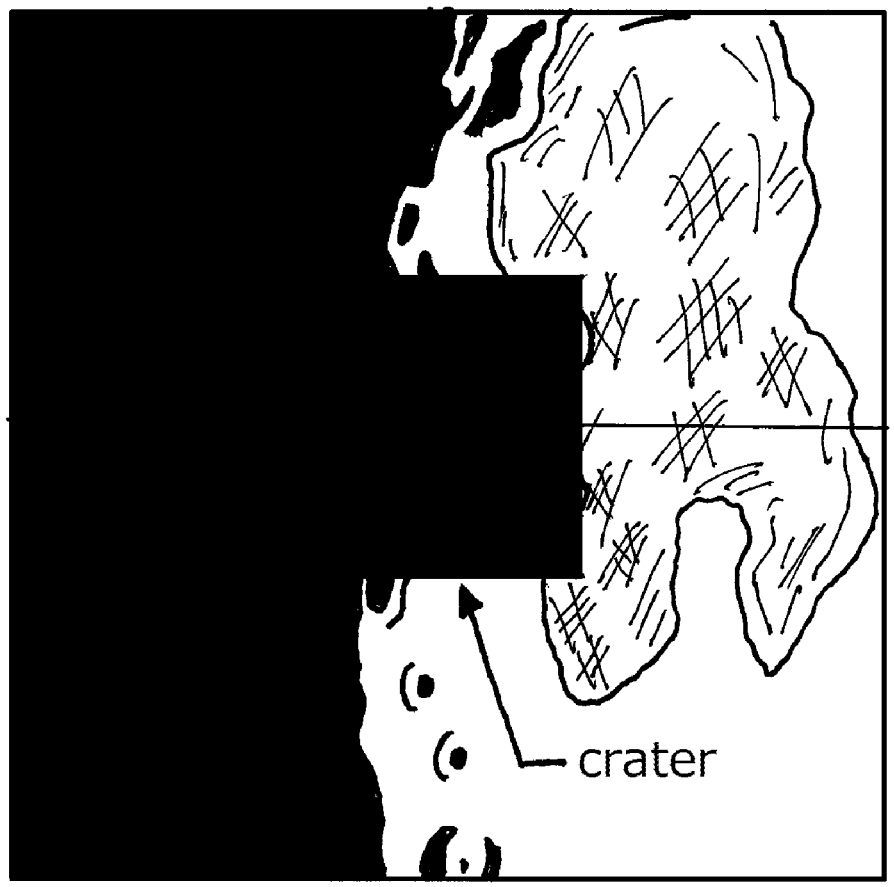
FIG. 48 A view of the picture projected in the latter half of the 6th section in the planetarium program in Embodiment 2.
Figure 49:
FIG. 49 A view of the first picture displayed in the latter half of the 6th section in the planetarium program in Embodiment 2.

FIGS. 47 and 48 shows an image of the picture projected on the projection surface of display 1501, when the display unit 15 is placed in the 1st location. FIG. 47 is an image which shows the whole view of the moon. FIG. 48 is an image which shows an enlarged image of a waning crater in FIG. 47. FIG. 48 is also an image which shows the image projected on the surface of display retention board 1502 by projection unit 16 when the enlarged image of the crater of the moon shown either in FIG. 49 or 51 is projected on display 1501. As shown in the image indicated in FIG. 48, the center part where the display 1501 is located is black. So as shown in FIG. 50 the location of the image of the crater and the brightness are adjusted so that when the image in FIG. 48 is observed with the image of the crater indicated on display 1501 at the same time, the surface of the moon can be observed as a continuous image without joints.

The image indicated on display 1501 or by projector 1601 can be an animation instead of a still image. For example, the images in FIGS. 41 to 43 can be made to create the projected image projected by projector 1601 based on the information of the reproduced sky. As mentioned in the description of the main program later, by using the data related to the reproduced sky at that point and the data of the direction of view 31 which changes when the audience 84 operates the dummy telescope 3 when experiencing introducing the celestial object, the one-chip microcomputer 301 calculates the location and the brightness of the star included in the designated viewing angle of the direction of view 31. This series of technology to reproduce the starry sky is already known in the present program so the detail is omitted here.

Figure 50:
FIG. 50 A view of the first picture displayed in the latter half of the 6th section in the planetarium program in Embodiment 2.
Figure 51:
FIG. 51 A view of the second picture displayed in the latter half of the 6th section in the planetarium program in Embodiment 2.

For example, in the images used to observe the pattern of the surface such as the enlarged image of the crater in FIGS. 49 to 51, the image can be a realistic video based on the still image, with an effect added to represent the fluctuation of the atmosphere.

Figure 52:
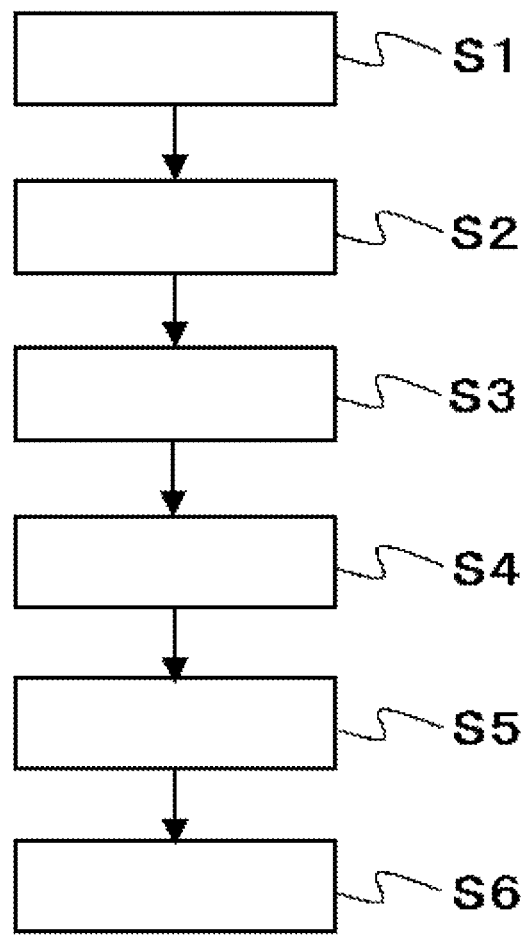
FIG. 52 A flowchart illustrating the method to add the atmospheric blurring on a still image in Embodiment 2.

Specifically, as shown in FIG. 52 the method below can be adopted to make the image of the fluctuation of the atmosphere. In S1, a stellar object is observed with a telescope and filmed in advance. In S2, the brightness and diameter in each frame's stellar image is measured following the time axis. In S3, an approximation formula is evaluated related to the change in the brightness and diameter following the change in time. In S4, the original image to append the fluctuating effect is entered. The in S5, by using the approximation formula relating to the fluctuating effect evaluated in S3, an image with a fluctuating effect added is generated by calculating the change in the brightness and diameter at a voluntary time and pixel location. Finally in S6, by connecting the multiple images generated in S5, a fluctuating video can be made.

In this method, based on a high-definition image of a star taken in space, which has no effect from the fluctuation of the atmosphere, the audience can experience a presence observation similar to that of the actual starry sky by experiencing the changes in the size and effect of the fluctuation of the atmosphere when observed on earth.

Next, we will explain about telescope 2. As shown in FIG. 37, 4 telescopes 2 are placed inside dome 4 and the direction of view is desired to be fixed to the direction of starry sky reproducing device 1 which is used. In the embodiment, the 2 telescopes 2a, 2b are placed to observe the starry sky reproducing device 1a and the other 2 telescopes 2c, 2d are placed to observe the starry sky reproducing device 1b.

Figure 53:
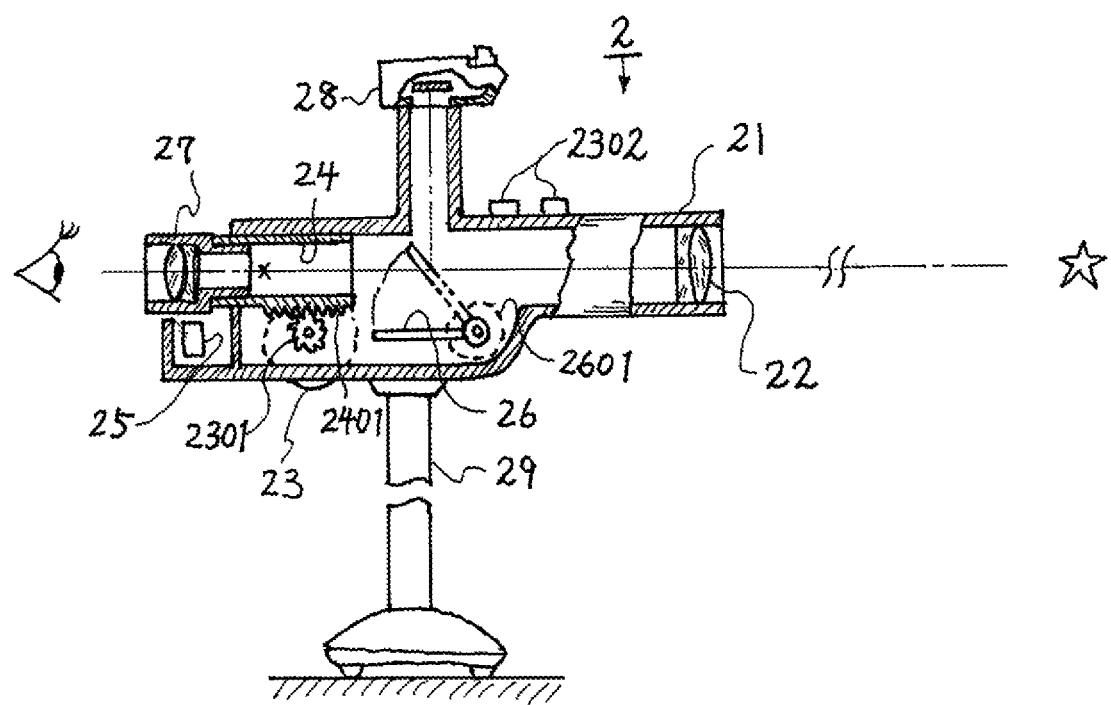
FIG. 53 A partial cross section illustrating the structure of the telescope on Embodiment 2.

As shown is FIG. 53, telescope 2 consists of the pieces below. Firstly, fixed on foundation 29 is lens-barrel 21 and fixed on the head of the lens-barrel 21 is the objective lens 22. On the hind part is the drawtube 24 which is retained to move parallel to the barrel-lens. Rack 2401 is fixed to drawtube 24 and by gearing with the drive gear 2301 fixed to the axis of rotation of the drawtube drive motor 23, drawtube 24 can drive back and forth by the rotation of the drawtube drive motor 23. Also an exchangeable eyepiece 27 is installed on drawtube 24. From these elements, the audience can observe the enlarged image from eyepiece 27, which enlarges the reproduced light of the star from the starry sky reproducing device, imaged by the objective lens 22.

On the lens-barrel, eyepiece detection sensor 25 which detects the type of eyepiece loaded on the eyepiece 27 is fixed. Also fixed on lens-barrel 21 is focus adjustment button 2302 which is used to input the operation to adjust the focus. This focus adjustment button 2302 is made so it can input the operation in the "+" direction and the "−" direction. Also, digital camera 28 is fixed in the position of the figure. Flip mirror 26, which can change the position to two places by operating knob 2601 is fixed. The first position is where it does not reflect the light of the star from the objective lens 22 and let it pass through eyepiece 27. The second position is where it reflects the light of the star from the objective lens 22 and guides it to the digital camera 28. Drawtube drive motor 23, eyepiece detection sensor 25 and focus adjustment button 2302 are all connected to the one-chip CPU 301 of the starry sky reproducing device 1 via a cable.

Figure 61:
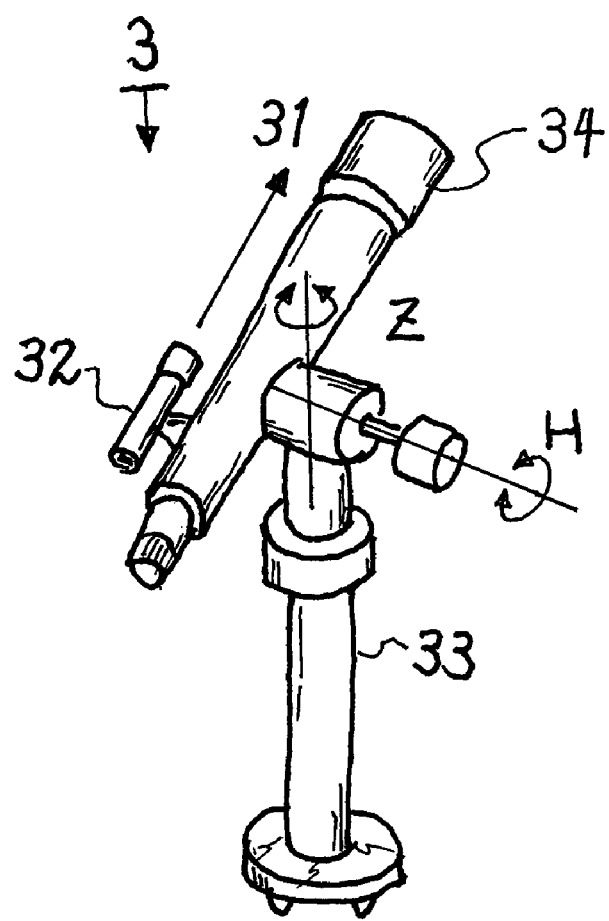
FIG. 61 A view illustration the dummy telescope for the operation experience of introduction of celestial objects in Embodiment 2.

FIG. 61 shows dummy telescope 3, which is used to experience introducing a celestial object. As shown in FIG. 37, dummy telescope 3 is positioned inside the dome 4, near the projection device 5 to project stars. The main lens-barrel 34 is a dummy, which has no expensive lens attached to it. Guide scope 32 is attached to the main lens-barrel 34. Main lens-barrel 34 is positioned on the ground by the leg 33 and is supported to look to a voluntary direction in the sky by a horizontal rotation centered on a vertical Z axis and a vertical rotation centered on a horizontal H axis. The position within the rotational movement of the Z and H axis are both detected by a Z and H axis sensor which is connected to the one-chip CPU 301 of the starry sky reproducing device 1. The one-chip CPU 301 operates under the program mentioned below and calculates the coordinate of the stars located in the same direction as the view of direction of the dummy telescope. The composition of dummy telescope 3 is the same as an altazimuth telescope except for the existence of an expensive objective lens, so the description in detail is omitted.

Figure 64:
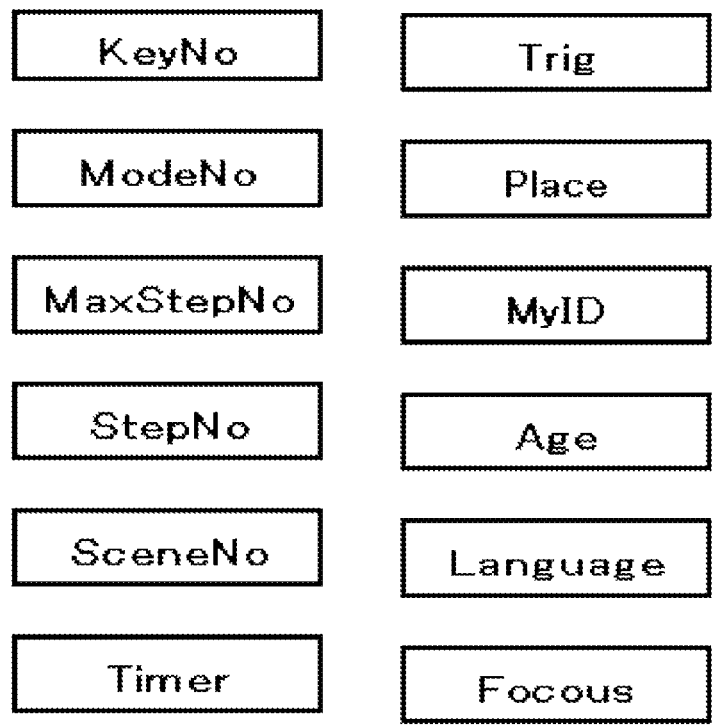
FIG. 64 A RAM data structure chart of the one-chip CPU in Embodiment 2.

Next, we will explain about the operation of the one-chip CPU 301 in Embodiment 2 according to the data structure chart of the RAM area of the one-chip CPU (FIG. 64), flowchart of the program recorded on the ROM (FIG. 65 and FIG. 66) and information relating to the starry sky recorded on the ROM, or other exterior recording methods not mentioned in the figure, such as an internet server (FIG. 67 and FIG. 68).

Figure 65:
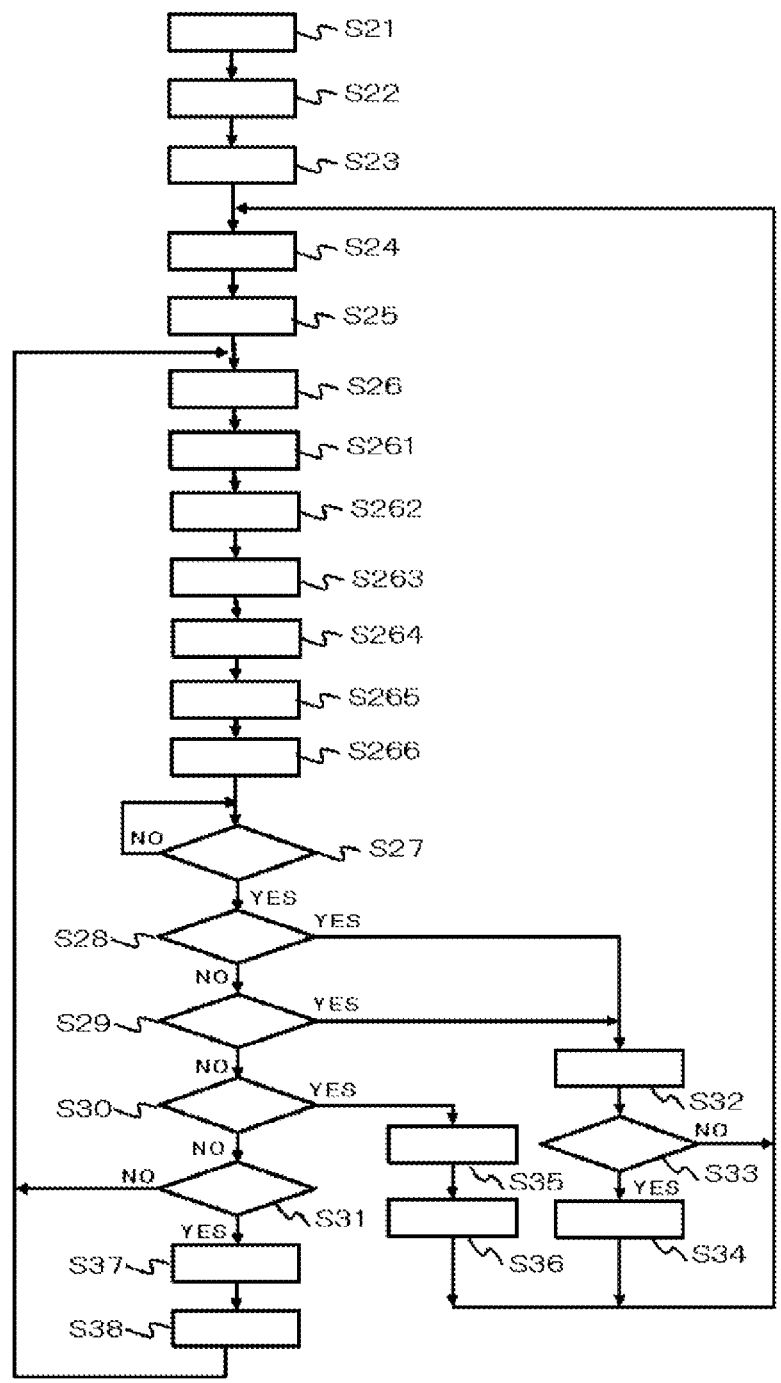
FIG. 65 A flowchart illustrating the main routine in Embodiment 2.

FIG. 65 shows the flowchart of the main routine in Embodiment 2. In S21, the one-chip CPU 301 turns off all the LED element group which the lighting is controlled by the LED driving IC 302, that is, backlight LEDs 105 (LED 111-LED 444), white-chip LEDs 305 (LED 1-LED 8), light pollution lamp 110 (LED 0), wide-angle UV lamp (UV1), narrow-angle UV lamp (UV11-UV44) and then goes to S22.

In S22, the one-chip CPU 301 initializes the rotational position of drum 11 to the initial position, in front of the light box 100 of the first starry sky reproducing sheet 200a. Specifically, the one-chip CPU 301 reads the two-dimensional barcode 240 with the two-dimensional barcode sensor 17. If the barcode is read, from the position of the two-dimensional barcode 240, the attached position of the starry sky reproducing sheet 200 and the sheet number (sheet No) is extracted. If the extraction is not completed, drum 11 is slightly rotated to the direction of the initial position until is extracted. After it is extracted, the drum drive motor 1104 is driven to move drum 11 to the initial position based on the position of the two-dimensional barcode 240 and the extracted sheet number.

In S23, the one-chip CPU 301 sets the default setting of the variables of the RAM to the data below. The ModeNo to 0, StepNo to 1, Age to 10 which is equivalent to the age of a student in the fourth year in elementary school, Focus to 0, Language to JP which indicates Japanese, Experience to "No experience" and Place to "Planetarium A" and moves on to S24.

In S24, the one-chip CPU 301 accesses to an internet server via a network communication system. In the access, the data below is read from the information relating to the starry sky which is recorded on the server. The data read here is based on the ModeNo and StepNo read in S23. Time which indicates the duration, SceneNo which indicates the scene number, Trig which indicates the transiting condition and MaxStepNo which indicates the number of steps included in the mode. After the data is recorded to the RAM, it moves on to S25.

In S25, the one-chip CPU accesses to the internet server via a network communication system and reads the scene information which corresponds to the SceneNo and records the data to the storage area of the RAM. After recording the data, it moves on to S26. Here, the data of the scene information includes information such as those which are indicated in FIG. 68 and a storage area is set within the RAM to record the data.

In S26, the one-chip CPU 301 drives the drum drive motor 1104 to position either of the first starry sky reproducing sheet 200a-200c in front of the lightbox 100 corresponding to the sheet number SheetNo included inside the scene information recorded in S25. Specifically, when the SheetNo is 1, the first starry sky reproducing sheet 200a is set. When SheetNo is 2 the second sheet 200b is set, and when the SheetNo is 3, the third starry sky reproducing sheet 200c is set. After the sheet is positioned, the one-chip CPU 301 sets the data which indicates the luminance and amount of scintillation of each LED element, which is included in the scene information.

After the data is set, the one-chip CPU 301 drives each LED element at the designated luminance and amount of scintillation during the program S201 of processing the interruption for the lighting control timer. The number of LED elements is large so the detail of the data structure is omitted here.

Furthermore, the one-chip CPU 301 drives the filter disk drive motor 1608 via the motor drive means to change the filter disk 1603 to the type dedicated in the filter setting data "Filter" which is included in the scene information. Also, the one-chip CPU 301 drives the display unit drive motor 1505 to move the display unit 15 to the position dedicated in the position data "DisplayPos" which is also included in the scene information.

Specifically, the one-chip CPU 301 drives the filter disk drive motor 1608 so that when the Filter is 1, the high light reduction filter 1605 is positioned. When it is 2, medium light reduction filter 1606 is positioned. When 3, the low light reduction filter 1607 is positioned and when Filter is 0, window 1604 without a filter is positioned.

Also, the one-chip CPU 301 drives the display unit drive motor 1505 to position display unit corresponding to the data which is input to DispPos. When DispPos is 1, display unit 15 is positioned to the first position (the display position) and when it is 2, display unit 15 is positioned to the second position (the evacuation position). After this action, the one-chip CPU 301 moves on to S261.

In S261, the one-chip CPU 301 inputs the identification information of the observer (MyID) which is included in the ID card 831 the observer 83 holds. MyID is read by the identification information reading device 832 and inputs the data via the means of input. Then the one-chip CPU 301 retrieves the observer information based on the MyID which relates to the observer 83 from the observer database placed on the internet. Observer information includes the data mentioned below. The age (MyAge), the language used (MyLanguage), the correction value of the focus of the telescope (MyFocus), the list of the observation experiences in the past (MyExperience) and information about the handicap the observer has (MyHandy).

The one-chip CPU 301 sets each data to the designated storage area in the RAM and moves on to S262. That is, MyAge to "Age", MyLanguage to "Language", Myfocus to "Focus", MyExperiece to observer's experience list "Experience" and MyHandy to Handicap "Handy". If reading the MyID fails, the set value in the RAM is not updated.

In S262, the one-chip CPU 301 checks whether the number of the observation experience information ExperienceNo inside the scene information is included in the list "Experience". If the same number is included, the observer has already experienced that particular observation experience so number 1 is input to the flag "ExperienceMach" which is used to determine whether or not the observer has experienced that particular observation. If the same number is not included, the number is reset to 0 in the "ExperienceMach". After this operation it moves on to S263.

In S263, the one-chip CPU 301 reads the type of eyepiece that is detected by the eyepiece detection sensor 25 and input the data to the list of optical information of the telescope, "ScopeInfo" with the information about the objective lens of the telescope. After this operation it moves on to S264.

In S264, the one-chip CPU 301 inputs the rotational position of the Z-axis sensor and H-axis sensor of dummy telescope 3. Then the information relating to the coordinate in the sky of dome 4 and the direction of the dummy telescope 3 is calculated and input to the list of direction of view "DumyPos" and then moves on to S265.

In S265, the one-chip CPU 301 uses the set value in "Place", "SceneNo", "Age", "Language", "ExperienceMach", "Handy", "ScopeInfo", "DumyPos" as a parameter and reads the images and information mentioned below from the internet server. The image displayed on display 1501, image displayed by projector 1601, image of sight 61 on display which is added to the image from the projection device 6 to project the whole sky and images or information the commentator refers to during the comment. The one-chip CPU 301 displays the image with each display device, sends the reference information to the device the commentator holds and the moves on to S266. The kind of image or reference information that should be retrieved for each parameter is mentioned in the description below.

It should be noted that the method of retrieving information in S265 does not have to be limited to the process of the one-chip CPU 301 mentioned here. If the one-chip CPU 301 is made to retrieve the appropriate information based on the set value of "Place", "SceneNo", "Age", "Language", "ExperienceMach", "Handy", "ScopeInfo", "DumyPos", other methods can be used.

In S266, the one-chip CPU 301 drives the drawtube drive motor 23 via the motor drive means to correct the position of the focus between telescope 2 and eyepiece 27, based on the value of "Focus". After this operation it moves on to S267. It should be noted that the one-chip CPU 301 operates under the focus correction program described below in parallel to the main routine. So, the focus position of the eyepiece 27 of telescope 2 is corrected successively and the change is instantly reflected on the "Focus" in the RAM.

In S27, the one-chip CPU 301 judges whether the time passed after S24 is longer than the time of "Timer". If NO, S27 is repeated until it turns to YES. If YES, it moves on to S28.

In S28, the one-chip CPU 301 judges whether the value of "Trig" is 0 (automatically moves on to the next step after a period of time). If YES, it moves on to S32 and if NO, it moves on to S29.

In S29, the one-chip CPU 301 refers to the information "KeyNo" which indicates the detection and setting in the operation of the button of the infrared remote control, during the process for the interruption of the remote control signal. Whether the "0" button was pushed is judged and if it is YES, it moves on to S32. If NO, it moves on to S30.

In S30, the one-chip CPU 301 refers to the "KeyNo" and judges whether either of the buttons 1 to 8 were pushed. If YES, it moves on to S35 and when it is NO, it moves to S31.

In S31, the one-chip CPU 301 refers to the "KeyNo" and judges whether the button 9, which indicates the change of the observer, was pushed. If YES, it moves on to S37 and when it is NO, it returns to S26.

In S37, the one-chip CPU 301 sends the observer identification information (MyID), the observation experience information (ExperienceNo) and the focus correction value (Focus) to the internet server. The information on the observer database is updated based on the MyID and then moves on to S38. Specifically, the observation experience information (ExperienceNo) is added to the list of history about the observation experience in the past (MyExperience) and the focus correction value (MyFocus) is updated to the new value (Focus).

In S38, the one-chip CPU 301 sends the value of the observer identification information (MyID) and the data of the observation place (Place) and the current time to the internet server. After operating the one-chip CPU 301 to add a record of the MyID and time as an element to the observer database, which is prepared for each observation place (Place) it returns to S26.

In S35, the one-chip CPU 301 sets the number of the button of KeNO (1 to 8) to the ModeNo and moves on to S36. In S36, the one-chip CPU 301 initializes the StepNo to 1 and then returns to S24, then starts another operation based on the next button that is pushed.

In S32, the one-chip CPU 301 adds 1 to the value of StepNo and moves on to S33.

In S33, the one-chip CPU 301 judges whether the value of StepNo exceeds the MaxStepNo. If NO, it returns to S24 and if it is YES, it moves on to S34.

In S34, the one-chip CPU 301 changes the ModeNo to 1 if the current ModeNo is at the greatest value. If not, 1 is added to the value of ModeNo and then returns to S24.

Figure 66:
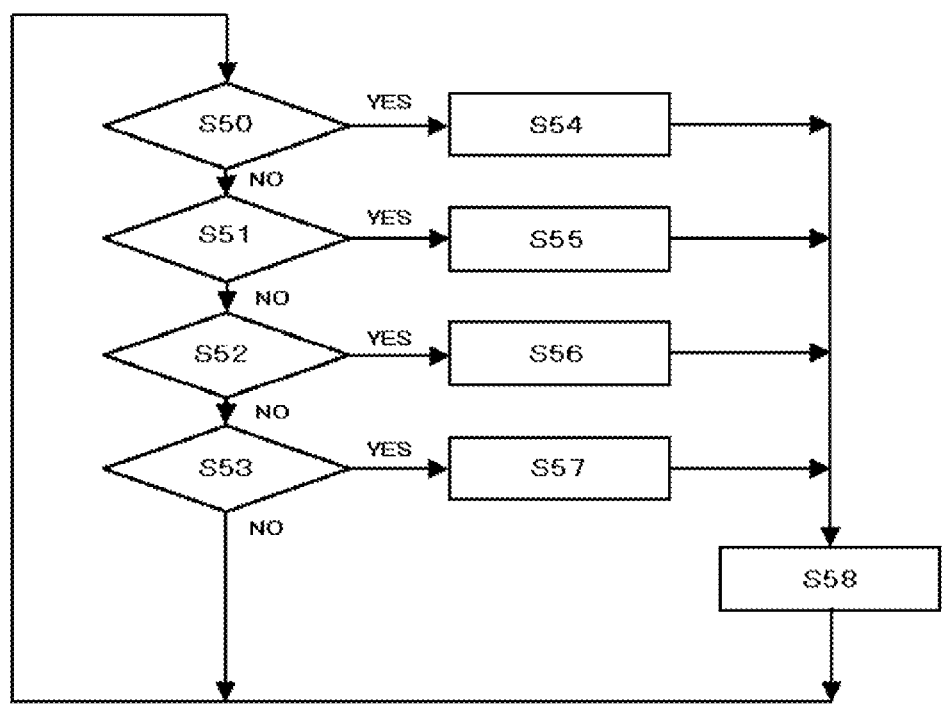
FIG. 66 A flowchart illustrating focus position correcting motion in Embodiment 2.

Next, we will explain about the operation to correct the focus which operates in parallel to the main routine, based on the flowchart in FIG. 66.

In S50, the one-chip CPU 301 judges whether the value in KeyNo is positive. If YES, it moves on to S54 and if NO, it moves on to S51.

In S51, the one-chip CPU 301 judges whether the value in KeyNo is negative.

If YES, it moves on to S55 and if NO, it moves on to S52.

In S52, the one-chip CPU 301 judges whether the operational state of the focus adjustment button 2302 of telescope 2 is at positive. If YES, it moves on to S54 and if it is NO, it moves on to S53.

In S53, the one-chip CPU 301 judges whether the operational state of the focus adjustment button 2302 of telescope 2 is at negative. If YES, it moves on to S55 and if it is NO, it returns to S50.

In S54, the one-chip CPU 301 adds 1 to the value in "Focus" and moves on to S56.

In S55, the one-chip CPU 301 subtracts 1 from the value in "Focus" and moves on to S56.

In S56, the one-chip CPU 301 verifies if the value in "Focus" is inside a designated range. If the value is not in range, it is adjusted so it fits inside the range and then the drawtube 24 is driven back and forth by the drawtube drive motor 23 to position the eyepiece 27 to the designated focus position based on the focus correction value in "Focus".

In Embodiment 2, the one-chip CPU 301 operates in the same routine as the interruption for the input of the remote control signal in FIG. 20 and the interruption for the lighting control timer in FIG. 21.

Next, we will explain about the operation and the operational advantage of Embodiment 2 following along the flow of the planetarium program. The operation of the one-chip CPU 301 is already described above. So only the distinctive features are explained from here, by indicating the step number in the flowchart.

In Embodiment 2, the planetarium program is divided into 6 parts and provides different star observation experiences in an effective and efficient way.

In the first part, star observation experience similar to the conventional projection planetarium is provided to the audience 81 sitting on the audience seats 7. In the experience, the audience observes the location of the constellations and the movement of stars with the naked eye. In Embodiment 2, the audience observes the position of the Orion 50, the position of the moon 54 and its diurnal motion with the naked eye, as shown in FIG. 36.

Specifically, the commentator operates the starry sky reproducing device 1 before the admittance of the audience into the planetarium. Then the program on one-chip CPU 301 starts to run and the value for the initialized state is set in S23. After S23, S24 and S25 operates so the scene information based on the scene number SceneNo 0 dedicated by "ModeNo 0" and "StepNo 1" is read from the server.

Next in S26, the first starry sky reproducing sheet 200*a* is positioned in front of the lightbox 100 based on the scene information, LED elements are turned off, display 1501 is positioned at the evacuation position and the filter disk 1603 is set on the high light reduction filter 1605. In S265, a pitch black image is retrieved from the internet server to display on display 1501 and projector 1601 and a state without an image is retrieved for the image added to the projection device 6 to project the whole sky. Therefore, the starry sky reproducing device 1 is at a stand-by state which nothing is projected from it.

In the retrieved reference information for the commentator are the audience database and the search results mentioned below. In other words, the internet server detects all the audience's MyID who has visited the place of observation "Place" within 30 minutes from the present time, from the audience database. Then the observer information is extracted from the observer database based on the MyID and then summarized, and sent to the one-chip CPU 301. Therefore, the information of the audience is displayed on the commentator's device.

After a short wait time in S27, the one-chip CPU 301 repeats the loop, S26→S261→S262→S263→S264→S265→S266→S27→ S28→S29→S30→S31→S26 until either of the button 0 to 9 of the infrared remote control 111 is operated, because the value in "Trig" is 1 until the operation.

The commentator holds the observer identification information reading device 832 to the ID card 831 each audience who enters the planetarium possesses. Then at S261 in the loop above, the one-chip CPU 301 detects the observer identification information "MyID". After this, the commentator presses the button "9" of the infrared remote control 111 which then the one-chip CPU 301 detects the operation at S31 and at S38 after S37, the chip is operated to add the audience's MyID and the current time to the audience database on the internet server. After this operation is completed, it returns to S26. Therefore, when the one-chip CPU 301 does the operation in S265 next time, the added information about the observer information of the audience is displayed on the device of the commentator.

On the commentator's device after all the audience has entered the planetarium, are the observer information for all of the audience. Therefore, the commentator can check the age group, the presence of an audience whose mother tongue is not Japanese, the presence of an audience who needs a subtitle and optimize the commentary contents and guidance contents for the audience by getting hold of the tendency in the observation experiences of the past. Due to this feature, target capacity 11, "Providing commentary information depending on the observer." is realized.

In that case, the audience seats 7 can be secured at the conventional position because the starry sky reproducing device 1, although it is non-operating, is placed near the wall of dome 4. Also the telescope 2's position, where it is not placed near the star projecting device 5 helps securing the position of audience seat 7. Therefore, in the case of the audience 81 observing the stars reproduced on the surface of dome 4, the effect of deformation in the position of stars is minimum. So target capacity 5, "no deformation in the position of stars" is realized. Although it is not explained in the embodiment, the present invention can be applied to project subtitles from projector 1601 of the starry sky reproducing device 1 for the audience who has problems in hearing and cannot hear the commentary.

In the second part, an experience to observe the Orion, which is reproduced by the starry sky reproducing device 1, with the naked eye or with a telescope is provided to audience 7 after guiding the audience near to the starry sky reproducing device 1.

Specifically, the commentator pushes the button 1 of the infrared remote control 111. Then the one-chip CPU 301 moves from S30 to S35. In S35, "ModeNo" is set to 1 and in S36 "StepNo" is set to 1. Then it moves on to S24 and S25 and there, it reads the scene information from the server based on the scene number, "SceneNo 1" which is dedicated by "ModeNo 1" and "StepNo 1".

In S26, the first starry sky reproducing sheet 200a is positioned in front of light box 100 based on the scene information, the LED elements are lit at a designated luminance, display 1501 is positioned at the evacuation position and the filter disk 1603 is set on the high light reduction filter 1605.

In S265, the image displayed on display 1501 and projector 1601 are both pitch black and there is no image added to the projection device 6 to project the whole sky. Therefore, only the starry sky reproduced by the first starry sky reproducing sheet 200a can be observed. Moreover the information displayed on the commentator's device is same as the information in the first part. That is, the observer information of all of the audience.

After a short wait time, the one-chip CPU 301 in S27 repeats the loop S26→S261→S262→S263→S264→S265→S266→S27→S28→S29→S30→S31→S26 until either of the button 0 to 9 of the infrared remote control 111 is operated because the value of "Trig" stays at 1 until the operation. Therefore, the reproduction of the Orion 50 is maintained as shown in FIG. 38.

Subsequently, the commentator divides the audience 7 sitting on the audience seats 7 into a few groups and guides the group to a position a little away from the starry sky reproducing device 1. Then the commentator provides the guided audience 82 an experience to observe the starry sky with binoculars 9 and taking pictures with digital camera 10. Here, as mentioned in Embodiment 1, the starry sky reproducing device 1 has realized target capacity 1 to 4 so it can provide an experience to observe a high-definition starry sky. Also, the commentator can refer to the observer information on the device so the commentary content can be optimized in accordance with the group. Therefore, target capacity 11, "Providing commentary information depending on the observer." is realized.

In the third part, an experience to introduce nebulas or star clusters, which a scattered in a narrow area in space, into the field of view is provided to audience 84 who has moved near to the dummy telescope. The Orion is a good example to introduce here. An experience to observe the nebulas and star clusters with telescope 2 is provided to audience 83.

Specifically, the commentator firstly guides the audience to the position where the telescope 2 is placed. Then, the commentator presses the button 2 of the infrared remote control 111. This operation moves the one-chip CPU 301 from S30 to S35. In S35, the value 2 is input to "ModeNo" and in S36, the value 1 is input to "StepNo". Then it moves on to S24 and S25 and reads the scene information based on scene number "SceneNo 2" which is dedicated by "ModeNo 2" and "StepNo 1", from the server.

In S26, the one-chip CPU 301 keeps the position of the first starry sky reproducing sheet 200a in front of light box 100, turns off the LED elements and changes the state to a state where the transmitted-light star, printed luminous star and light-emitting element star is not reproduced. The one-chip CPU 301 positions display 1501 to the evacuating position, the second position and sets the filter disk 1603 to the window 1604 without a filter.

In S261, the one-chip CPU 301 reads the observer identification information (MyID) from the ID card the observer 83 looking into the eyepiece 27 of telescope 2 has and retrieves the information unique to the observer 83, from the server. Next in S263, the one-chip CPU reads the optical information of the telescope "ScopeInfo" and calculates the information in the direction of view, "DumyPos" in S264.

In S265, the one-chip CPU 301 retrieves the images below for each element. For displaying on display 1501, a pitch black image is retrieved. For projector 1601, an introduction image of stars which is observed in the area of view. The image is led from the direction of view 31, of where the dummy telescope 3 is facing and the optical information of the telescope, "ScopeInfo". For the projection device 6 to project the whole sky, an image showing the area of view in a circle (circle cursor 61) is displayed, which is led by the direction of view 31 of dummy telescope 3 and the optical information of the telescope, "ScopeInfo". The information displayed on the commentator's device is observer information of all of the audience, as same as the ones displayed in the first part.

Here, the filter disk 1603 is set on window 1604 without a filter so the luminance of the introduction image of the starry sky projected by projector 1601 becomes the highest. Therefore, the luminance of the starry sky reproduced by starry sky reproducing device 1 the observer 83 observes can be made to a similar luminance as observing the actual starry sky.

Here, if the audience 84 is pointing the dummy telescope 3 to the direction of view 31 in FIG. 36, that is, in the direction of the sky near the tristar 51 of the Orion 50, the introduction image shown in FIG. 41 is retrieved. Also, by the image added to the projection device 6 to project the whole sky, a circle cursor 61 is indicated in the position in FIG. 36.

In S266, the one-chip CPU 301 corrects the difference in the diopter of observer 83 by updating the focus position of telescope 2 basing on the focus correction value "Focus". Therefore, the observer can observe the starry sky at an appropriate focus. In this way, the starry sky reproducing device of Embodiment 2 can provide efficient observation experience to multiple observer 83 with different diopter when taking turns in using the telescope 2 because the focus is automatically adjusted in accordance to the observer. So, target capacity 10, "Making the setting efficient" is realized.

Continuously in S27, the one-chip CPU 301 immediately moves to S28 after a short wait time and then moves to S29 because the value in "Trig" is 1. Here, the commentator does not operate the infrared remote control 111 for a period of time so the one-chip CPU 301 repeats the loop S29→S30→S31→S26→S261→S262→S263→S264→S265→S266→S27→S28→S29.

The one-chip CPU 301 repeats the loop above in a short period of time. So, when audience 84 changes the direction of view 31 of dummy telescope 3, the introduction image of the starry sky and the position of the cursor 61 is updated in a brief time corresponding to the direction of view 31. Therefore, audience 83 can check the area of the sky they are observing with cursor 61 while looking into eyepiece 27 of telescope 2. So, target capacity 9, "Grasping the position of the telescope-observed star in the sky" is realized.

Specifically, when audience 84 moves the direction of view 31 of dummy telescope 3 from the direction of the tristar 51 of the Orion to the lower right of FIG. 41, the star 5201 located most north in the small tristar of Orion comes into the area of view of telescope 2, observed by audience 83. As shown in FIG. 43, when audience 84 moves the direction of view 31 more to the lower right, the small tristar 5201 and 5202, star 5204 in the great nebula of Orion and diffuse nebula 5203 comes into the area of view of telescope 2 which is observed by audience 83.

In S265, the server is desired to operate in the way mentioned below, when retrieving the image after the one-chip CPU 301 sends the data "DumyPos" and "ScopeInfo" to the server. That is, the server inputs the data of "DumyPos" and "ScopeInfo" and judges whether the image if the great nebula of Orion 5203 is included in the area of view of telescope 2. If it is included, the server is desired to send an image of the commentary information of the nebula indicated in the position of the great nebula of Orion to the one-chip CPU 301. When this is done, appropriate commentary information is indicated inside the area of view of telescope 2 and this raises the quality of learning.

Here, audience 84 who operates dummy telescope 3 can operate the telescope while checking the direction of view 31 of the dummy telescope 3. Therefore it has an effect on effective learning experience in introducing celestial objects. So, target capacity 7, "Providing experience in introducing a celestial object" is realized.

The number of telescope 2 is limited, so audience 83 in a large number take turns in observing through telescope 2. When audience 83 observing with the telescope changes, the one-chip CPU 301 reads in S261, the "MyID" from the ID card 831 the audience has. Based on the "MyID", the observer information of audience 83 is read and the "Age", "Language", focus correcting value "Focus", data of observation experiences in the past "Experience" and handicap information "Handy" is updated. As a result, if the mother tongue of audience 83 is English, "Language" is changed to English. Therefore in S265, the commentary information retrieved in FIG. 43 for example, changes from "The Orion Nebula(in Japanese)" to "The Orion Nebula(in English)." Furthermore, if the handicap information "Handy" shows that "Subtitle needed" which means that the audience has a problem in hearing, an image with the commentary information the commentator is supposed to speak, written in words is retrieved. Therefore, it has an effect on raising the quality of learning by retrieving the appropriate information for each audience 83. So, target capacity 11, "Providing commentary information depending on the observer." is realized.

Here the commentator operates the button 9 of the infrared remote control 111 when the audience 83 observing with the telescope changes. Then the operation of the one-chip CPU 301 moves on from S31 to S37 and updates the data of "MyExperience" and "MyFocus" within the observer information of audience 83 recorded on the server. Therefore, the effect of the present invention is continuously provided by the operation of the one-chip CPU 301 based on the updated observer information of audience 83 even when the audience 83 observes with telescope 2 in the fourth part and later.

In the fourth part, an experience to observe the great nebula of Orion with telescope 2 in more detail is provided to audience 83. Specifically, the commentator first presses the button 3 of the infrared remote control 111. Then the one-chip CPU 301 moves on from S30 to S35. In S35, the value of "ModeNo" is set to 3, and in S36 the value of "StepNo" is set to 1 and then the process move on to S24, S25 and reads the scene information based on the scene number "SceneNo 3" which is indicated by "ModeNo 3" and "StepNo 1" from the server.

In S26, the one-chip CPU 301 positions the second starry sky reproducing sheet 200b in front of light box 100 and lights the LED elements at a designated luminance. Then, the starry sky shown in FIG. 39 can be observed by the transmitted-light star, printed luminous star and light-emitting element star of the second starry sky reproducing sheet 200b. Also, the one-chip CPU 301 positions the display 1501 to the evacuating position, the second position and sets the filter disk 1603 on the high reduction filter 1605.

In S265, the one-chip CPU 301 retrieves a pitch black image to display on display 1501 and an image which shows the diffuse nebula 5203 and the dark stars in the great nebula of Orion to display on the projector 1601. Therefore, on the surface of the second starry sky reproducing sheet 200b, the image shown in FIG. 44 is projected and the observer can observe the image and the reproduced starry sky by the transmitted-light star, printed luminous star and light-emitting element star of the second starry sky reproducing sheet 200b shown in FIG. 39 at the same time. Also by the one-chip CPU 301, an image to show a circle cursor 61, which is led by the optical information of the telescope "ScopeInfo" and the ratio of the magnification of the sky by the starry sky reproducing device "DispMag" is positioned in the direction of view 31 which the dummy telescope inside the dome 4 directs, is added to the image of the projection device 6 to project the whole sky. Furthermore, the one-chip CPU 301 retrieves the commentary information about the great nebula of Orion to display on the commentator's device.

Here, the filter disk 1603 is set on the high light reduction filter 1605 so the luminance of the gas clouds of the diffuse nebula 5203 in the great nebula of Orion and places where dark stars are located can be kept low. Therefore, the high luminance places can be barely observed through telescope 2 with the naked eye, while the dark places cannot be observed without taking pictures. This observation experience provides similar experience to the actual observation of the gas clouds in the great nebula or the observation of the dark stars.

Therefore, the starry sky reproducing device 1 in Embodiment 2 can reproduce much darker stars than the stars reproduced by the starry sky reproducing sheet 200 by the effect of projector 1601 and high light reduction filter 1605. So, it has an effect on enlarging the width of the luminance reproduced by the transmitted-light star, printed luminous star and light-emitting element star (The dynamic range) of starry sky reproducing sheet 200. So, target capacity 1 "Creating a wide dynamic range" can be achieved at a higher level.

Next, the commentator presses the button 4 of the infrared remote control 111. Then the operation of one-chip CPU 301 moves on to S35 and "ModeNo" is set to 4. In S36, the "StepNo" is set to 1 and then it moves on to S25 and S26, where the scene information is read from the server based on the scene number "SceneNo4" indicated by "ModeNo4" and "StepNo1".

In S26, the one-chip CPU 301 keeps the position of the second starry sky reproducing sheet 200b in front of light-box 100 and drives the LED elements so that the luminance of the transmitted-light star, printed luminous star and light-emitting element star are all 16 times larger than that of when the scene number is set to "SceneNo 3". As a result, compared to when the value of "ModeNo" is 3, stars which are about 3 magnitudes darker can be reproduced here. The one-chip CPU 301 positions the display 1501 to the evacuating position, the second position and sets the filter disk 1603 on the medium light reduction filter 1606.

In S265, the one-chip CPU 301 retrieves the images which are displayed on display 1501, ones dedicated on projector 1601 and ones added to the projection device 6 to project the whole sky The images retrieved here is the exact same as the images retrieved when the scene number "SceneNo" is 3. Also, the information retrieved to display on the commentator's device is a commentary information of the explanation about the image which shows the great nebula of Orion observed with a telescope that has a caliber 4 times larger in size.

Here, the degree of light reduction of the medium light reduction filter 1606 is one sixteenth of that of the high light reduction filter so the luminance of the gas clouds of the diffuse nebula 5203 or dark stars projected by projector 1601 is 16 times larger compared to that of when the scene number is "SceneNo 3". Therefore, the luminance of the starry sky reproduced by the starry sky reproducing device 1 is reproduced 16 times larger compared to the reproduced sky in scene number "SceneNo 3". So, an observation experience similar to when observing the sky with a high performance telescope with a caliber of the lens 4 times larger in size compared to telescope 2 can be provided. A large and expensive large diameter telescope is not needed so it has an effect in reducing the purchase cost. So, target capacity 4 "A low cost method" can be realized. Also, multiple telescopes is not needed inside the dome 4 and the change in the setting is also not needed, so it has an effect on providing an efficient observation experience. So, target capacity 10, "Efficient setting conditions" is realized.

In the fifth part, an experience to observe in detail, the trapezium 5204 located in the center of the great nebula of Orion and experience to take a picture with digital camera 28 is provided to the audience 83.

Specifically, the commentator first presses the button 5 of infrared remote control 111. Then the operation moves on from S30 to S35. In S35 the value of "ModeNo" is set to 5 and in S36, the "StepNo" is set to 1. Then the operation moves to S24 and S25 and the scene information is read based on the scene number "SceneNo 5" dedicated by "ModeNo 5" and "StepNo 1".

In S26, the third starry sky reproducing sheet 200*c* is positioned in front of lightbox 100, the LED elements are lit at the standard luminance and the starry sky in FIG. 40, which is made by the transmitted-light star, printed luminous star and light-emitting element star of the third starry sky reproducing sheet 200*c*, can be observed. Also, display 1501 is positioned in the evacuation position, the second position and filter disk 1603 is set on the high light reducing filter 1605.

In S265, a pitch black image is retrieved for the display 1501, and an image of gas clouds and dark stars around the trapezium 5204 in the center of the great nebula of the Orion is retrieved for the projector 1601. Therefore, the image shown in FIG. 45 is projected on the surface of the third starry sky reproducing sheet 200*c* and the observer can observe it at the same time with the starry sky shown in FIG. 40, reproduced by the transmitted-light star, printed luminous star and light-emitting element star of the third starry sky reproducing sheet 200*c*.

Next, an image to show a circle cursor 61, which is led by the optical information of the telescope "ScopeInfo" and the ratio of the magnification of the sky by the starry sky reproducing device "DispMag" is positioned in the direction of view 31 which the dummy telescope inside the dome 4 directs, show the area of sight and is added to the image of the projection device 6 to project the whole sky. The information retrieved to display on the commentator's device, is commentary information relating to the trapezium 5204 in the great nebula of Orion.

Here, the filter disk 1603 is set on the high light reduction filter 1605 as same as the fourth part so the luminance of the gas clouds and dark stars in the center of the great nebula of Orion projected from projector 1601 is kept low. Also, the high luminance part can be seen through telescope 2 with the naked eye, but the dark part cannot be observed except for when a picture is taken. For these features, an observation experience similar to observing the actual gas clouds and dark stars can be provided.

Here, audience 83 operates the knob 2601 of the telescope 2 to position the flap mirror to the second position. Then the light of the stars from the objective lens 22 is reflected by the flap mirror 26 and is guided to the digital camera 28. The audience 83 uses the digital camera 28 to take a picture of the central part of the great nebula of Orion.

Then, the dark areas which were not able to recognize with the naked eye, is taken by the digital camera 28. Through these operations, an observation experience which is similar to the actual observation of the gas clouds and dark stars in the nebula is provided.

Like above, the observation target can be enlarged and observed without changing the eyepiece 27 of telescope 2, so there is no need to change the setting of the observation device, such as changing the eyepiece. Therefore, it has an effect on providing efficient observation experience to the audience and target capacity 10, "Efficient setting conditions" is realized.

Next, the commentator presses the button 0 of the infrared remote control 111. The operation moves on from S28 to S32. In S32, the value in "StepNo" becomes 2 and in S33, the value in "StepNo" does not exceed the value "MaxStepNo", so the operation moves on to S24 and S25. In S25, the scene information based on the scene number "SceneNo 6" dedicated by "ModeNo 5" and "StepNo 2" is read from the server.

Then in S26, the third starry sky reproducing sheet 200*c* is kept in front of lightbox 100 and the LED elements are driven so that the luminance is kept at a designated amount. Then, the starry sky shown in FIG. 40 can be observed by the transmitted-light star, printed luminous star and light-emitting element star of the third starry sky reproducing sheet 200*c*. Also, display 1501 is set to the evacuation position, the second position and the filter disk 1603 is set on the medium light reducing filter 1606.

Then in S265, a pitch black image to show on display 1501 is retrieved. Also, an image which shows the field intensity around the trapezium in the center of the great nebula of Orion, taken by a radio telescope is retrieved to display on projector 1601. Therefore, the image shown in FIG. 46 is projected on the surface of the third starry sky reproducing sheet 200*c*. The observer observes the starry sky in FIG. 40 reproduced by the transmitted-light star, printed luminous star and light-emitting element star of the third starry sky reproducing sheet 200*c* as well as the image of the field intensity near the central part of the Orion.

As mentioned above, even if the starry sky reproducing sheet used is the same (starry sky reproducing sheet 200*c*), the image projected can be changed by using projector 1601. Therefore, the observer can experience an artificial observation that cannot be experienced when only looking at stars through an optical telescope. From the experience, it has an effect on deepening the understanding on the stars.

In the sixth part, an experience to observe the moon 54 with two telescope 2 is provided to the audience 83. Specifically, the commentator firstly presses the button 6 of the infrared remote control 111. Then the operation moves from S30 to S35. In S35, the value "ModeNo" is set to 6 and in S36 "StepNo" is set to 1. The process moves on to S24 and S25 and reads the data based on the scene number "SceneNo 7" dedicated by "ModeNo 6" and "StepNo 1" from the server.

In S26, the first starry sky reproducing sheet 200*a* is positioned in front of lightbox 100 and the LED elements are turned off. Display 1501 is positioned at the evacuation position, the second position and the filter disk 1603 is set on the window 1604 without a filter.

In S265, a pitch black image is retrieved to show on display 1501 and a full image of the moon is retrieved to display on the projector 1601. Therefore, an image shown in FIG. 47 is projected on the starry sky reproducing device 1.

Next, an image to show a circle cursor 61, which is led by the optical information of the telescope "ScopeInfo" and the ratio of the magnification of the sky by the starry sky reproducing device "DispMag" is positioned in the direction of view 31 which the dummy telescope inside the dome 4 directs, show the area of sight and is added to the image of the projection device 6 to project the whole sky. For the information shown on the commentator's device, commentary information relating to the moon is retrieved.

Here, the moon wanes and waxes, but by projecting the moon of the desired age by projector 1601, it has an effect to respond flexibly.

The commentator then presses the button 0 of the infrared remote control 111. The operation moves from S28 to S32 and the value of "StepNo" becomes 2 in S32. In S33 the value of "StepNo" does not exceed the value in "MaxStepNo" so it moves on to S24 and S25. In S25, scene information based on the scene number "SceneNo 8" dedicated by "ModeNo 6" and "StepNo 2" is read from the server. Then in S26, the first starry sky reproducing sheet 200*a* is positioned in front of lightbox 100 and the LED elements are turned off. Display 1501 is moved to the first position, the display position and filter disk 1603 is set on the window 1604 without a filter.

In S265, the image that is displayed on the display 1501 is retrieved. At this time, the server detects the optical ratio in the observation from the information included in the optical information of the telescope "ScopeInfo" such as the information of the objective lens and the eyepiece. When the magnification is low, the image of the crater shown in FIG. 49 is sent to the one-chip CPU 301. When the magnification is high, commentary information in detail which shows the location of the crater can be seen so, as shown in FIG. 51, an image of the crater with commentary information displayed is sent to the one-chip CPU 301. Also, for displaying on the projector 1601, an image of the waning crater of the moon, shown in FIG. 48 is retrieved. Here, in the image shown in FIG. 48, the central part where display 1501 is located, is black. So, as shown n FIG. 50 when the observer observes it with the image of the crater on display 1501, a continuous surface of the moon without joints can be observed.

Here, the one-chip CPU 301 detects the change in the eyepiece in S263 if the observer changes the magnification ratio of telescope 2 by changing the eyepiece 27. Then the optical information of the telescope is updated. As a result, the image retrieved to display on display 1501 is at an appropriate magnification, for when observing at the present state. Therefore, it has an effect that an appropriate commentary information is automatically provided corresponding to the optical settings.

As explained above, in the first part of Embodiment 2, when observing the whole sky with the naked eye, the starry sky is reproduced by using the conventional projection planetarium. In the second to sixth part, the part of the sky which is used to observe with binoculars, telescopes and digital cameras is reproduced by using the starry sky reproducing device 1. So, Embodiment 2 has an effect to provide an effective observation experience which follows the flow of the observation program.

The starry sky reproducing device 1 can be used by changing multiple starry sky reproducing sheets so it has an effect to realize the target capacity 8 of the device, "Observing multiple celestial objects on the sky." Observation experience can be easily provided to compare the nebulas and star clusters included in the constellations positioned in the opposite direction on the sky with a telescope. For example, the Sagittarius in the summer galaxy and the Orion in the winter galaxy, the Berenice's Hair in the galactic north pole and the Sculptor in the galactic south pole.

The starry sky reproducing device 1 of Embodiment 2, equally realizes the target capacity 1, target capacity 2, target capacity 3, target capacity 4 explained in Embodiment 1. So there is no need to give a high target capacity to the star projection device 5 or to the projection apparatus 6 for the whole sky to correspond to the observation in detail with telescope 2. What is needed is to give target capacity 1, target capacity 2, target capacity 3 to the starry sky reproducing device 1 which partially reproduces the starry sky. Thus, by using the starry sky reproducing device 1 of the present invention and make use of it with the conventional projection planetarium, the present invention has an excellent effect which can realize the target at a high level.

In Embodiment 2, starry sky reproducing device 1 and telescope 2 is placed at the position mentioned above. So the number of audience seats 7 that can be secured near the star projection device 5 placed near the center of dome 4, where the deformation in the position is not observed much, can be added. Also, the starry sky reproducing device 1 is placed below the horizon 41, so it does not disturb the observation from the audience seat 7 when observing near the horizon.

The distance between the starry sky reproducing device 1 and telescope 2 can be taken long within the dome 4, so when using an astronomical telescope on the market, which is designed to observe stars at infinity, the divergence in the position of focus can be made smaller compared to the conventional technology. Also, because the distance between the starry sky reproducing device 1 and telescope 2 can be taken as long as possible, in an observation where multiple telescope 2 is used to observe 1 starry sky reproducing device 1, the angle between the normal vector of the starry sky reproducing device 1 and the line connecting the device and the telescope can be made small. So, the deformation in the position of the stars that is observed is small too. Therefore, target capacity 5, "No deformation in the position of the stars" is realized.

Figure 35:
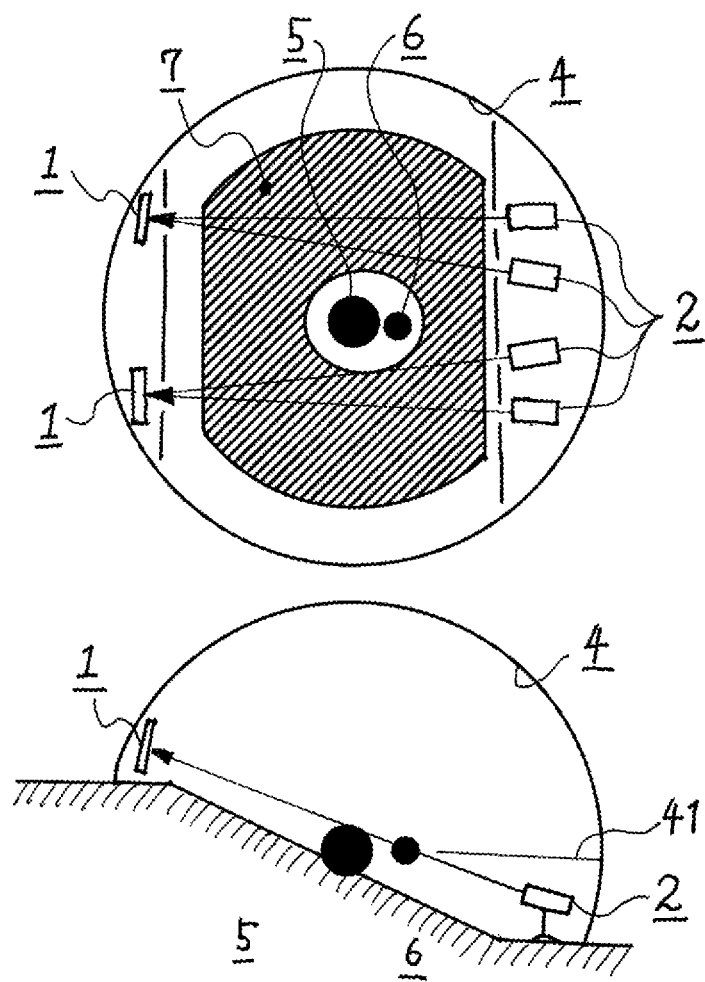
FIG. 35 A view illustrating the arrangement of the starry sky reproducing device of Embodiment 2 and other equipment in the inclined dome.

In the existing types of dome 4 of the projection planetarium, there are two types. Horizontal type, which are shown in FIG. 36 and FIG. 37 and inclined type, which is shown in FIG. 35. As shown in FIG. 35, inclined type of dome 4 gives the observer a realistic sense similar to the actual star observation due to the elevation angle that is caused between the starry sky reproducing device 1 and telescope 2 when placed in the position of the figure.

Next, we will explain about the mobile starry sky reproducing device which is used to provide star observation experiences to areas without a planetarium facilities by making a trip to the school or concert hall and so on in the area. This mobile starry sky reproducing device corresponds to Embodiments 3, 4, and 5. In these embodiments, multiple starry sky reproducing sheet 200 are used to reproduce a wide area of the starry sky. Also, the starry sky reproducing sheet 200 can be made compact and be carried easily, it is suitable for providing a star observation experience by taking a trip.

Embodiment 3

Figure 70:
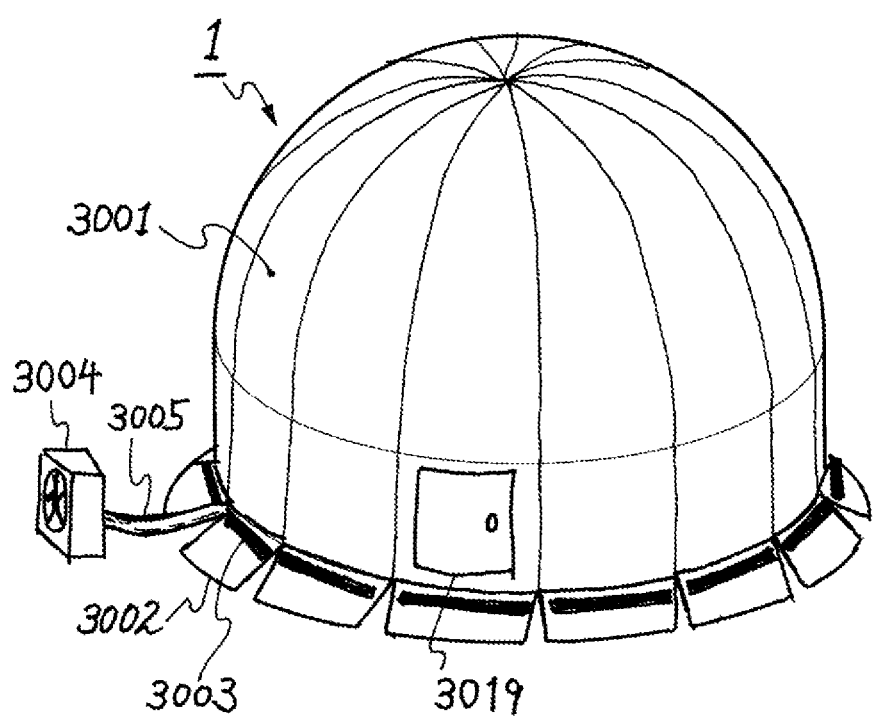
FIG. 70 A perspective view illustrating the starry sky reproducing device of Embodiment 3.
Figure 71:
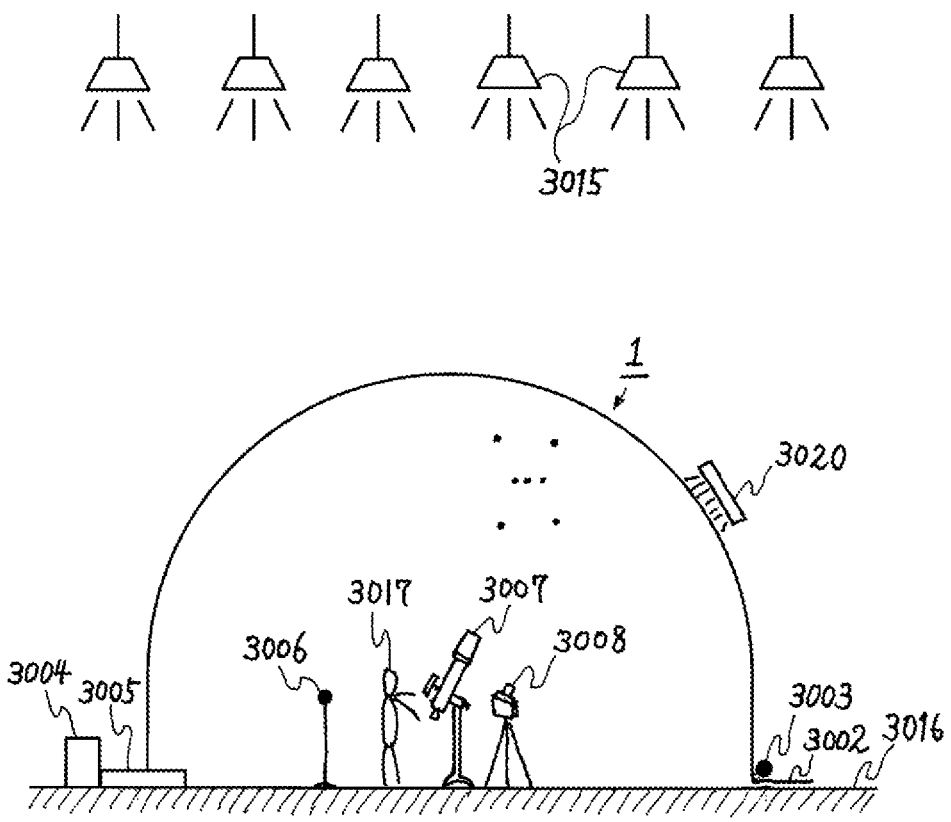
FIG. 71 A cross section view illustrating the starry sky reproducing device of Embodiment 3.

FIG. 70 is a perspective view of starry sky reproducing device of Embodiment 3. FIG. 71 is its sectional view. As the view illustrates, the dome-shape is formed by the connection of the 3001, the partial strip form planar material. It has the entrance 3019 for observers in the dome.

Also, it has the foot section 3002 and weight 3003 to avoid the air leak. The fan 3004 and blast pipe 3005 are go through the foot section, and that makes possible to send air into inside with constant pressure. It makes maintain the dome-shape by controlling air pressure, inside of the dome is higher than outside, and the 3001 will form dome-shape with the air-pressure inside.

Figure 72:
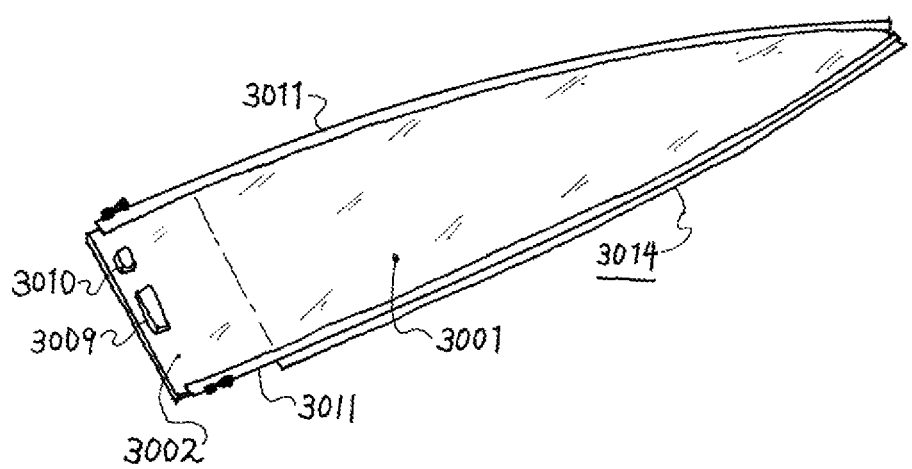
FIG. 72 A view illustrating the partial starry sky reproducing sheet in Embodiment 3.

The UV lamp 3006 lights up the surface of the first paper layer through the UV light with constant brightness magnitude. It has the astronomical telescope 3007 and digital camera 3008 inside the dome. FIG. 72 is the view of the partial starry sky reproducing sheet 3001. The 3001 is the same one with the sky sheet 200 on the Embodiment 1, but longitudinally long. The foot section 3002 on the 3001 has the foot section-electronic substrate 3009, which has side-view type high light white LEDs with one chip CPU as emitting light. The optical fiber of the 3001 is fixed on the location opposite to the emitting side of the light emitter with put together on the location of the 3009. The light emitter will be controlled on constant brightness by one chip CPU.

On between the light emitter and edge of the optical fiber, it fixed filter to provide colors for stars. The foot electronic substrate has the battery 3010 to use power source for one chip CPU.

Figure 73:
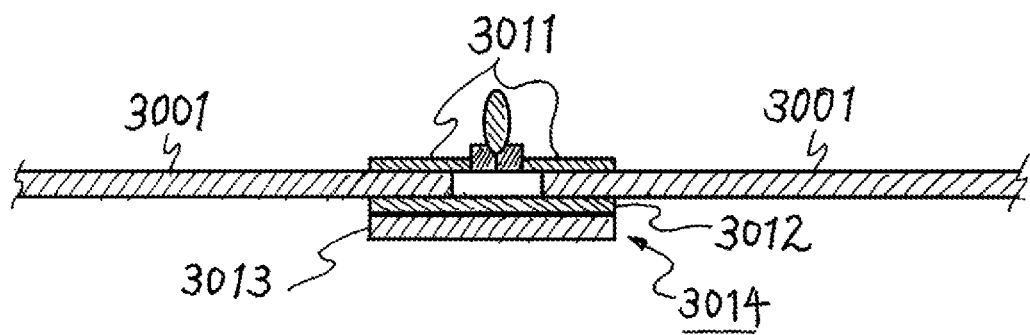
FIG. 73 A cross section view illustrating the joints of the starry sky reproducing device of Embodiment 3.

FIG. 73 is the sectional view of connectional part of plural partial starry sky reproducing sheet 3001. On the connectional part of the 3001, a separable connection means 3011, for example a zipper, is fixed. The 3011 connects 2 partial starry sky reproducing sheets 3001. The connectional part does not have a function as laminated sheet for reproduce sky, so the part can not reproduce sky. To help the part, starry sky reproducing sheet of the joining segment 3014, which is laminating a starry sky reproducing sheet of the joining segment 3012, which is processed planar emission element as tape, and connectional sky sheet 2013 is installed inside the connectional part of the 3001. Thanks to the 3014, the absence sky is covered and the joint part is unremarkable.

The switch of organic Light-Emitting element to light up is controlled by the brightness magnitude through one chip CPU, the booster circuit provided on the foot section electronic substrate. The starry sky reproducing sheet of the joining segment 3012 is also okay with the method to be diffused light of LEDs through resin tape except organic Light-Emitting element.

Starry sky reproducing device 1 is settled in a facilities like elementary schools or outside on daytime that has the light system 3015. The surface of the dome can be light up on constant brightness magnitude with the 3015. Since light can not invade into the foot section 3002, it will be completely darkness inside the dome. That will be the same condition with the observation though the physical sky. It is possible to observe light-emitting element star, printing stars, and transmitted light through the 3001. As Embodiment 1 shows, that achieves target capacities 1-3, and 4 with light box 100, which helps cost down.

The part of the outside of the dome, it has the partial lighting system 3020. The 3020 is make possible to raise the brightness magnitude of transmitted light on specific areas.

Since Embodiment 3 does not have star projection machine 5 on the center of the dome like ordinary starry sky reproducing device, the observers can watch from the center. That means the achievement of target capacity 5 'the location of the star without distortion'.

Since the 3001 forms Hemispherical-shape, it is possible to photograph any objects though the sky. To do that, observer needs to bring the model 3018, which the observers want to see. It does not have any technical issues then since the 3018 will be reproduced on the out-side of the dome. Because of that, it can provide the photographic experience of the star, and that means the achievement of target capacity 12.

On this part, we will refer on the assembling and dismantling method of the starry sky reproducing device 1 on Embodiment 3. Starry sky reproducing device 1 is formed dome shape by jointed plural partial starry sky reproducing sheets 3001. Since the 3001 is formed by the laminated sheets 220 which is multi-layer construction, it has technical issues that is different from conventional air-domes.

Ordinary air-domes are made with soft fabrics like cloth and plastic sheets. it is able to be folded up and stored since the dome is made of plural planar strip-shaped materials got garment manufacture processing and jointed. We can pump the air into the dome to form the air-dome shape at the observation location.

On the other hand, starry sky reproducing device is formed by the 3001 which is made up with the 220, and that means less tenderness than the soft materials of air-dome. Because of the lack of the softness, it can cause trouble on the 220 to reproduce stars like irreversible deformation. The 3001 is desirable to restored with dismantled planar states and will be jointed when it is assembled as dome-shape.

As FIG. 74 illustrate, step 1 is the blow: the 3001 is spread on the ground 2016, and the top of the dome 3018 is jointed with the method 3011 in range of not cause modification. A spindle 3003 is settled on the 3001, and it is desired to use the top of the dome 3018 from inside as backup.

The step 2: blast pipe 3005 from air blower 3004 is insert between the partial starry sky reproducing sheet 3001 the ground 3016. It can make possible to send air into enclosed region between 3001 and 3016. Since that, it is possible to keep the constant pressure in the region.

The step 3: with keep working the 3004, it magnify the diameter by moving the position of toric that press down the 3001, and do the joint 3001. That makes the inside of the air-dome swells more.

With continue the step 3, it is repeated until that the 3001 is formed dome-shape as FIG. 70 and that the 3001 is jointed to the foot sections 3002.

To dismantling the dome, it is dismantled as follow the step reverse order. Embodiment 3 has above method to assemble and dismantle. It is efficient not to cause unwanted deformation on the 3001.

Embodiment 4

Figure 76:
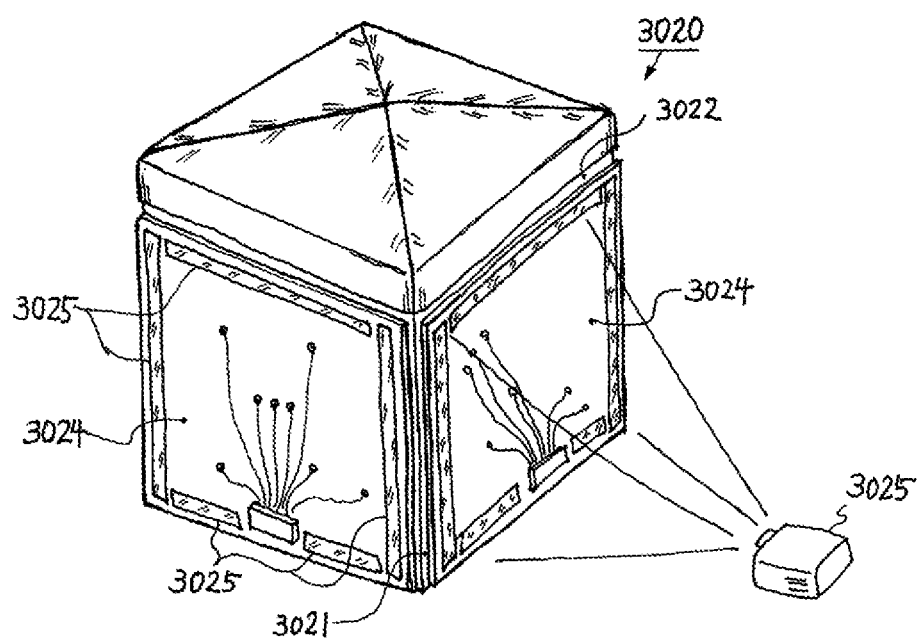
FIG. 76 A perspective view illustrating the starry sky reproducing device of Embodiment 4.
Figure 77:
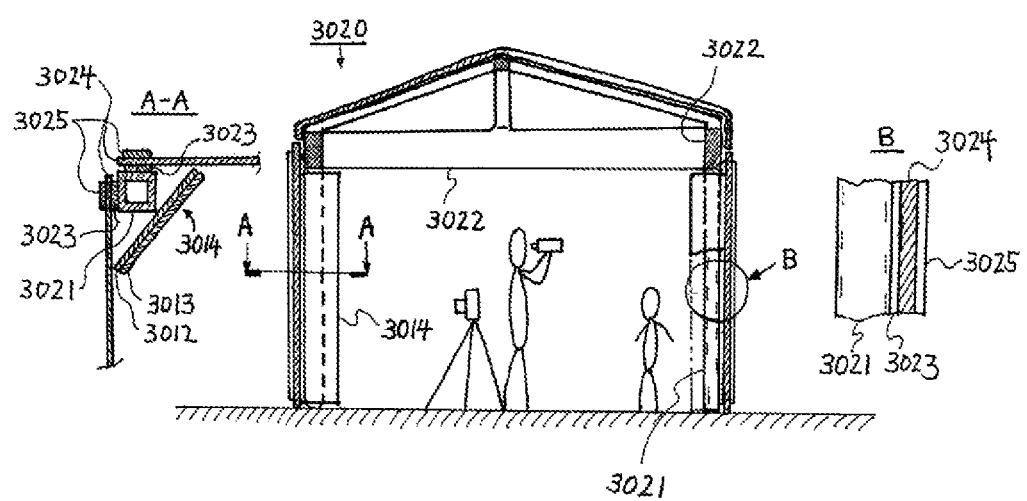
FIG. 77 A cross section view illustrating the starry sky reproducing device of Embodiment 4.

FIG. 76 is a perspective view of starry sky reproducing device on Embodiment 4. FIG. 77 is the cross-sectional view. As the view illustrate, it has the assembled tent 3020 with shading curtain in the room. The upright strut 3021 and ceiling beams 3022 are belong to the tent 3030, and also it has sheet type compass 2023 as well. The 3023. The partial starry sky reproducing sheet 3024 is set up on the side-window which is formed by the 3020 and the 3022 by the presser board which has the property of being absorbed with the compass. Every side views of the 3020 has the partial starry sky reproducing sheet 3024. Since the space between 3024, it has section which can not be reproduce because of the upright strut 3021. The connectional partial starry sky reproducing sheet 3014 is settle to cover the section. It does not have any light since the sky sheet 200 and grounding view are crossed.

Assistants let observers going inside the 3020 with turning over the partial starry sky reproducing sheet 3024 that the pressure board 3025 is removed. The observers in the 3020 can watch the transmitted light that reproduced through the partial starry sky reproducing sheet 3024 since the outer side of 3024 is lighted up with the inside-light as back-light. Since the partial starry sky reproducing sheet has the emitting light stars and printed luminous star with UV lamp light from the inside of the tent 3020, it will make possible to reproduce wider-range of brightness magnitude.

Starry sky reproducing device of Embodiment 4 has the above constitution. That means it has target capacities 1-4 and that it is possible to provide observation experience at schools or concert halls even they do not have planetarium facilities.

It is better to have the projector 3025 on outer side of the tent 2020 as an inside light. On the situation, the projector 2025 will project images on the outer side of the partial starry sky reproducing sheet 3024. As same as the back-light LEDs of Embodiment 1, it is possible to reproduce the star blinking, to high-light specified part along commentary, and to reproduce specified sky field with high brightness magnitude temporality. Moreover, it is possible to project information for the first half commentary of an observation program on the partial starry sky reproducing sheet 3024 though the projector 3025. That means it does not need to bring any screen.

Figure 78:
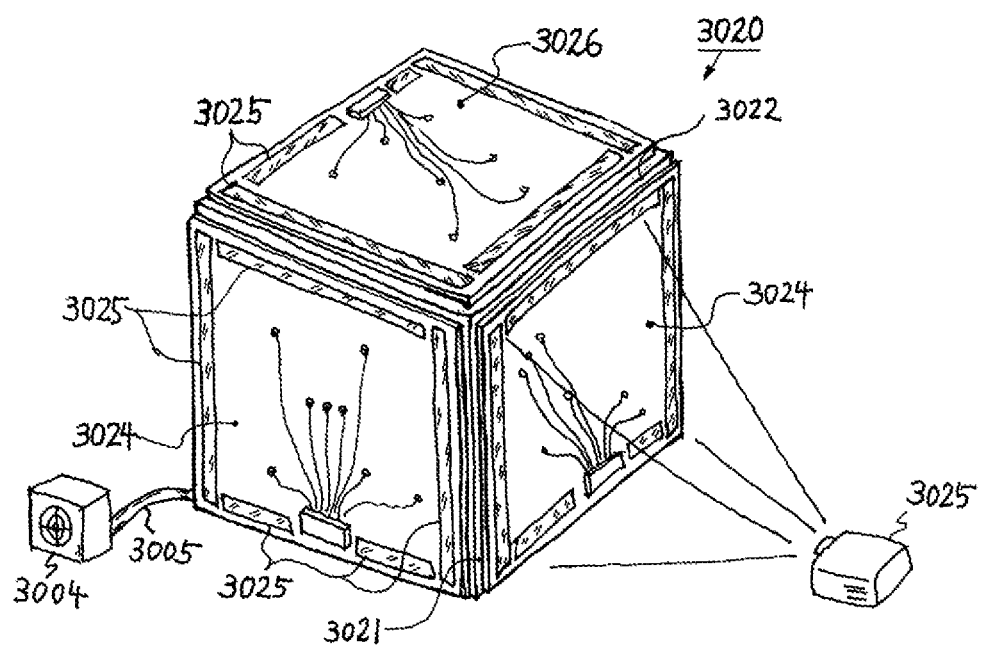
FIG. 78 A perspective view illustrating a variation of Embodiment 4.
Figure 79:
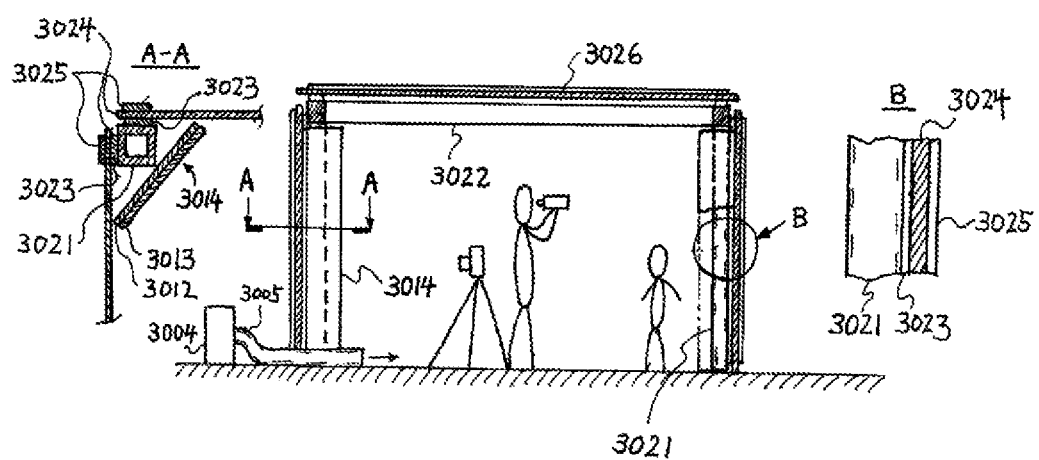
FIG. 79 A cross section view illustrating the variation of Embodiment 4.

FIG. 78 is the perspective view illustrating the alternative example of Embodiment 4. FIG. 79 is the cross-sectional view. As the views illustrating, the ceiling sky sheet 3026 is covered instead of the tent 3020, a shading roof on Embodiment 4. As same as Embodiment 3, it has the blower 3004. The blast pipe 3005 send the air into the inside of the 3020. This method prevents the center of the 3024, the ceiling sky sheet going down because of the gravity.

Alternative example on Embodiment 4 has the effects of the Embodiment 4 and the presence since the observer can watch even above, the ceiling.

Embodiment 5

Figure 80:
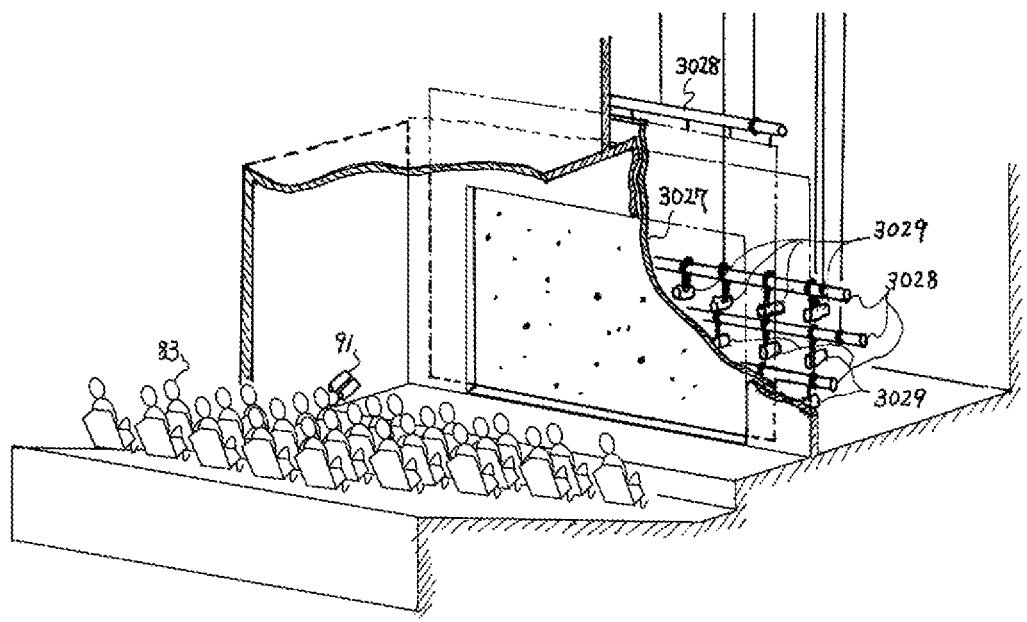
FIG. 80 A partial cross sectional perspective view illustrating a usage of the device of Embodiment 5.
Figure 81:
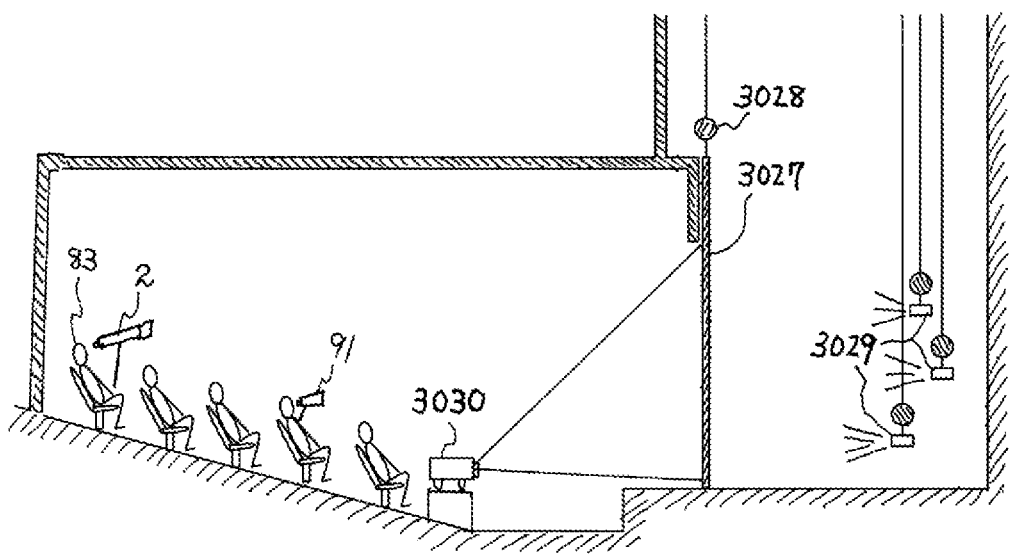
FIG. 81 A center cross sectional view of the device of Embodiment 5.

FIG. 80 is a partial perspective cross-sectional view illustrating how starry sky reproducing device 1 should be used on the Embodiment 5 at the facilities that has stages, like schools or concert halls. FIG. 81 is the central cross-sectional view.

In Embodiment 5, the large-sized starry sky reproducing sheet 3027 is hooked up to cover an aperture in front of the stage by curtains and the 3028. The 3029, plural stage lights, is hooked up with the 3028 on the settled position to light up the outer side of the 3027 with specified magnitude of brightness to make the inside of the 3027 observable with sitting the seats. With the stage projector 3030, it is possible to project commentary information and dark stars on the inside of the 3037 that can not be reproduced by the 3037 directly. The images though the 3030 should have the option that can adjust the brightness magnitude with filters.

The plural lighting system 3029 light up the outer surface of the large-sized starry sky reproducing sheet 3027. When we use the 3027 on the some positions with different brightness magnitude, we can reproduce the twinkling, high-light display as requires, and to light-up the partial location of the sky at a moment. If we use the projector 3030 at seminars on the first half of the observation program, it can be displayed on the inside of the large-sized starry sky reproducing sheet 3027, that means we do not need a screen and that we can provide an astronomy observation smoothly.

Figure 82:
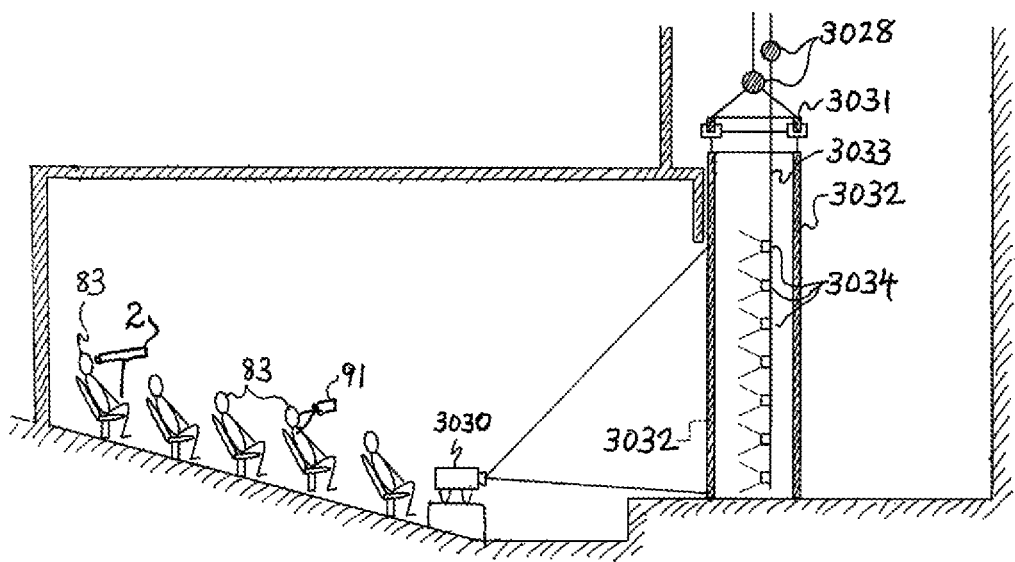
FIG. 82 A cross sectional view illustrating a variation of Embodiment 5.
Figure 83:
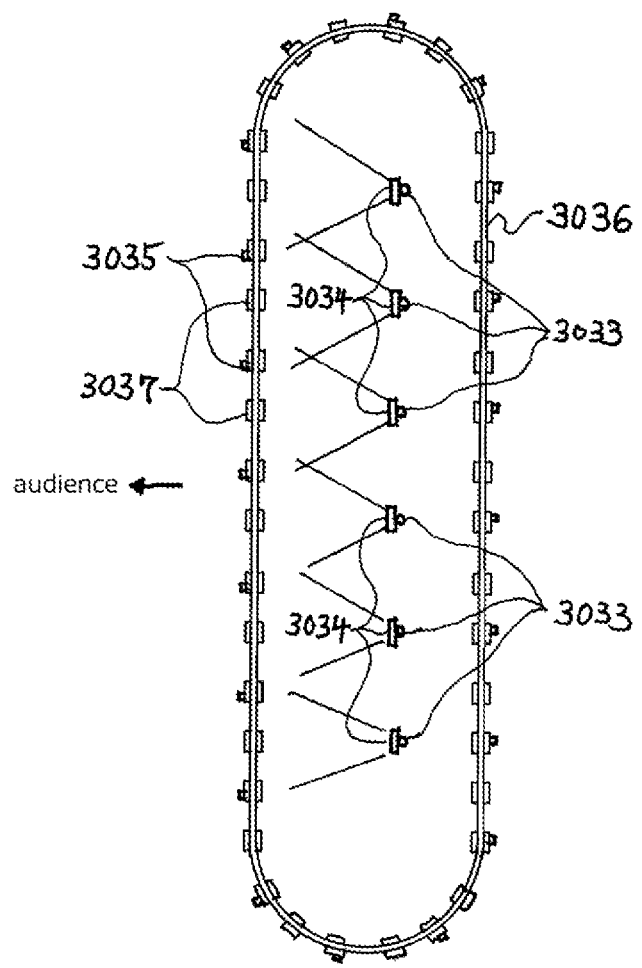
FIG. 83 A top view of drive guiding of circulating supporting apparatus from ceiling of the stage.
Figure 84:
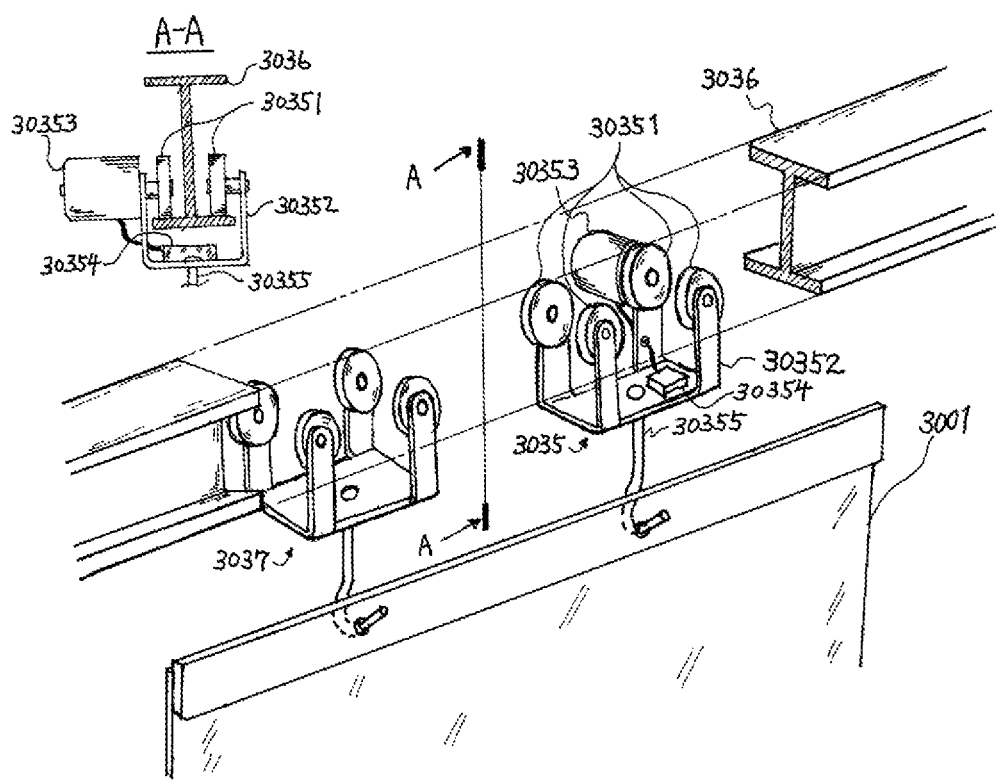
FIG. 84 A partial cross sectional view in details of drive guiding of circulating supporting apparatus and the rales.

FIGS. 82-82 depicts variation example on Embodiment 5. FIG. 82 is the sectional plan. The variation example of starry sky reproducing device on Embodiment 5 consists the following equipment; the circulating supporting apparatus 3031 that positioned on the stage by the hanging apparatus 3028, the circulating starry sky reproducing sheet 3032 that hooked by the 3031, the back-light LEDs 3034 that hooked on the wire 3033. FIG. 83 is a view of the 3031 from above of the stage. FIG. 84 is a partial cross section detailed chart of the 3031 and drive guiding 3035 and the rail 3036.

In the circulating starry sky reproducing sheet 3032, the longitudinal planar partial starry sky reproducing sheet 3001 is connected with the connection means 3011 on the example. The 20 sky reproducing sheets 3001 is connected circular belt shaped.

The circulating supporting apparatus 3031 equips the following equipment; the oval-shaped rail 3036, the 20 drive guiding 3035 that follows the 3036 and 20 subordinate guide 3037. The 3036 is settled on the appointed position on the upper part of the stage with a hanging apparatus. The 3036 should be connected with plural partial rails The drive guiding 3035 is consisted to run along rail 3036 like monorail. To realize that, the 3035 equips the following equipment; the driving wheel 30351, guide frame 30352, driving motor 30353, driving motor system 30354, and supporting parts 30355. Since the ground planar of the driving wheel 30351 and rail 3036 has moderate frictional resistance, the gap between the 3036 and 30361, because of the difference of speed of plural drive guiding 3035, is allowed with slipping the contact between the 30351 and the 3036.

The motor driving system 30354 equips a battery, micro-computer, and motor-driving element. The speed and direction of the motor is controlled by the radio command.

The subordinate guide 3037 has same structure except driving motor 30353, 30354, micro-computer, and motor driving element. The 3037 runs following the circulating starry sky reproducing sheet 3032 along the rail 3036. The 3032 is hang up along the shape of the 3036. The sky sheet 3001 is a partial piece of paper and it can hang up a drive guiding 3035 and subordinate guide 3037 on 2 places.

As FIG. 82 depict, plural wires on hanging apparatus for stage is hanged up on inside of the circulating starry sky reproducing sheet 3032. Every wire has back-light LEDs 3034 and it works with LED driving switch.

The planar space of gallery side on rotation sky sheet 3032 and opening of the stage is covered by black-out. Moreover, the light from back-light LEDs 3034 is shaded not to glow surface of the 3032 and gallery.

The inside of circulating starry sky reproducing sheet 3032 will be lighted up with constant brightness by back-light LEDs 3034. The spectators can watch the transmitted light from their seat through binocular telescope. On the partial starry sky reproducing sheet 3001, since it achieves target capacities 1-4, the spectators can watch the whole sky with details through the telescope as well. When we use the drive guiding 3035, the 3035 and the subordinate guide 3037 will go along the rail 3036. Since the rotation sky sheet 30321 will move left to right, the spectators can watch plural sky, travel in an orbit around the galaxy. It has the effect to provide multiple astronomical observation experiences.

The facilities which equips the stage set to enforce the metamorphosis example on the Embodiment 5 resides anywhere, for example, schools, community centers, or concert halls. It will bring big effect on the diffusion of astronomical education to provide high-quality astronomical observation.

INDUSTRIAL APPLICABILITY

Starry sky reproducing device provides the detailed astronomical observation. It also has possibility to inflect on some industries; using the system on lectures, or as supplement teaching aid of astronomical telescope at schools, as alternative on bad weather at tourism.

EXPLANATION OF REFERENCE NUMERALS

100 light box
101 magnet
102 clear board
103 installation frame
200 large-sized starry sky reproducing sheet
300 body board
301 one-chip CPU
302 LED driving IC
303 power IC
106 external power supply
105 back-light LED
107 lamp arm
109 UV lamp
108 infrared sensor
111 infrared remote controller
110 light pollution lamp
304 brightness adjusting volume controller
307 luminous intensity sensor
305 white chip LED
104 LED opening window
306a, 306b, 306c, 306d contact probe
206 contact board
209a, 209b, 209c, 209d contact pad
208 nonvolatile memory
230 plastic optical fiber
205 optical fiber integrated part
207 rubber adhesive
212 optical fiber entrance-hole
231 branching point
210 star-shaped filter
211 printed filter
220 laminated sheet
201 the first layer of paper
202 aluminum layer
203 the second layer of paper
204 the third layer of paper
212 the first group hole
213 the second group hole
214 the third group hole
215 the first printed-filter letter
216 the second printed-filter letter
217 filter sticker
218 fluorescence ink

The invention claimed is:

1. A starry sky reproducing sheet, comprising:
N laminated light reducing sheets stuck together, wherein N is an integer which is two or larger;
L-layer transmission holes that are formed through L light reducing sheets stuck together, so that light beams pass therethrough, wherein L is one when N is two and L is an integer which is one or larger and N−1 or smaller when N is larger than two, and wherein the aforementioned L light reducing sheets comprise
a first light reducing print which reflects, with a prescribed reflectance, light which enters onto a surface of the L light reducing sheets which surface is observed by observers, and
a second light reducing print which transmits, with a prescribed transmittance, light which enters from a back side of the L light reducing sheets; and
M-layer transmission holes that are formed through M light reducing sheets stuck together including the L light reducing sheets at different positions from the L-layer transmission holes, each of light reducing sheets of the M light reducing sheets other than those which also belong to the L light reducing sheets having homogeneous light reducing effects, wherein M is two when N is two and M is an integer which is larger than L and which is two or larger and N or smaller when N is larger than two;
whereas each of light reducing sheets of the N light reducing sheets other than those which also belong to the L and/or M light reducing sheets may have homogeneous light reducing effects or may have a reflective or transmissive light reducing print on its surfaces;
wherein light beams incident on one face of the starry sky reproducing sheet pass through the L- and M-layer transmission holes while being attenuated at mutually different light reduction ratios to become L- and M-layer transmitted beams respectively which are visibly recognizable as transmitted-light stars having mutually different brightnesses; and
wherein the first and second print allow for independent selection between
a first display state in which reflected light of light which enters onto the surface of the aforementioned L light reducing sheets displays background other than stars which are expressed using the aforementioned L- and M-layer transmitted beams, and
a second display state which is different from the first display state and in which transmitted light of light which enters onto a back surface of the aforementioned L light reducing sheets displays the background, wherein the background in the second display state becomes darker because light is subjected to light reducing effects of the light reducing sheets of the M light reducing sheets other than those which also belong to the L light reducing sheets in addition to light reducing effects of the L light reducing sheets.

2. The starry sky reproducing sheet according to claim 1, wherein the sheet comprises holes to insert ends of optical fibers therethrough and fix them.

3. The starry sky reproducing sheet according to claim 1, wherein the sheet comprises a printed surface on its observer side surface on which stellar images are printed with a fluorescent ink that emits light by being illuminated with ultraviolet light.

4. The starry sky reproducing sheet according to claim 2, wherein the sheet comprises a printed surface on its observer side surface on which stellar images are printed with a fluorescent ink that emits light by being illuminated with ultraviolet light.

5. The starry sky reproducing sheet according to claim 1, wherein an image can be projected by a projector on an observer side surface of the starry sky reproducing sheet.

6. A starry sky reproducing device, comprising:
the starry sky reproducing sheet according to claim 1; and
a back light source that illuminates the sheet from its back side opposite to an observer side.

7. The starry sky reproducing device according to claim 6, wherein the device comprises:
a plurality of light emitting elements;
light-emitting element lighting control means that controls lighting of the light emitting elements; and
a plurality of optical fibers that are disposed on the back side of the starry sky reproducing sheet and through the starry sky reproducing sheet, and that lead light incident on ends of the fibers from the light emitting elements to the observer side of the starry sky reproducing sheet;
wherein the transmitted-light stars and light-emitting element stars that are produced by the light led by the optical fibers from the light emitting elements can be observed by an observer simultaneously; and
wherein, when the light-emitting element stars have an average intensity of A and the transmitted-light stars have an average intensity of B, A>B holds.

8. The starry sky reproducing device according to claim 7, wherein the device comprises:
a base frame that the plurality of light emitting elements and the light-emitting element lighting control means are fixed to; and
sheet installation means that installs the starry sky reproducing sheet on the base frame in a removable manner;
wherein the starry sky reproducing sheet installation means is configured to align incidence ends of the optical fibers at positions facing light emitting planes of the light emitting elements according to predetermined correspondence between the light emitting elements and the optical fibers upon installation of the starry sky reproducing sheet.

9. The starry sky reproducing device according to claim 7, wherein the device comprises:
an approximately planar illumination panel, as the back light source, comprising transmission-light emitting elements that generate backside illumination light for the starry sky reproducing sheet; and
an illumination panel lighting control means that can change light intensity from the illumination panel;
wherein the illumination panel can illuminate the back side of the starry sky reproducing sheet with light of variable intensity by being disposed close to the starry sky reproducing sheet; and
wherein the light-emitting element lighting control means or the illumination panel lighting control means works to achieve a predetermined balance of brightness observed by the observer between the transmitted-light stars and the light-emitting element stars.

10. The starry sky reproducing device according to claim 7, wherein the device comprises:
a UV lamp that illuminates the observer side surface of the starry sky reproducing sheet with ultraviolet light; and
UV-lamp lighting control means that controls lighting of the UV lamp;
wherein the starry sky reproducing sheet comprises a printed surface on the observer side surface thereof on which stellar images are printed with a fluorescent ink that emits light by being illuminated with ultraviolet light;
wherein printed luminous stars that are produced by the fluorescent ink emitting light by being illuminated with the UV lamp and the transmitted-light stars can be observed by an observer simultaneously; and
wherein, when the transmitted-light stars have an average intensity of B and the printed luminous stars have an average intensity of C, B>C holds.

11. The starry sky reproducing device according to claim 6, wherein the device comprises:
a UV lamp that illuminates the observer side surface of the laminated sheet with ultraviolet light; and
UV-lamp lighting control means that controls lighting of the UV lamp;
wherein the starry sky reproducing sheet comprises a printed surface on the observer side surface thereof on which stellar images are printed with a fluorescent ink that emits light by being illuminated with ultraviolet light;
wherein printed luminous stars that are produced by the fluorescent ink emitting light by being illuminated with the UV lamp and the transmitted-light stars can be observed by an observer simultaneously; and
wherein, when the transmitted-light stars have an average intensity of B and the printed luminous stars have an average intensity of C, B>C holds.

12. The starry sky reproducing device according to claim 11, wherein the device comprises:
an approximately planar illumination panel, as the back light source, comprising transmission-light emitting elements that generate backside illumination light for the starry sky reproducing sheet; and
an illumination panel lighting control means that can change light intensity from the illumination panel;
wherein the illumination panel can illuminate the back side of the starry sky reproducing sheet with light of variable intensity by being disposed close to the starry sky reproducing sheet; and
wherein the UV-lamp lighting control means or the illumination panel lighting control means works to achieve a predetermined balance of brightness observed by the observer between the transmitted-light stars and the printed luminous stars.

13. The starry sky reproducing device according to claim 6, wherein the device comprises a projector that can project an image on the observer side surface of the starry sky reproducing sheet.

14. The starry sky reproducing device according to claim 6, wherein the device comprises:
a display that can display an image on a surface thereof; and
a transmitting reflection plate that enables simultaneous observation of the image on the display and the light from the starry sky reproducing sheet by reflecting light from display elements producing the image and by transmitting the light from the starry sky reproducing sheet.

15. The starry sky reproducing device according to claim 6, wherein the device comprises:
an approximately planar illumination panel, as the back light source, comprising transmission-light emitting elements that generate backside illumination light for the starry sky reproducing sheet; and illumination panel lighting control means that can change light intensity from the illumination panel;

wherein the illumination panel can illuminate the back side of the starry sky reproducing sheet with light of variable intensity by being disposed close to the starry sky reproducing sheet.

16. The starry sky reproducing device according to claim 15, wherein the device comprises sheet installation means that installs the starry sky reproducing sheet on the illumination panel in an exchangeable manner.

* * * * *